(12) United States Patent
Rohmer et al.

(10) Patent No.: US 10,340,722 B2
(45) Date of Patent: Jul. 2, 2019

(54) ELECTRICAL WIRING ASSEMBLY

(71) Applicant: Pass & Seymour, Inc., Syracuse, NY (US)

(72) Inventors: Richard M. Rohmer, Jordan, NY (US); Brian Mueller, Cortland, NY (US); Thomas F. Roy, Camillus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 441 days.

(21) Appl. No.: 15/167,293

(22) Filed: May 27, 2016

(65) Prior Publication Data
US 2017/0025886 A1    Jan. 26, 2017

Related U.S. Application Data

(60) Provisional application No. 62/171,479, filed on Jun. 5, 2015.

(51) Int. Cl.
*H01M 10/44* (2006.01)
*H01M 10/46* (2006.01)
(Continued)

(52) U.S. Cl.
CPC ............ *H02J 7/025* (2013.01); *H02J 7/0044* (2013.01); *H02J 50/00* (2016.02); *H02J 50/10* (2016.02);
(Continued)

(58) Field of Classification Search
CPC ................................ H02J 7/355; H02J 7/0042
(Continued)

(56) References Cited

U.S. PATENT DOCUMENTS

| 6,518,724 B2 | 2/2003 | Janik |
| 6,864,798 B2 | 3/2005 | Janik |

(Continued)

FOREIGN PATENT DOCUMENTS

| EP | 2862257 | 4/2015 |
| WO | 2018187304 | 10/2018 |

*Primary Examiner* — Edward Tso
(74) *Attorney, Agent, or Firm* — Bond Schoeneck & King, PLLC; Frederick Price; George McGuire

(57) ABSTRACT

The present invention is directed to an electrical wiring assembly that includes a plurality of line terminals configured to be coupled to a source of AC power. A circuit assembly is coupled to the plurality of line terminals. The circuit assembly includes a control circuit coupled to at least one electro-magnetic coil, the control circuit being configured to provide an electrical drive signal to the at least one electro-magnetic coil in accordance with a predetermined wireless charging regimen. The at least one electro-magnetic coil is configured to propagate a magnetic field in accordance with the electrical drive signal. A wall plate assembly is configured to accommodate the circuit assembly therewithin, the wall plate assembly including a charging interface region configured to accommodate a portable electronic device. The charging interface region is configured to position the at least one electro-magnetic coil proximate the portable electronic device so that the portable electronic device is disposed within the propagated magnetic field in accordance with the predetermined wireless charging regimen.

45 Claims, 49 Drawing Sheets

(51) Int. Cl.
  *H02J 7/02* (2016.01)
  *H02J 7/00* (2006.01)
  *H02J 50/00* (2016.01)
  *H02J 50/12* (2016.01)
  *H02J 50/10* (2016.01)
  *H02J 50/20* (2016.01)

(52) U.S. Cl.
  CPC ............... *H02J 50/12* (2016.02); *H02J 50/20* (2016.02); *H02J 2007/0049* (2013.01); *H02J 2007/0096* (2013.01)

(58) Field of Classification Search
  USPC .................................. 320/107, 111, 114, 115
  See application file for complete search history.

(56) References Cited

U.S. PATENT DOCUMENTS

| | | | |
|---|---|---|---|
| 6,993,289 B2 | 1/2006 | Janik | |
| 7,654,855 B2 | 2/2010 | Liao | |
| 7,855,529 B2 | 12/2010 | Liu | |
| 7,868,589 B2 | 1/2011 | McSweyn et al. | |
| 8,378,625 B2* | 2/2013 | Gourley | H02J 5/00 320/107 |
| 8,456,131 B2* | 6/2013 | Bukow | H02J 7/0044 320/110 |
| 8,536,827 B2 | 9/2013 | Gourley | |
| 8,583,040 B2 | 11/2013 | Baumert et al. | |
| 8,668,347 B2 | 3/2014 | Ebeling | |
| 8,712,486 B2 | 4/2014 | Sorias et al. | |
| 8,868,939 B2 | 10/2014 | Matsuoka et al. | |
| 8,912,442 B2 | 12/2014 | Smith | |
| 9,035,180 B2 | 5/2015 | Smith et al. | |
| 9,059,591 B2 | 6/2015 | Niec et al. | |
| 9,124,105 B2 | 9/2015 | Gunderman et al. | |
| 9,252,610 B2 | 2/2016 | Chen et al. | |
| 9,362,728 B2 | 6/2016 | Smith et al. | |
| 9,438,070 B2 | 9/2016 | Byrne et al. | |
| 9,464,795 B2 | 10/2016 | Ebeling | |
| 9,680,532 B2 | 6/2017 | Niec et al. | |
| 9,742,111 B2 | 8/2017 | Smith et al. | |
| 9,787,025 B2 | 10/2017 | Smith et al. | |
| 10,050,473 B2 | 8/2018 | Byrne et al. | |
| 10,063,088 B2 | 8/2018 | Warren | |
| 10,103,582 B2 | 10/2018 | Leabman et al. | |
| 10,136,534 B2 | 11/2018 | Ebeling | |
| 2007/0191075 A1 | 8/2007 | Greene et al. | |
| 2008/0157715 A1 | 7/2008 | Rosenboom et al. | |
| 2009/0075704 A1 | 3/2009 | Wang | |
| 2009/0284216 A1* | 11/2009 | Bessa | H02J 7/0044 320/101 |
| 2010/0201202 A1 | 8/2010 | Kirby et al. | |
| 2012/0049800 A1* | 3/2012 | Johnson | H02J 7/0044 320/111 |
| 2012/0113645 A1 | 5/2012 | Liao et al. | |
| 2012/0153731 A9 | 6/2012 | Kirby et al. | |
| 2013/0207472 A1 | 8/2013 | Chiang | |
| 2013/0335020 A1 | 12/2013 | Moore | |
| 2014/0103179 A1 | 4/2014 | Lipke et al. | |
| 2014/0256188 A1 | 9/2014 | Manahan et al. | |
| 2014/0354219 A1 | 12/2014 | Fan | |
| 2015/0001265 A1* | 1/2015 | Hart | A45F 5/021 224/269 |
| 2015/0130285 A1 | 5/2015 | Leabman et al. | |
| 2015/0229079 A1 | 8/2015 | Smith et al. | |
| 2015/0249343 A1 | 9/2015 | Makwinski et al. | |
| 2017/0025886 A1 | 1/2017 | Rohmer et al. | |
| 2017/0163045 A1 | 6/2017 | Michaelraj | |

* cited by examiner

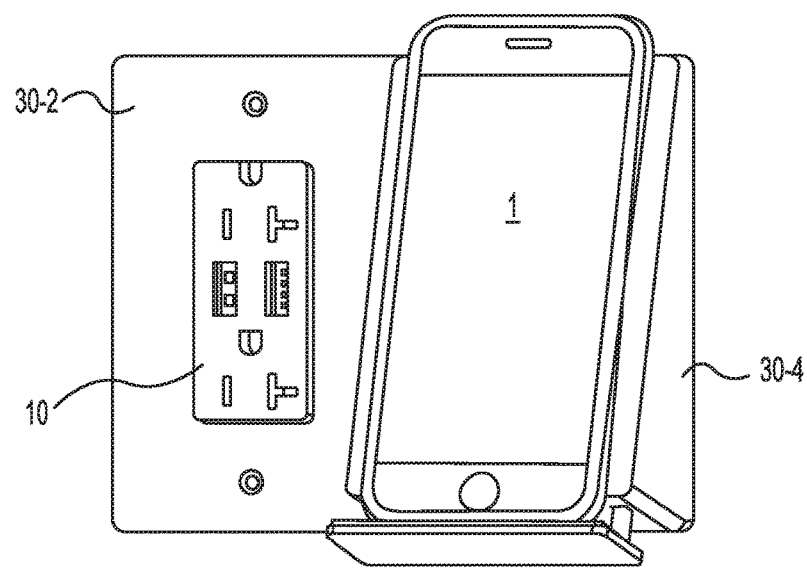
FIG. 1C
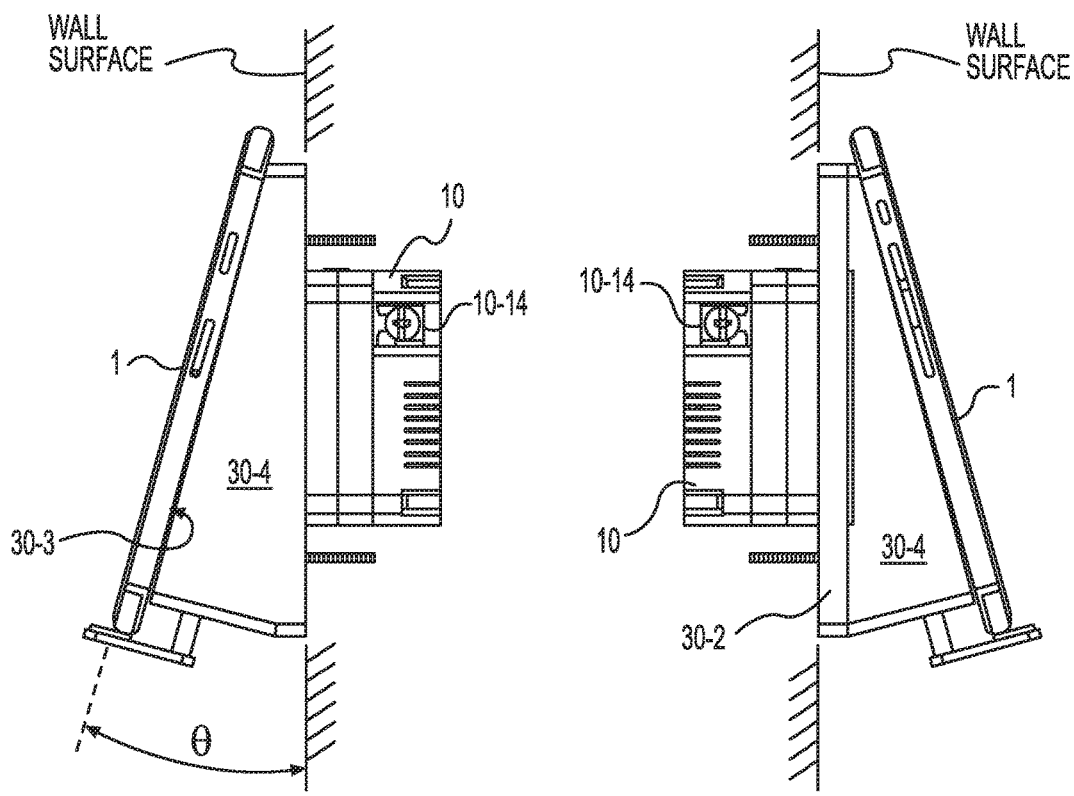
FIG. 1D                    FIG. 1E

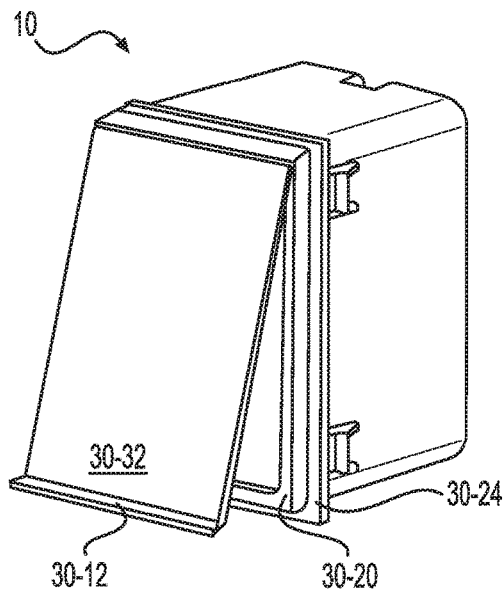
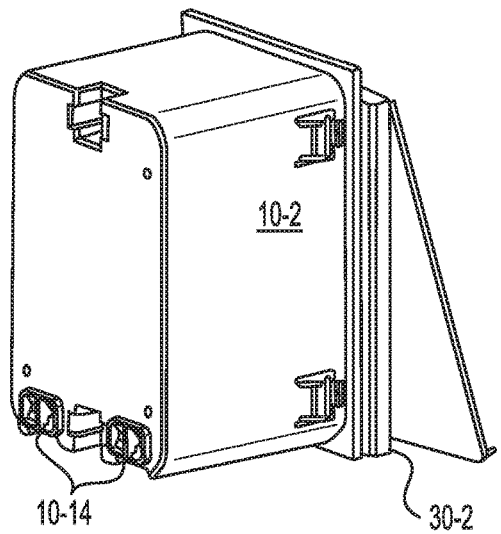
FIG. 11A    FIG. 11B
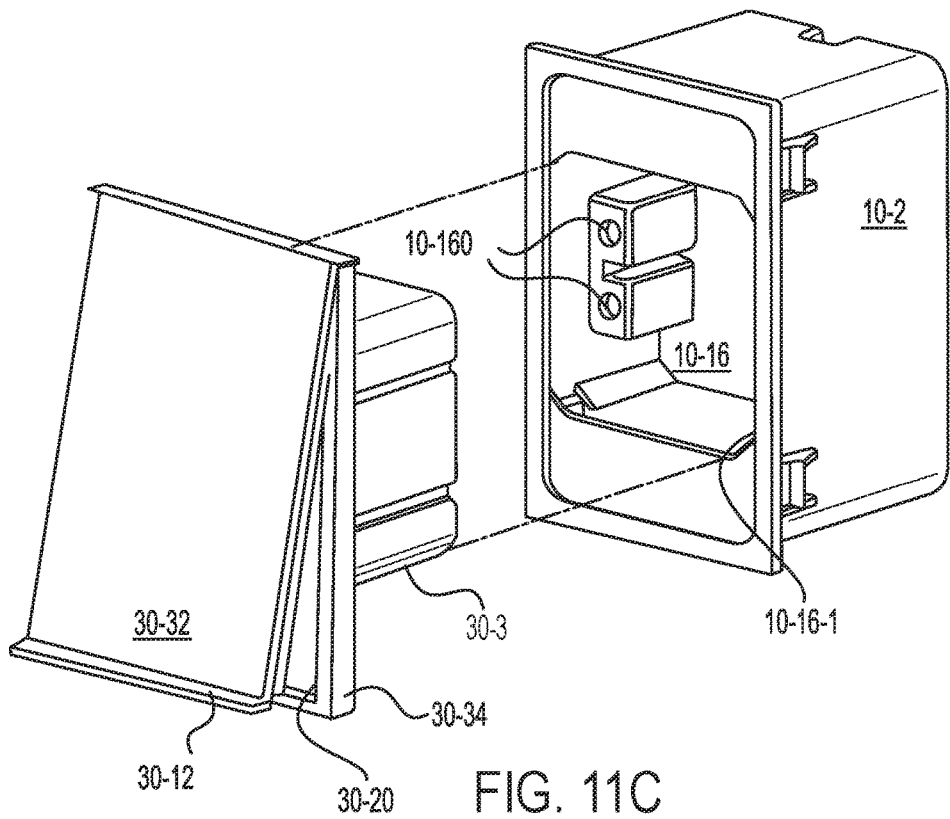
FIG. 11C

ELECTRICAL WIRING ASSEMBLY

CROSS-REFERENCE TO RELATED APPLICATIONS

This application claims priority to U.S. Provisional Patent Application Ser. No. 62/171,479 filed on Jun. 5, 2015, the content of which is relied upon and incorporated herein by reference in its entirety, and the benefit of priority under 35 U.S.C. § 119(e) is hereby claimed.

BACKGROUND OF THE INVENTION

1. Field of the Invention

The present invention relates generally to charging devices, and particularly to wireless charging devices.

2. Technical Background

Portable or hand-held electronic devices have become ubiquitous. Moreover, the communications and computing technology spaces over-lap with modern cell phones and lap-tops, tablets and I-pads having much of the same. One reason that these devices are so popular relates to the fact that they can be carried and used by the user almost anywhere. Thus, a user can make telephone calls, send and receive emails, exchange text messages and/or browse the internet on the fly. In order to support such device mobility, each of these portable electronic devices must include some type of rechargeable battery system (e.g., electrochemical batteries, capacitor batteries, etc.). As a result, there is an urgent need in the market for battery recharging stations.

In one approach that has been considered and tried, many electronic devices are commercialized and sold together with their own charging means. To be specific, many charging devices of this type are configured as an electrical power cord that has a set of electrical contacts disposed in a DC output plug that has a form factor configured to mate with a corresponding charging receptacle formed in the portable device. The charging cords (or stations) of this type are configured to be connected to an AC power source (e.g., 120 VAC) and convert the AC power into a low voltage DC signal that charges the battery. One drawback to this approach is that the charging cord/station is only usable with that particular device. Thus, its unique DC interface cannot be used with any of the other portable devices on the market because they have charging receptacles with a different form factor. As a result, when one of the charging station or the portable device gets damaged or has reached end of life, both have to be replaced.

In another approach that has been considered, a portable charging station includes an AC power connection (that couples the device to AC power) and is further equipped with one or more standardized low voltage ports (e.g., USB ports). While the portable electronic device is also equipped with a standardized low voltage port, it may not necessarily have the same form factor or configuration. In either case, the user must obtain a low voltage cord that is appropriately terminated on each end to charge the device. That cord must then be stowed when it is not in use. While this approach goes a long way toward solving the universality issue, it does not totally solve the problem; the so-called standardized low voltage ports actually comprise a family of low voltage port standards. One drawback to this approach therefore relates to the user's accumulation of low voltage cords over time. (One for each type of portable device in his possession). Many users will reach into a drawer for the "right" low voltage cord, only to pull out a plurality of tangled cords that must be separated. Once the cords are separated, the user must "eye-ball" the various cords and select the right one for the device he is seeking to charge. As a result, these charger types are susceptible to being misplaced, lost or stolen.

Perhaps as a result of the aforementioned issues, many portable charging stations now include "wireless power transfer technology" that eliminates the need for a low voltage interconnection cable. Specifically, a device is charged using wireless magnetic inductive coupling; the charging station includes a coil winding and the portable electronic device is equipped with a secondary coil. The two coils form a transformer. Charging occurs when the portable electronic device is brought within range of the charging coil's magnetic field. While this approach simplifies the cord entanglement issue, it also presents other drawbacks. While the low voltage cable is eliminated, the charging station still requires an AC power cord and further requires a charging cradle that positions the mobile device proximate the charging coil. Thus, the resultant charging station is bulky and unwieldy, making it inconvenient to cart around and stow. Moreover, wireless charging stations are also susceptible to being misplaced or stolen.

These various approaches all require that the charging device have a power plug to receive power. Another problem arises when the power is derived from an electrical wiring device which is a class of devices installed in an outlet box as part of an electrical distribution system. When the charging station is plugged into the electrical wiring device, that particular voltage port is no longer available for any other use. Also, the power plug or the charging device itself obscures the face of the wiring device, effectively taking part of the wiring device out of service.

SUMMARY OF THE INVENTION

The present invention addresses the needs described above by providing a wireless charger that addresses the issues described above. Accordingly, the wireless charger of the present invention may be realized in a wiring device form factor that provides the user with wireless charging capabilities while simultaneously providing one or more USB receptacles, 120 VAC receptacles, electric switches or other such wiring devices. The wireless charger of the present invention may be employed with any suitable wireless charging technology such as magnetic induction chargers, magnetic resonance chargers or RF chargers.

One aspect of the present invention is directed to an electrical wiring assembly that includes: a plurality of line terminals configured to be coupled to a source of AC power; a circuit assembly coupled to the plurality of line terminals, the circuit assembly including a control circuit coupled to at least one electro-magnetic coil, the control circuit being configured to provide an electrical drive signal to the at least one electro-magnetic coil in accordance with a predetermined wireless charging regimen, the at least one electro-magnetic coil being configured to propagate a magnetic field in accordance with the electrical drive signal; and a wall plate assembly configured to accommodate the circuit assembly therewithin, the wall plate assembly including a charging interface region configured to accommodate a portable electronic device, the charging interface region being configured to position the portable electronic device proximate the at least one electro-magnetic coil so that the portable electronic device is disposed within the propagated magnetic field in accordance with the predetermined wireless charging regimen.

In one embodiment, the device further comprises an electrical wiring device, and wherein the wall plate assembly further comprises an electrical wiring device region configured to accommodate the electrical wiring device.

In one version of the embodiment, the electrical wiring device is selected from a group of electrical wiring devices that include an outlet receptacle, an electric switch, a ground fault circuit interrupter (GFCI), an arc fault circuit interrupter (AFCI), a transient voltage surge suppressor (TVSS), a surge protective device (SPD), a dimmer, a fan speed control, a night light, a low voltage port, or a USB port.

In one version of the embodiment, the electrical wiring device is configured to be installed in an outlet box attached to a wall structure, the wall plate assembly including a mounting portion configured to attach the wall plate assembly to the electrical wiring device or the wall structure.

In one version of the embodiment, the wall plate assembly is configured to substantially conceal the mounting portion after installation.

In one embodiment, the charging interface region includes a cradle portion, the cradle portion being configured to accommodate the portable electronic device.

In one version of the embodiment, a position of the cradle portion is user adjustable.

In one version of the embodiment, the cradle portion includes at least one spring-loaded gripper configured to clamp the portable electronic device against an outer surface of the charging interface region the at least one spring-loaded gripper is configured to accommodate a range of portable electronic device sizes.

In one version of the embodiment, the at least one spring-loaded gripper includes two grippers whose motions are controlled in equal and opposite directions by a linkage structure to accommodate the portable electronic device.

In one version of the embodiment, the circuit assembly further includes an electrical switch coupled to the cradle portion, the electrical switch activating the electrical drive signal when the cradle portion is positioned to accommodate the portable electronic device.

In one version of the embodiment, the electrical drive signal is provided to the at least one electro-magnetic coil when there is a predetermined communication signal provided by the portable electronic device to a receiver disposed in the circuit assembly.

In one version of the embodiment, the electrical drive signal stops being provided when the predetermined communication signal interrupts due to a battery disposed in the portable electronic device reaching a charged state.

In one version of the embodiment, the control circuit is configured to prevent resumption of the electrical drive signal for a predetermined period of time after the portable electronic device has reached the charged state.

In one embodiment, the electrical drive signal is provided to the at least one electro-magnetic coil when there is a predetermined communication signal provided by the portable electronic device to a receiver disposed in the circuit assembly.

In one version of the embodiment, the electrical drive signal stops being provided when the predetermined communication signal interrupts due to a battery disposed in the portable electronic device reaching a charged state.

In one version of the embodiment, the control circuit is configured to prevent resumption of the electrical drive signal for a predetermined period of time after the portable electronic device has reached the charged state.

In one embodiment, the control circuit includes a power supply circuit.

In one embodiment, the wall plate assembly includes a mounting portion configured to be coupled to a wall having a planar wall surface, the charging interface region having a substantially planar outer surface configured to accommodate the portable electronic device, the outer surface being substantially parallel to the wall surface.

In one embodiment, the wall plate assembly includes a mounting portion configured to be coupled to a mounting surface, and wherein the charging interface region includes a surface inclined relative to the mounting surface.

In one version of the embodiment, an inclination angle of the surface is user adjustable.

In one version of the embodiment, the device further comprises an electrical wiring device, and wherein the wall plate assembly further comprises an electrical wiring device region having an outer surface, wherein the outer surface is substantially parallel with the mounting surface.

In one embodiment, the device further comprises an electrical wiring device, and wherein the wall plate assembly further comprises an electrical wiring device region, the user accessible electrical wiring device region and the charging interface region having outer surfaces that are substantially co-planar.

In one embodiment, the wall plate assembly includes a mounting portion configured to be coupled to a mounting surface, and wherein the charging interface region is recessed relative to the mounting surface.

In one embodiment, the predetermined wireless charging regimen includes a magnetic induction charging regimen, a resonant inductive charging regimen, or an RF wireless charging regimen.

In one embodiment, the device further comprises a power supply circuit coupled to the circuit assembly, the power supply circuit being configured to convert an AC power signal provided by the source of AC power into a low voltage power signal.

In one version of the embodiment, the device further includes an electrical wiring device, wherein the wall plate assembly further comprises an electrical wiring device region configured to accommodate the electrical wiring device, the power supply circuit being disposed in the electrical wiring device.

In one version of the embodiment, the power supply circuit is coupled to at least one low voltage output port.

In one version of the embodiment, the charging interface region is configured to hold a rechargeable portable device receiving power via a plug deriving power from the at least one low voltage output port.

In one version of the embodiment, the at least one low voltage output port is disposed in the electrical wiring device region.

In one version of the embodiment, the at least one low voltage output port is disposed between two receptacles disposed in the electrical wiring device region.

In one embodiment, the charging interface region includes a mounting portion configured to be coupled to a wall mounting surface, the mounting portion being substantially flush with respect to the wall mounting surface.

In one version of the embodiment, the mounting portion includes one or more fastening elements configured to affix the charging interface region to the wall mounting surface.

In one version of the embodiment, the wall plate assembly further comprises an electrical wiring device region configured to accommodate an electrical wiring device, the electrical wiring device being configured to be disposed within a device box installed within the wall mounting surface.

In one embodiment, the electrical wiring device includes a power supply coupled to a low voltage port, at least a portion of the circuit assembly being configured to receive a power input signal from the power supply.

In another aspect, the present invention is directed to an electrical wiring assembly that includes: a plurality of line terminals configured to be coupled to a source of AC power; a circuit assembly coupled to the plurality of line terminals, the circuit assembly including a control circuit coupled to at least one electro-magnetic coil, the control circuit being configured to provide an electrical drive signal to the at least one electro-magnetic coil in accordance with a predetermined wireless charging regimen, the at least one electro-magnetic coil being configured to propagate a magnetic field in accordance with the electrical drive signal; and a wall plate assembly configured to accommodate the circuit assembly therewithin, the wall plate assembly including a charging interface region configured to accommodate a portable electronic device so that the portable electronic device is disposed within the propagated magnetic field in accordance with the predetermined wireless charging regimen and an electrical wiring device, the wall plate assembly further comprising an electrical wiring device region configured to accommodate the electrical wiring device.

In one embodiment, the electrical wiring device is configured to be installed in an outlet box attached to a wall structure, the wall plate assembly including a mounting portion configured to attach the wall plate assembly to the electrical wiring device or the wall structure.

In one embodiment, the wall plate assembly is configured to substantially conceal the mounting portion after installation.

In one embodiment, the wall plate assembly includes a user adjustable cradle portion being configured to position the portable electronic device proximate the at least one electro-magnetic coil.

In one version of the embodiment, the circuit assembly further includes an electrical switch coupled to the cradle portion, the electrical switch activating the electrical drive signal when the cradle portion is positioned to accommodate the portable electronic device.

In one embodiment, the electrical drive signal is provided upon successful communication between the portable electronic device and a receiver disposed in the circuit assembly.

In one embodiment, an outer wall of the charging interface region or an outer wall of the wiring device region is parallel to a wall surface to which the wall plate assembly is mounted.

In one embodiment, circuit assembly includes a power supply circuit disposed in the electrical wiring device, the power supply circuit being coupled to at least one low voltage output port.

In one version of the embodiment, the at least one low voltage output port is disposed adjacent at least one receptacle disposed in the electrical wiring device region.

In one embodiment, the electrical wiring device includes a pair of mounting ears configured for attaching the electrical wiring device to an outlet box, the charging interface region not being disposed between the pair of mounting ears.

In one version of the embodiment, the outlet box is a single gang outlet box.

In one version of the embodiment, the circuit assembly includes a power supply circuit disposed in the electrical wiring device coupled to at least one low voltage output port disposed between the pair of mounting ears.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1C is a front isometric view of the electrical wiring assembly depicted in FIG. 1A with a portable electronic device in a charging position;

FIG. 1D is a side elevation view of the electrical wiring assembly depicted in FIG. 1A with the portable electronic device in the charging position;

FIG. 1E is another side elevation view of the electrical wiring assembly depicted in FIG. 1A with the portable electronic device in the charging position;

FIG. 11A is a front isometric view of an electrical wiring device in accordance with an embodiment of the invention;

FIG. 11B is a rear isometric view of the electrical wiring device depicted in FIG. 11A;

FIG. 11C is an exploded view of the electrical wiring device depicted in FIG. 11A;

DETAILED DESCRIPTION

Figure 1A:
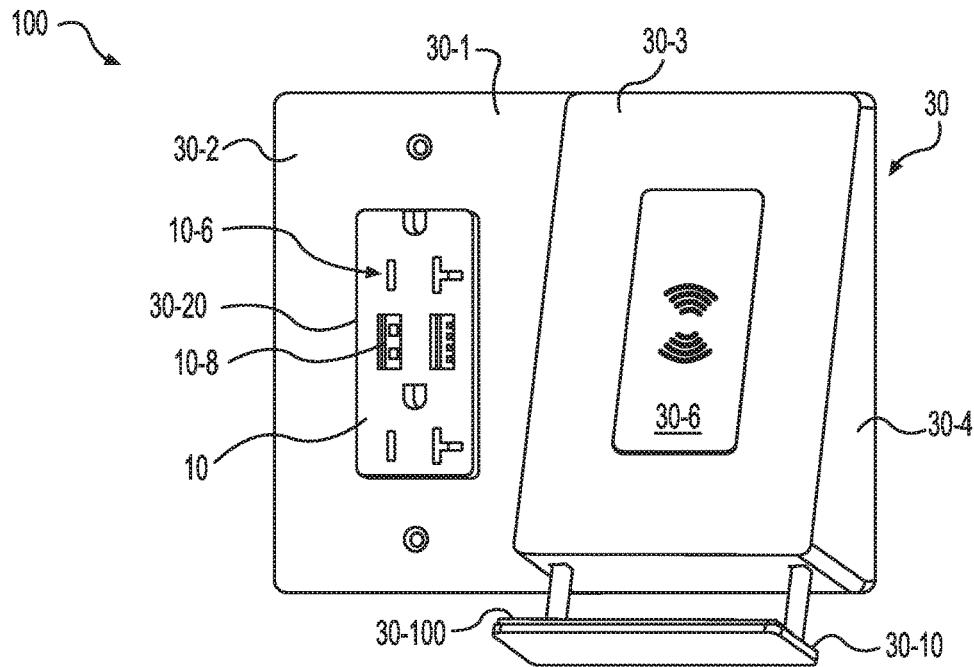
FIG. 1A is a front isometric view of an electrical wiring assembly in accordance with an embodiment of the invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical assembly of the present invention is shown in FIG. 1A, and is designated generally throughout by reference numeral 100.

In accordance with the invention, the present invention for an electrical wiring assembly 100 may include an electrical wiring device 10 that is configured to be mounted to a device box. A set of electrical terminals 10-14 are at least partially disposed in the device housing configured for connection to AC distribution wires in the device box. The assembly includes a wall plate assembly 30, a wall plate housing assembly 300 or a wall box assembly 300 that is configured to accommodate the electrical wiring device 10. The wall plate assembly 30 may further include a wall plate 30-1 for the electrical wiring device that may be integrally formed with an antenna housing 20-2. The wall plate 30-1 may be coupled to the antenna housing back body 20-2 to thus enclose an antenna assembly 20 therein. The antenna assembly 20 may further include a circuit assembly 20-1 that has at least one electro-magnetic coil 20-10 disposed within the antenna housing 20-2. The circuit assembly 20-1 is configured to be coupled to the set of electrical terminals 10-14 so that the electro-magnetic coil 20-10 propagates a magnetic field via the wall plate portion 30-1.

Embodiments of the electrical wiring assembly of the present invention may include some or all of the following components:

Parts List

| Ref. No. | Component Description | Ref. No. | Component Description |
|---|---|---|---|
| 100 | Electrical Wiring Assembly | 40 | Low Voltage supply cord |
|  |  | 50 | AC power Cord |
|  |  | 60 | AC Power Connection Fingers |
| 1 | Portable electronic device | 70 | Cradle |
| 2 | Fastener(s) | 70-1 | Cradle gripper |
| 3 | Rear wall mount | 70-2 | Bottom Portion |
| 4 | PSA | 70-3 | Portable device cradle |
|  |  | 70-4 | Cradle pad |
|  |  | 70-5 | Cradle Ledge |
|  |  | 70-6 | Cradle Grippers |
|  |  | 70-7 | Cradle rack |
|  |  | 70-8 | Cradle pinion |
|  |  | 70-9 | Cradle spring |
| 10 | Electrical wiring device | 20 | Antenna Assembly |
| 10-2 | Back Body | 20-1 | Circuit Ass'y |
| 10-4 | Front cover | 20-2 | Antenna back body |
| 10-6 | 20A receptacle | 20-20 | Antenna Back Body plug opening |
| 10-8 | USB Port | 20-22 | Ratchet Recess |
| 10-12 | Mounting Ears | 20-26 | Hinge slot |
| 10-14 | Wiring terminals | 20-24 | Ratchet Steps |
| 10-16 | AC/Low power conversion Ass'y | 20-4 | Antenna PCB |
| 10-160 | DC Power Jacks | 20-40 | Antenna plug Receptacle |
| 10-161 | AC PCB Ass'y | 20-6 | Shielding Structure |
| 10-162 | Side Stop member | 20-8 | Antenna lead |
| 10-164 | Insulator tray | 20-9 | Embedded Controller |
| 10-166 | Push release mechanism (not used) | 20-10 | Electro-magnetic coil |
|  |  | 20-10-1 | Electro-magnetic coil No. 1 |
| 11 | Electric wall switch device | 20-10-2 | Electro-magnetic coil No. 2 |
|  |  | 20-10-3 | Electro-magnetic coil No. 3 |
|  |  | 20-11 | Communications Interface |
|  |  | 20-12 | Memory |
|  |  | 20-13 | Sensor |
| 30 | Wall Plate Assembly | 30-14 | wall plate |
| 30-1 | Wall plate | 30-142 | Screwless wall plate frame |
| 30-2 | Wall plate portion for electrical device | 30-144 | Wall plate hinge |
|  |  | 30-16 | Recessed wall plate compartment |
| 30-20 | Electrical device opening | 30-160 | Recessed Electrical device opening |
| 30-3 | Wall plate portion for Antenna |  |  |
| 30-20 | Frame opening | 30-162 | Recessed antenna device opening |
| 30-34 | Frame |  |  |

-continued

Parts List

| Ref. No. | Component Description | Ref. No. | Component Description |
| --- | --- | --- | --- |
| 30-4 | Side wall | 30-34 | Frame |
| 30-6 | Antenna logo plate | | |
| 30-60 | Antenna logo recess | | |
| 30-8 | Ratchet | | |
| 30-80 | Ratchet Catch | | |
| 30-9 | Snap elements | | |
| 300 | Wall Plate Housing Assembly | 3000 | Wall box assembly |
| 300-2 | Back body sub-plate | 3000-1 | Interior compartment |
| 300-20 | Electrical wiring device opening | 3000-2 | Wall box frame |
| 300-20-1 | Recessed Region for terminals | 3000-4 | Mounting surface |
| 300-22 | Antenna frame opening | 3000-6 | Frame member |
| 300-24 | Wiring terminal opening | 3000-8 | Oblique device opening |
| 300-26 | Antenna back body | 3000-10 | Frontal device opening |
| 300-28 | Mounting hinge | 3000-12 | Mounting elements |
| 300-3 | Pivot Antenna housing | | |
| 300-4 | Front wall plate cover | | |
| 300-40 | Wiring terminal | | |
| 300-42 | Pigtail wires for wiring | | |
| 300-44 | AC power input receptacle | | |
| 300-5 | Fastener aperture | | |
| 300-6 | Antenna logo plate | | |
| 300-60 | Antenna logo recess | | |
| 300-7 | Wall mount catch | | |
| 300-8 | Electrical wiring device opening | | |
| 300-10 | Assembly frame | | |
| 300-12 | Cradle ledge | | |
| 300-14 | Cradle pad | | |
| 300-30 | Antenna housing opening | | |
| 300-23 | Hinge slots | | |
| 300-32 | Upright posts | | |

As embodied herein, and depicted in FIG. 1A, a front isometric view of an electrical wiring assembly 100 in accordance with an embodiment of the invention is disclosed. The electrical assembly includes a wall plate assembly 30 that is configured to accommodate an electrical wiring device 10 and an antenna assembly 20 (not shown in this view). The wall plate assembly 30 includes an integrally formed wall plate 30-1 that further includes an electrical wiring device wall plate portion 30-2 and an antenna assembly wall plate portion 30-3. The integrally formed wall plate also includes a side wall 30-4 that has a substantially triangular (in actuality, it has a pentagonal shape; two of the minor sides function as stand-offs); i.e., it includes a first major side that is configured to abut a wall surface and a second major side that extends at an angle so that the antenna wall plate portion 30-3 is inclined.

The wall plate assembly 30 also includes a device cradle 30-10 that includes a cradle pad 30-100. The cradle pad 30-100 is comprised of a material that has a relatively high coefficient of friction. An antenna logo plate 30-6 is disposed on the antenna assembly wall plate portion 30-3 within a recessed portion (30-60). The plate 30-6 is also comprised of a material that has a relatively high coefficient of friction. Thus, a portable electronic device under charge that is resting in the cradle 30-10 and propped against the antenna wall plate portion 30-3 will remain in place (due to the frictional forces exceeding gravitational forces).

The electrical wiring device wall plate portion 30-2 has an opening 30-20 formed therein to accommodate the electrical wiring device 10. According to the present invention, an electrical wiring device may be configured as an outlet receptacle or as a protective device, such as a ground fault circuit interrupter (GFCI), an arc fault circuit interrupter (AFCI), a transient voltage surge suppressor (TVSS), or a surge protective device (SPD). Other electrical wiring device examples include dimmers, fan speed controls, night lights, low voltage ports, or USB ports. Finally, each of these wiring device types may be found in mix-and-match combinations with other kinds of these wiring devices. For example, a GFCI/AFCI combination device may be included within a single housing. The example in FIG. 1A shows an outlet receptacle and a USB combination.

Figure 1B:
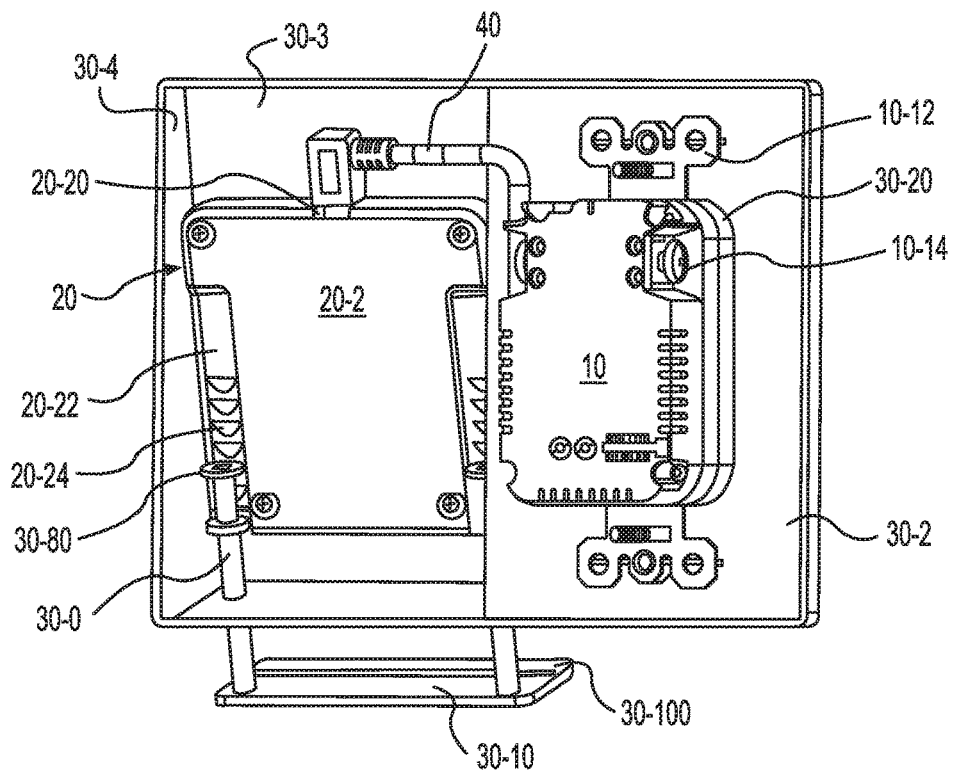
FIG. 1B is a rear isometric view of the electrical wiring assembly depicted in FIG. 1A.

Referring to FIG. 1B, a rear isometric view of the electrical wiring assembly 100 depicted in FIG. 1A is disclosed. The electrical wiring device 10 is shown extending through the opening 30-20 so that the wiring terminals are accessible for AC wiring. In practice, the electrical wiring device 10 is mounted to a single gang device box via the mounting ears 10-12 after the AC wiring is connected to the wiring terminals. In this embodiment, the electrical wiring device includes a pair of 15 A/20 A receptacles 10-6 and a pair of USB ports 10-8 for charging the portable device by way of cord terminated with a USB plug when inserted in one of the ports 10-8. The USB ports 10-8 are powered by an AC/DC converter circuit inside electrical wiring device 10 (not shown). A DC power cord 40 is coupled to the AC/DC converter via an opening in the side of the electrical wiring device 10. The opposite end of the cord 40 includes a plug that is configured to be inserted into the antenna plug opening 20-20 disposed at the top end of the antenna back body 20-2. In an alternate embodiment, the wiring device 10 has a socket in its side wall that is coupled to the AC/DC converter and cord 40 includes plugs at both ends for interconnecting the two sockets (not shown.) In another embodiment, cord 40 passes through an opening in antenna back body 20-2 and is terminated with a plug that mates with a socket in wiring device 10.

Of course, the antenna back body 20-2 is configured to form a rear volume together with the antenna wall plate portion 30-3 and the side wall 30-4. Moreover, the antenna back body 20-2 is configured to be connected to the inside of the antenna wall plate portion 30-3 to complete the antenna assembly 20 enclosure.

Note that the portable device cradle 30-10 is coupled to a ratchet member 30-8 on each side thereof. The ratchet members 30-8 allow the cradle 30-10—and hence the portable device 1—to be adjusted up or down so that the antenna coil in the antenna housing 20-2 substantially aligns with the antenna coil disposed in the portable device 1. Specifically, each ratchet 30-8 is disposed within a recess 20-22 formed in a side portion of the antenna back body 20-2. Each ratchet 30-8 also includes a catch element 30-80 disposed on the ratchet 30-8 end opposite the cradle 30-10. The catch member 30-80 is configured to move between the ratchet steps 20-24 that are formed in the ratchet recess regions 20-22.

Referring to FIG. 1C, a front isometric view of the electrical wiring assembly 100 depicted in FIG. 1A is disclosed with a portable electronic device in a charging position. This view is identical to FIG. 1A with the exception that a portable device 1 (e.g., a cell phone) is shown resting on the cradle 30-10.

Referring to FIG. 1D, a side elevation view of the electrical wiring assembly 100 depicted in FIG. 1A is disclosed. In this view, a portable electronic device is shown in the charging position. As noted above, the side wall 30-4 has a substantially triangular (again, it actually has a pentagonal shape; but two of the smaller sides function as stand-offs) shape; thus, the antenna wall plate 30-3 is inclined at an angle $\theta$ relative to the substantially vertical wall surface. The angle $\theta$ may be within a range substantially between 0° and 20°. Referring to FIG. 1E, another side elevation view of the electrical wiring assembly 100 depicted in FIG. 1A is disclosed. Again, the portable electronic device is shown in the charging position.

Figure 1F:
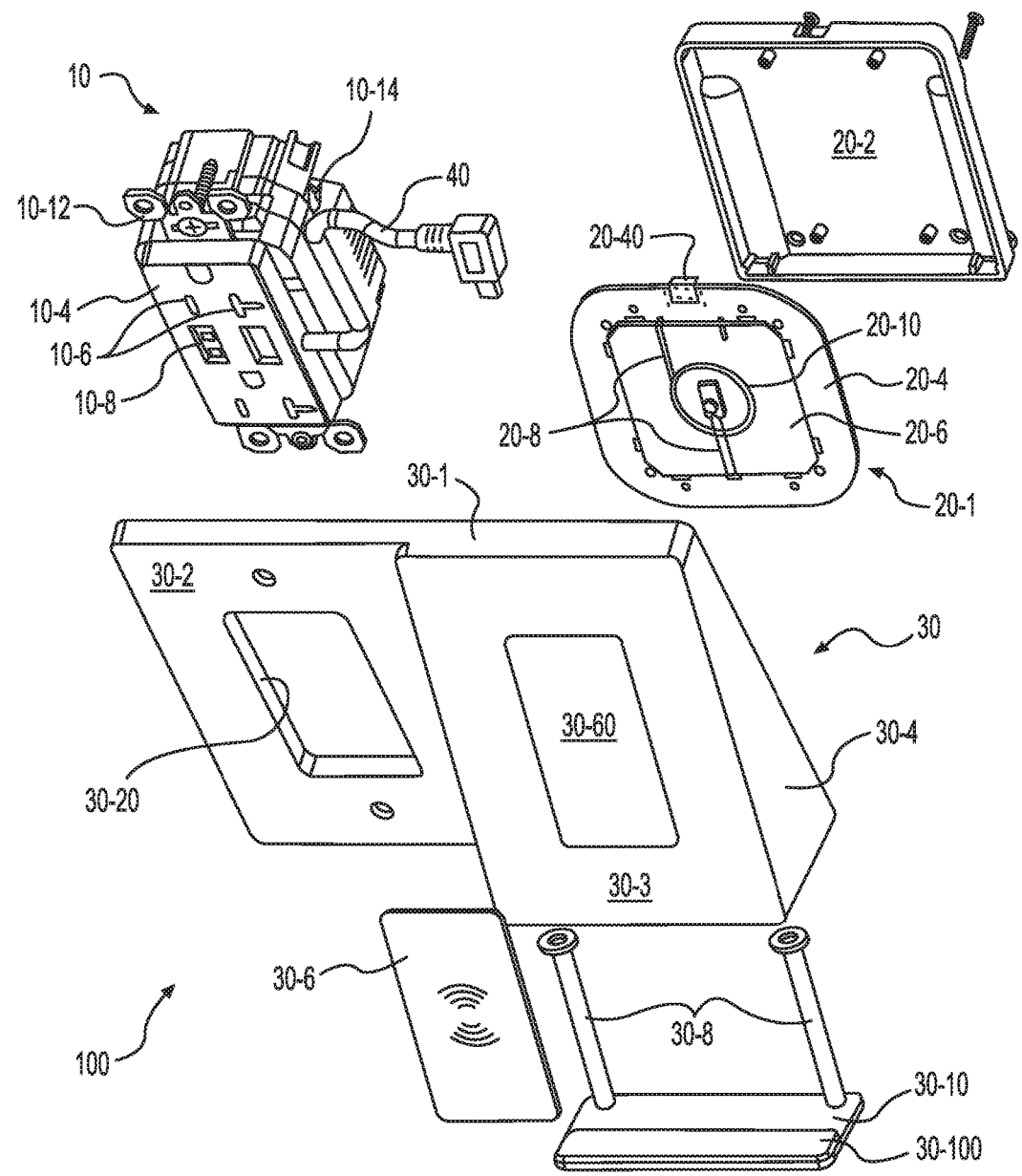
FIG. 1F is an exploded view of the electrical wiring assembly depicted in FIG. 1A.
Figure 2A:
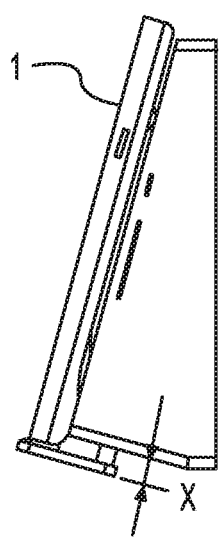
FIGS. 2A-2E are side elevation views of the electrical wiring assembly depicted in FIG. 1A illustrating an adjustable ratcheting feature.
Figure 2B:
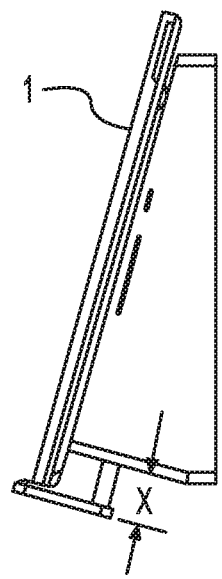
Figure 2C:
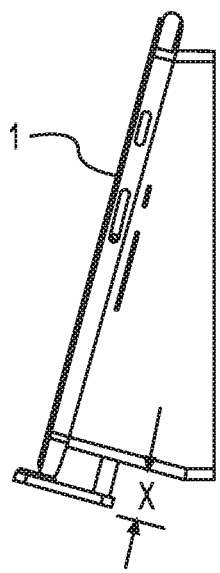
Figure 2D:
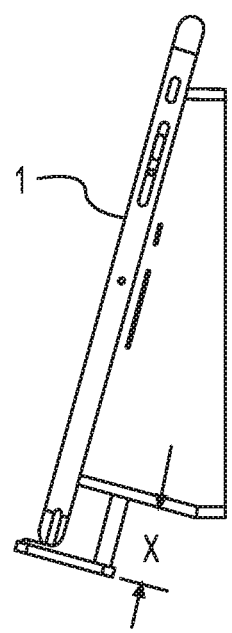
Figure 2E:
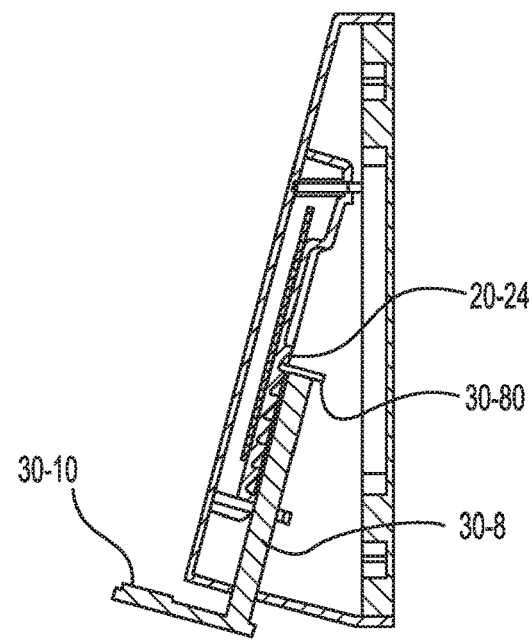

As embodied herein and depicted in FIG. 1F, an exploded view of the electrical wiring assembly 100 depicted in FIG. 1A is shown. This view shows with more clarity the wall plate 30-1 that further includes an electrical wiring device wall plate portion 30-2 that is integrally formed with the antenna assembly wall plate portion 30-3. The wall plate portion 30-3 includes a recessed region 30-60 that is configured to accommodate the antenna bearing plate 30-6. The antenna housing 20-2 includes a circuit assembly 20-1 that is disposed within the space formed by the antenna back body member 20-2 and the interior wall of plate 30-3. The antenna housing 20-2 is further protected by the side wall 30-4.

The circuit assembly 20-1 includes a printed circuit board (PCB) 20-4. The PCB 20-4 includes various control circuits (not visible in this view) disposed on the back side thereof. The front side includes a shielding structure 20-6 that accommodates a single antenna coil 20-10. The shielding structure 20-6 prevents a magnetic field from heating any metallic structures behind the assembly 100 (e.g., a metallic device box or electronic components). The PCB 20-4 also includes a plug receptacle 20-40 that is configured to accommodate the plug from the DC supply cord 40. Specifically, the DC supply cord will provide a DC supply voltage (e.g., +5 DCV) for the antenna coil and the control circuitry.

The other components of the assembly 100 were described above in detail and thus any further description would be repetitive and superfluous.

Referring to FIGS. 2A-2E, side elevation views of the electrical wiring assembly 100 depicted in FIG. 1A are shown to illustrate the adjustable ratcheting mechanism 30-8. In these views, the distance between the bottom of the wall plate 30-1 and the top surface of cradle 30-8 is shown as dimension "x". The dimension x can be made to vary depending on the size of the portable electronic device 1 disposed on the cradle. In other words, in a single antenna coil embodiment, the user may desire to adjust the x dimension so that the primary and secondary coils (i.e., the charger coil 20-10 and the portable device coil) are in close proximity to each other.

Figure 3A:
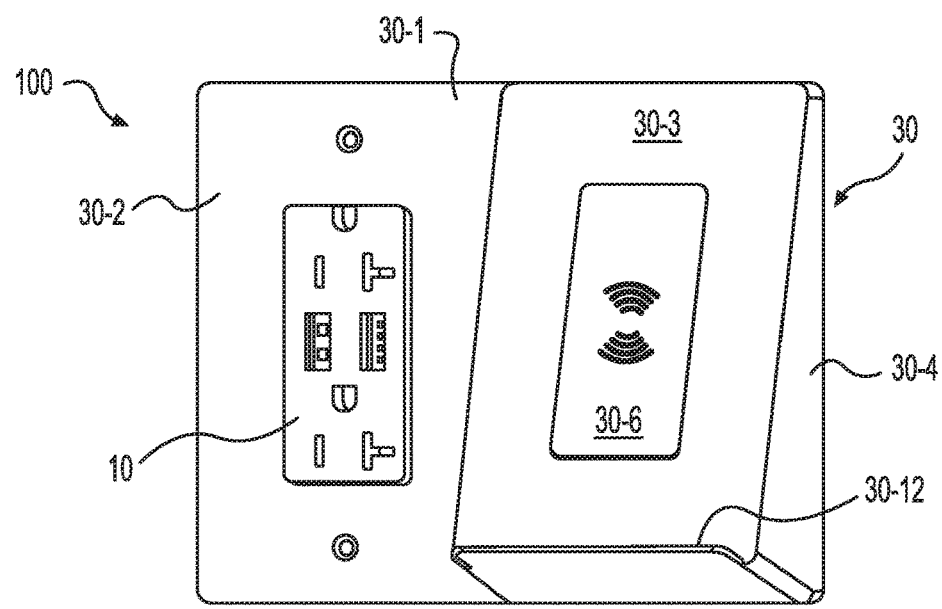
FIG. 3A is a front isometric view of an electrical wiring assembly in accordance with another embodiment of the invention.

As embodied herein, and depicted in FIG. 3A, a front isometric view of an electrical wiring assembly 100 in accordance with an embodiment of the invention is disclosed. As before, the electrical assembly 100 includes a wall plate assembly 30 that is configured to accommodate an electrical wiring device 10 and an antenna assembly 20 (not shown in this view). The wall plate assembly 30 includes an integrally formed wall plate 30-1 that is configured to include an electrical wiring device wall plate portion 30-2 and an antenna assembly wall plate portion 30-3. The integrally formed wall plate 30-1 also includes a side wall 30-4 has a substantially triangular shape so that the antenna wall plate 30-3 is inclined. The electrical wiring device wall plate portion 30-2 has an opening 30-20 formed therein to accommodate the electrical wiring device 10.

The wall plate assembly 30 also includes a device cradle ledge 30-12 that again includes a cradle pad 30-100. The cradle pad 30-100 is comprised of a material that has a relatively high coefficient of friction. As before, the antenna logo plate 30-6 is disposed on the antenna assembly wall plate portion 30-3 within a recessed portion (30-60). The plate 30-6 is also comprised of a material that has a relatively high coefficient of friction. Thus, a portable electronic device under charge that is resting in the cradle ledge 30-12 and propped against the antenna wall plate 30-3 will remain in place (due to the frictional forces exceeding gravitational forces). As described below, the antenna housing includes three primary coils that are configured to provide a more robust magnetic field, thus the need for an adjustable cradle is eliminated.

Figure 3B:
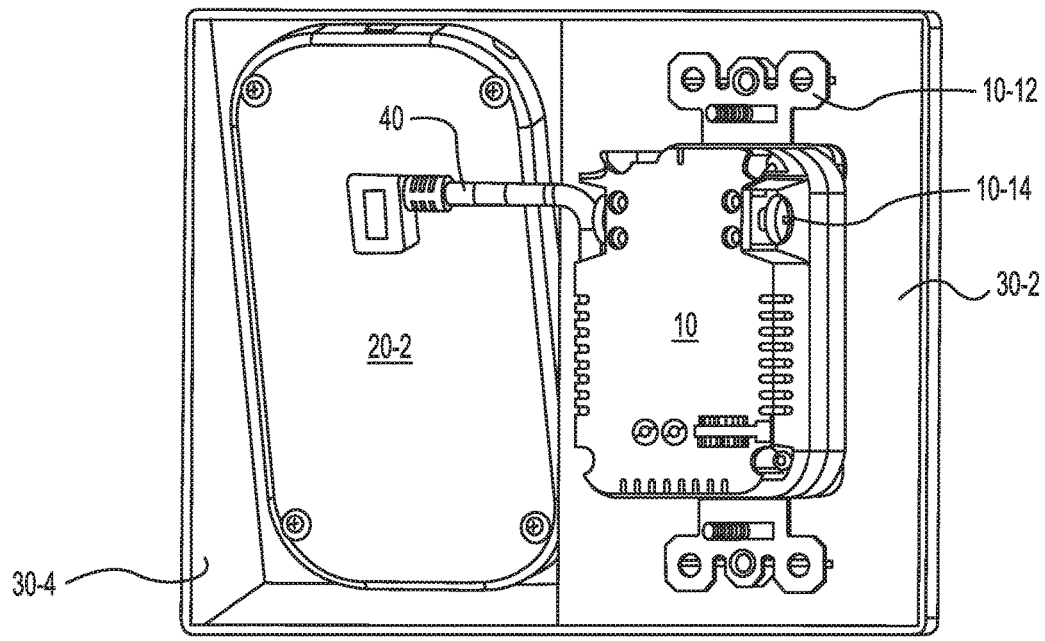
FIG. 3B is a rear isometric view of the electrical wiring assembly depicted in FIG. 3A.

Referring to FIG. 3B, a rear isometric view of the electrical wiring assembly depicted in FIG. 3A is disclosed. The electrical wiring device 10 extends through the opening 30-20 so that the wiring terminals are accessible for AC wiring. During installation, the electrical wiring device 10 is mounted to the device box via the mounting ears 10-12 after the AC wiring is connected to the wiring terminals. In this embodiment, the electrical wiring device includes an AC/DC converter circuit (not shown). A DC power cord 40 is coupled to the AC/DC converter via an opening or a socket in the side of the electrical wiring device 10. The opposite end of the cord 40 includes a plug that is configured to be inserted into the antenna plug opening 20-20 disposed at the top end of the antenna back body 20-2. The antenna back body 20-2 is configured to form a rear volume together with the front antenna wall plate portion 30-3 and the side wall 30-4. Moreover, the antenna back body 20-2 is configured to be connected to the inside of the antenna wall plate portion 30-3 to complete the antenna assembly 20 enclosure.

Figures 3C, 3D:
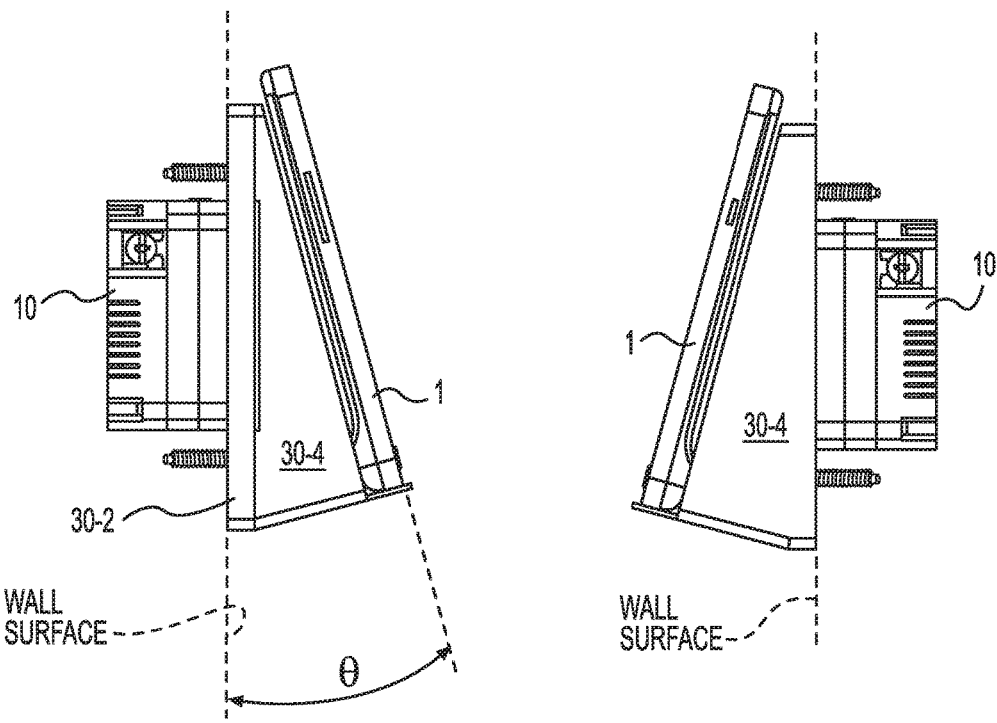
FIG. 3C is a side elevation view of the electrical wiring assembly depicted in FIG. 3A with the portable electronic device in the charging position.
FIG. 3D is another side elevation view of the electrical wiring assembly depicted in FIG. 3A with the portable electronic device in the charging position.

Referring to FIG. 3C, a side elevation view of the electrical wiring assembly 100 depicted in FIG. 3A is disclosed. In this view, a portable electronic device is shown in the charging position. The antenna wall plate 30-3 is again inclined at an angle $\theta$ relative to the wall surface by virtue of the shape of the side wall 30-4. The angle $\theta$ may be within a range substantially between 0° and 20°. Referring to FIG. 3D, another side elevation view of the electrical wiring assembly 100 depicted in FIG. 3A is disclosed. Again, the portable electronic device is shown in the charging position.

Figure 3E:
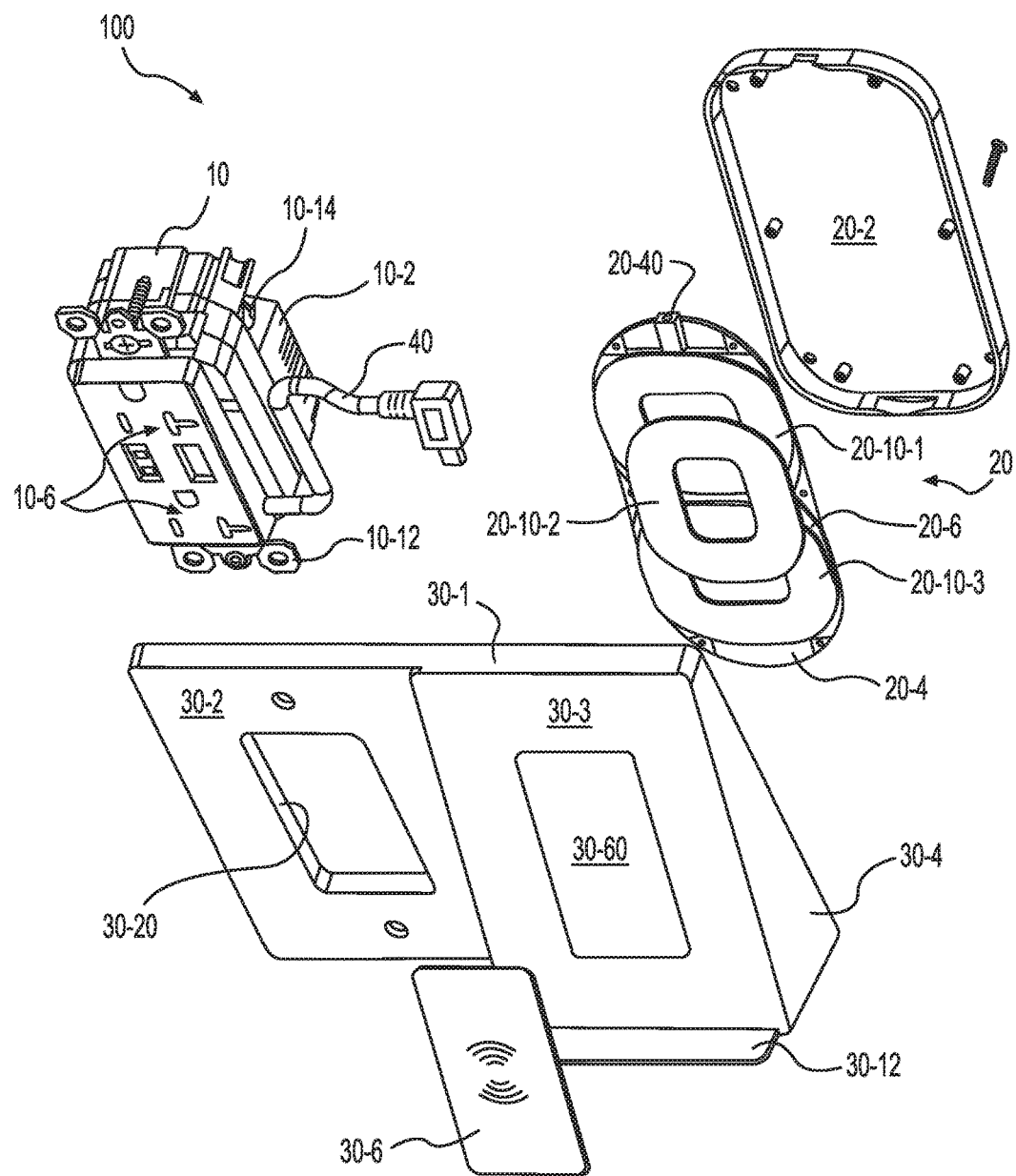
FIG. 3E is an exploded view of the electrical wiring assembly depicted in FIG. 3A.

Referring to FIG. 3E, an exploded view of the electrical wiring assembly 100 depicted in FIG. 3A is disclosed. This view shows the wall plate 30-1 with more clarity. Again, the electrical wiring device wall plate portion 30-2 is integrally formed with the antenna assembly wall plate portion 30-3. The wall plate portion 30-3 includes a recessed region 30-60 that is configured to accommodate the antenna bearing plate 30-6. The cradle ledge 30-12 is disposed along the bottom edge of plate 30-3.

The antenna housing 20-2 includes a circuit assembly 20-1 that is disposed within the space formed by the antenna back body member 20-2 and the interior wall of plate 30-3. The antenna housing 20-2 is further protected by the side wall 30-4.

The circuit assembly 20-1 includes a printed circuit board (PCB) 20-4. The PCB 20-4 includes various control circuits (not visible in this view) disposed on the back side thereof. The front side includes a shielding structure 20-6 that accommodates a plurality of antenna coils 20-10. The shielding structure 20-6 prevents a magnetic field from heating any metallic structures behind the assembly 100 (e.g., a metallic device box or an electronic component). In the example shown in this view, the antenna is comprised on three coils (20-10-1, 20-10-2, and 20-10-3). Again, the PCB 20-4 also includes a plug receptacle 20-40 that is configured to accommodate the plug from the DC supply cord 40. Specifically, the DC supply cord will provide a DC supply voltage (e.g., +5 DCV) for the antenna coil and the control circuitry.

Figure 4A:
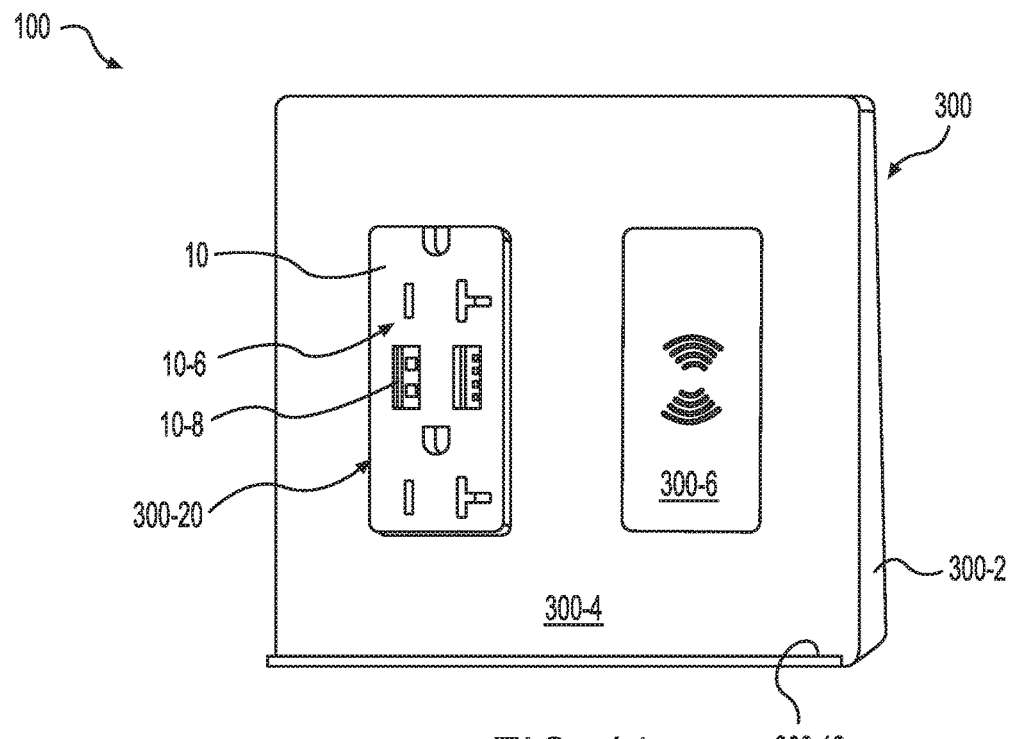
FIG. 4A is a front isometric view of an electrical wiring assembly in accordance with another embodiment of the invention.

As embodied herein and depicted in FIG. 4A, a front isometric view of an electrical wiring assembly 100 in accordance with another embodiment of the invention is disclosed. In this embodiment the electrical assembly 100 includes a wall plate housing assembly 300. The wall plate housing assembly 300 includes a back body sub-plate 300-2 coupled to a single wall plate cover 300-4 to form the wall plate housing assembly 300. The electrical wiring device 10 and the antenna assembly 20 (not shown in this view) are substantially disposed within the housing 300. Note that the rear portion of the electrical wiring device is open at the rear to allow for access to the AC wiring terminals 10-14. The back body sub-plate 300-2 includes a side wall that has a substantially triangular shape so that the entire wall plate cover 300-4 is inclined relative to the mounting (wall) surface. The wall plate cover 300-4 has an opening 300-20 formed therein to accommodate the electrical wiring device 10, and a recessed portion 300-60 configured to retain the antenna logo plate 300-6.

The wall plate cover 300-4 also includes a device cradle ledge 300-12 at least below the antenna assembly 20 end of wall plate cover 300-4 and a cradle pad 300-14. The antenna logo plate 300-6 is disposed on the wall plate cover 300-4 within a recessed portion (30-60) for identifying the position of the antenna assembly 20 within the housing 300. The plate 300-6 is comprised of a material that has a relatively high coefficient of friction for the reasons provided above. As described below, the antenna housing includes three primary coils that are configured to provide a more robust magnetic field, thus the need for an adjustable cradle is eliminated.

Figure 4B:
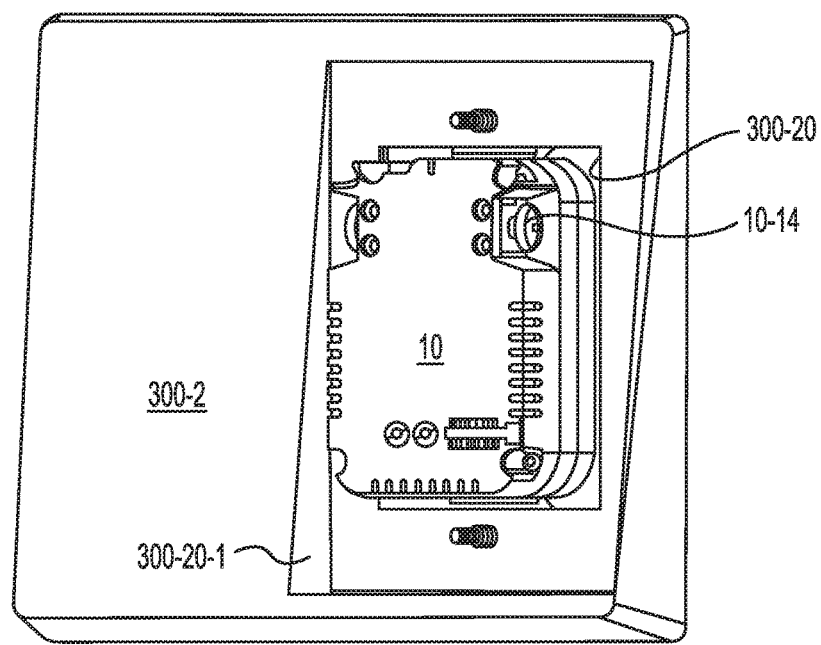
FIG. 4B is a rear isometric view of the electrical wiring assembly depicted in FIG. 4A.

Referring to FIG. 4B, a rear isometric view of the electrical wiring assembly 100 depicted in FIG. 4A is disclosed. The electrical wiring device 10 extends through the opening 300-20 into recessed region 300-20-1 so that the wiring terminals 10-14 are accessible for AC wiring. As before, the electrical wiring device 10 is mounted to the device box after the AC wiring is connected to the wiring terminals 10-14.

Figure 4C:
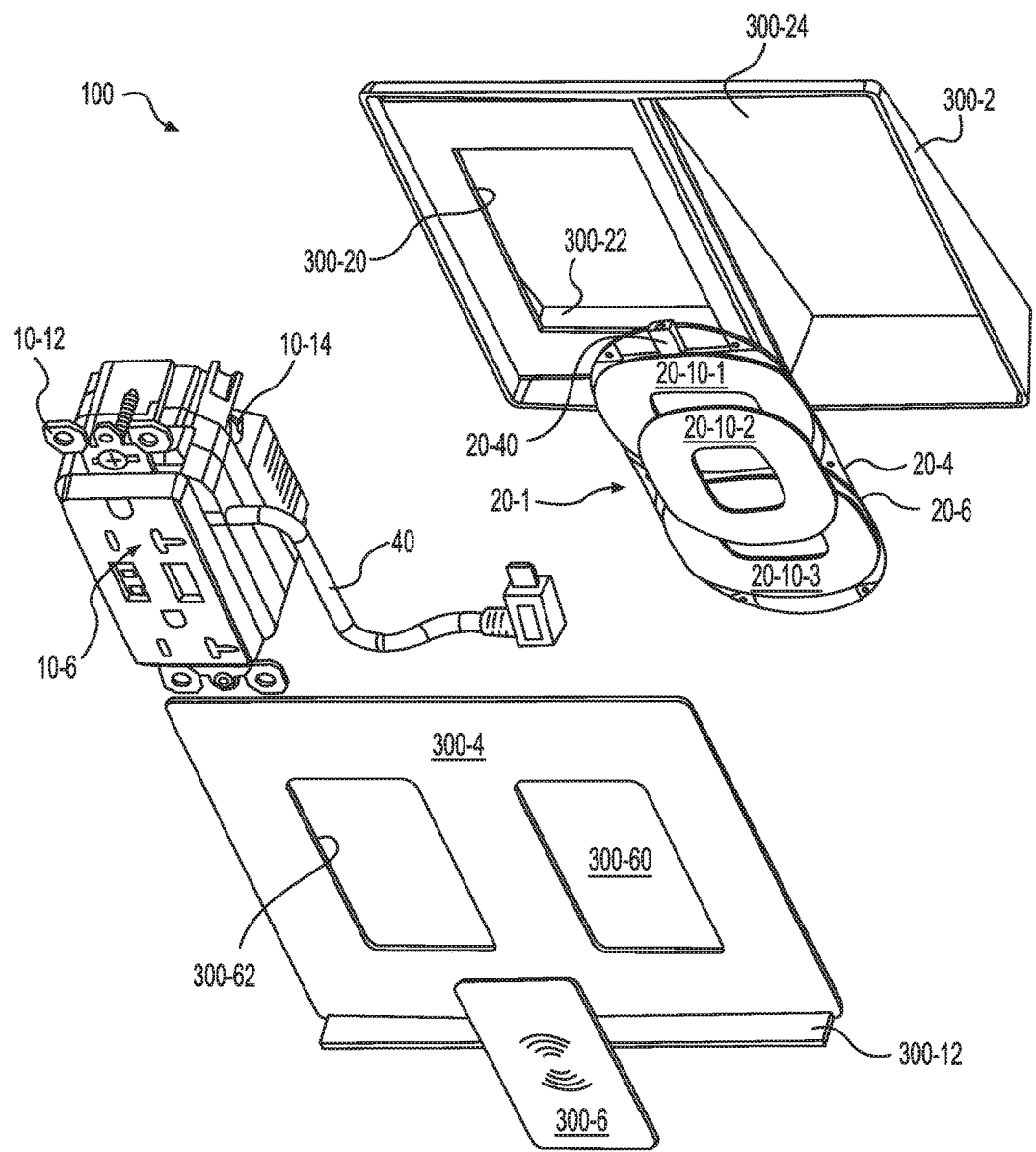
FIG. 4C is an exploded view of the electrical wiring assembly depicted in FIG. 4A.

Referring to FIG. 4C, an exploded view of the electrical wiring assembly depicted in FIG. 4A is disclosed. The wall plate housing 300 is shown to include a rear sub-plate 300-2 that includes an electrical wiring device portion and an antenna housing portion 300-24. The electrical wiring device portion is shown to include the device opening 300-20 and the rear recessed region 300-20-1. The antenna housing portion 300-24 takes the place of the antenna back body 20-2 used in the previous embodiments. In other words, the antenna assembly 20 is disposed directly within the housing compartment 300-24. The front wall plate cover 300-4 is disposed over the sub-plate frame 300-2 to complete the enclosure. Like previous embodiments, the front cover 300-4 includes a recessed region 300-60 that is configured to accommodate the antenna logo plate 300-6. A cradle ledge 300-12 is disposed along at least a portion of the bottom edge of the front cover 300-4.

The antenna housing 20-2 includes a circuit assembly 20-1 that is disposed within the space formed between the housing compartment 300-24 and the interior wall of the front wall plate cover 300-4. The circuit assembly 20-1 includes a printed circuit board (PCB) 20-4 that has various control circuits (not visible in this view) disposed on the back side thereof. The front side includes a shielding structure 20-6 that accommodates a plurality of antenna coils 20-10. The shielding structure 20-6 prevents a magnetic field from heating any metallic structures behind the assembly 100 (e.g., a metallic device box or an electronic component). In the example shown in this view, the antenna is comprised on three coils (20-10-1, 20-10-2, and 20-10-3). As before, the PCB 20-4 also includes a plug receptacle 20-40 that is configured to accommodate the plug from the DC supply cord 40. Specifically, the DC supply cord will provide a DC supply voltage (e.g., +5 VDC for the antenna coil and the control circuitry). Note that the electrical wiring device in FIG. 4C does not include USB ports 10-8. While the high voltage to low voltage (i.e., AC/DC, AC/AC or DC/DC) converter circuitry can provide low voltage to both the USB ports 10-18 and the antenna assembly, it need not provide the USB ports 10-18. This optional embodiment is depicted in FIG. 4C and elsewhere in the drawing Figures.

Figure 5A:
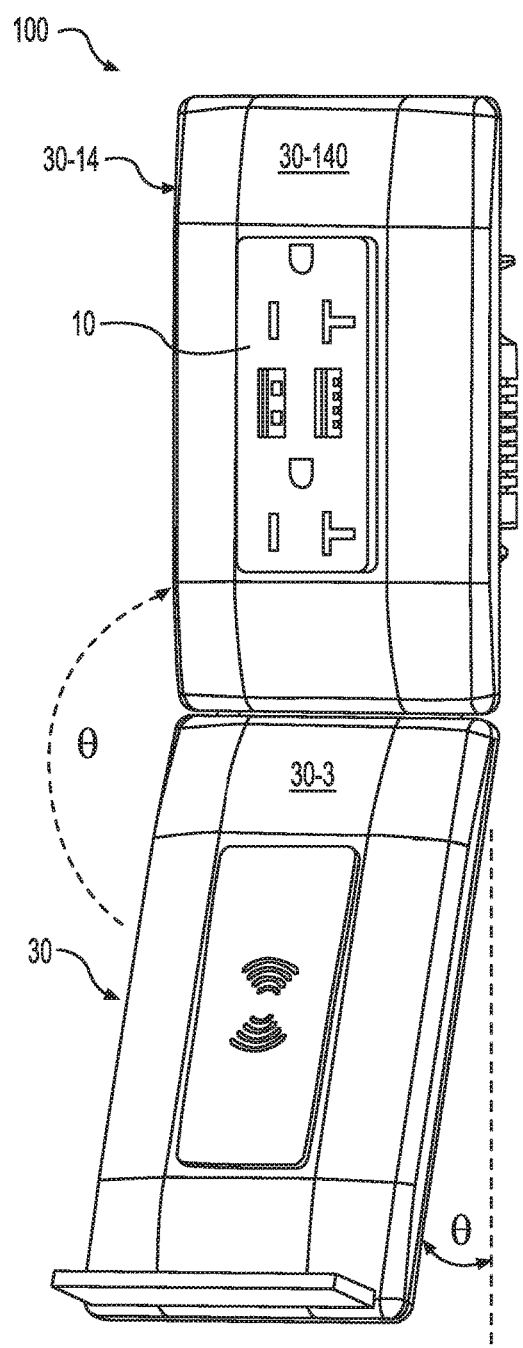
FIG. 5A is a front isometric view of an electrical wiring assembly in accordance with another embodiment of the invention.

Referring to FIG. 5A, a front isometric view of an electrical wiring assembly in accordance with another embodiment of the invention is disclosed. In this embodiment, the electrical assembly 100 includes an antenna wall plate assembly 30 that is arranged vertically. To be specific, the wall plate assembly 30 includes a wall plate 30-14 that is coupled to that antenna back plate 20-2 by a hinge element 30-144. The antenna assembly 20 is disposed between the antenna back plate 20-2 and the antenna wall plate 30-3. In one embodiment, the antenna wall plate assembly 30 is configured to rotate outwardly from a position that is substantially flush with the wall surface so that it is inclined at an inclination angle $\theta$ relative to the wall surface. The inclination angle $\theta$ is within a range between 0° and about 20°. In another embodiment, the antenna wall plate assembly 30 rotates from a closed "stowed" position where the assembly substantially hides wiring device 10 to an open "in use" position where the antenna wall plate assembly 30 is inclined at an inclination angle $\theta$ relative to the wall. In this embodiment, the antenna wall plate assembly 30 rotates downwardly by an angle $\varphi$ so that it is inclined at an inclination angle $\theta$ relative to the wall surface. Thus, the rotation angle φ is within a range between 0° and about 160°. Thus, as one might expect, the sum of the angles θ, φ should be about 180°.

The antenna wall plate 30-3 again includes a device cradle ledge 30-12 that again includes a cradle pad 30-100. The cradle pad 30-100 is comprised of a material that has a relatively high coefficient of friction. As before, the antenna logo plate 30-6 is disposed on the antenna wall plate 30-3 within a recessed portion (30-60). The logo plate 30-6 is also comprised of a material that has a relatively high coefficient of friction. Thus, a portable electronic device under charge that is resting in the cradle ledge 30-12 and propped against the antenna wall plate 30-3 will remain in place (due to the frictional forces exceeding gravitational forces). As described below, the antenna housing 20-2 includes three primary coils that are configured to provide a more robust magnetic field, thus the need for an adjustable cradle is eliminated.

Figure 5B:
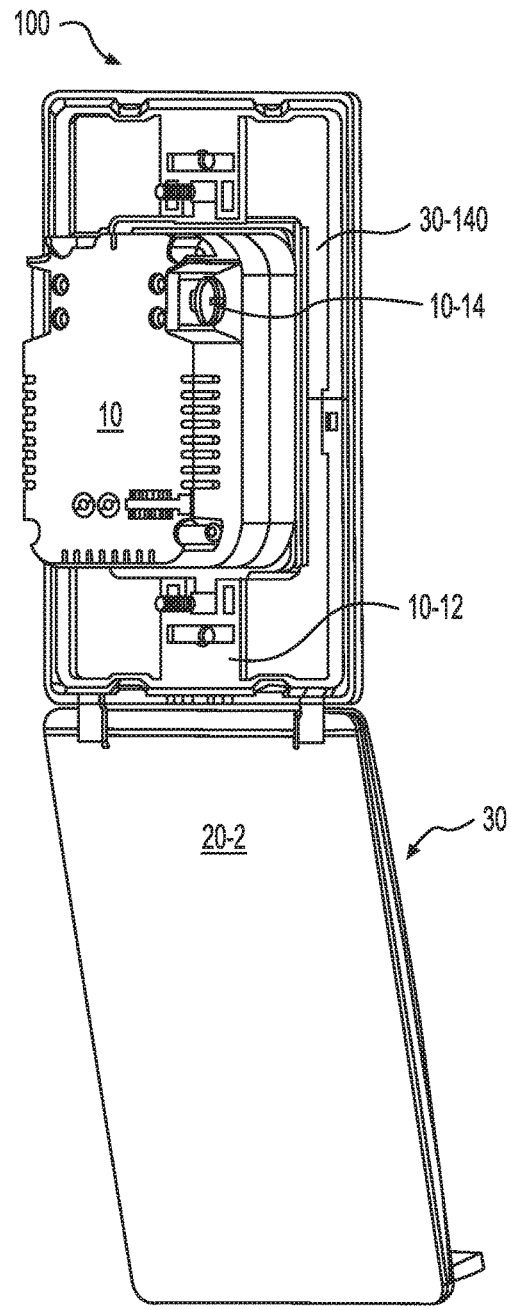
FIG. 5B is a rear isometric view of the electrical wiring assembly depicted in FIG. 5A.

Referring to FIG. 5B, a rear isometric view of the electrical wiring assembly depicted in FIG. 5A is disclosed. The electrical wiring device 10 extends through an opening in the electrical wiring device wall plate 30-14 so that the wiring terminals are accessible for AC wiring. Again, the electrical wiring device 10 is mounted to the device box by the mounting ears 10-12 after the AC wiring is connected to the wiring terminals. In this embodiment, the electrical wiring device includes an AC/low voltage converter circuit (not shown) so that a low voltage power cord 40 can be connected between the electrical wiring device 10 and the antenna wall plate assembly 30. The rear view of FIG. 5B clearly shows that antenna assembly mounting hinge 30-144 is coupled between the antenna back plate 20-2 and the lower mounting ear 10-12.

Figure 5C:
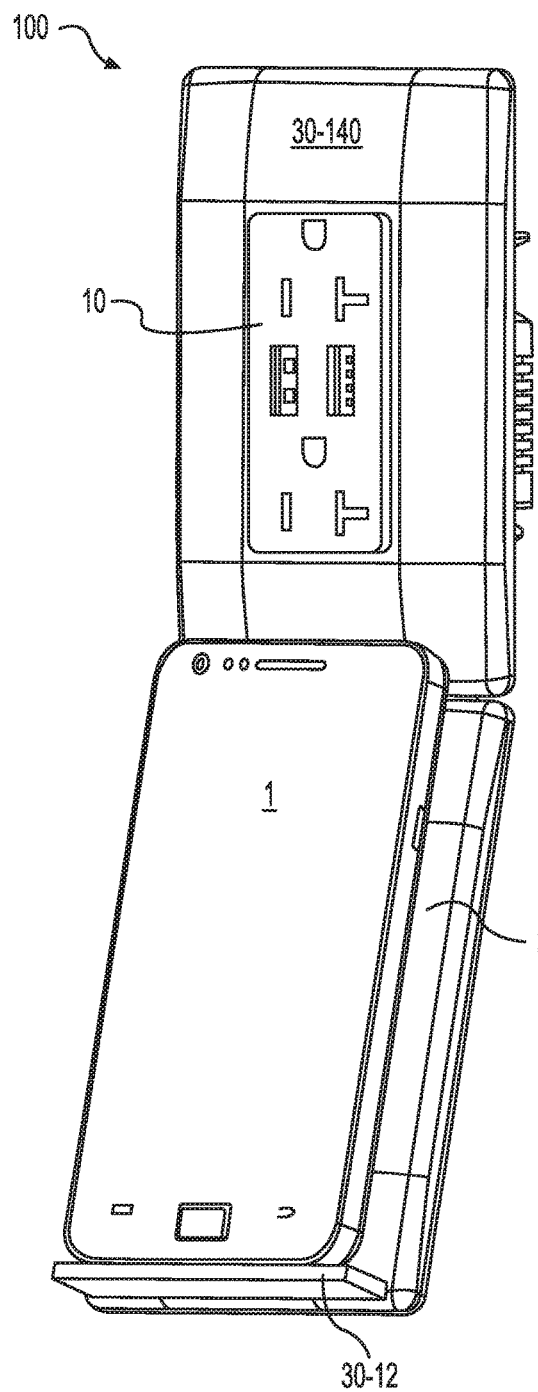
FIG. 5C is a front isometric view of the electrical wiring assembly depicted in FIG. 5A with a portable electronic device in a charging position.
Figure 5D:
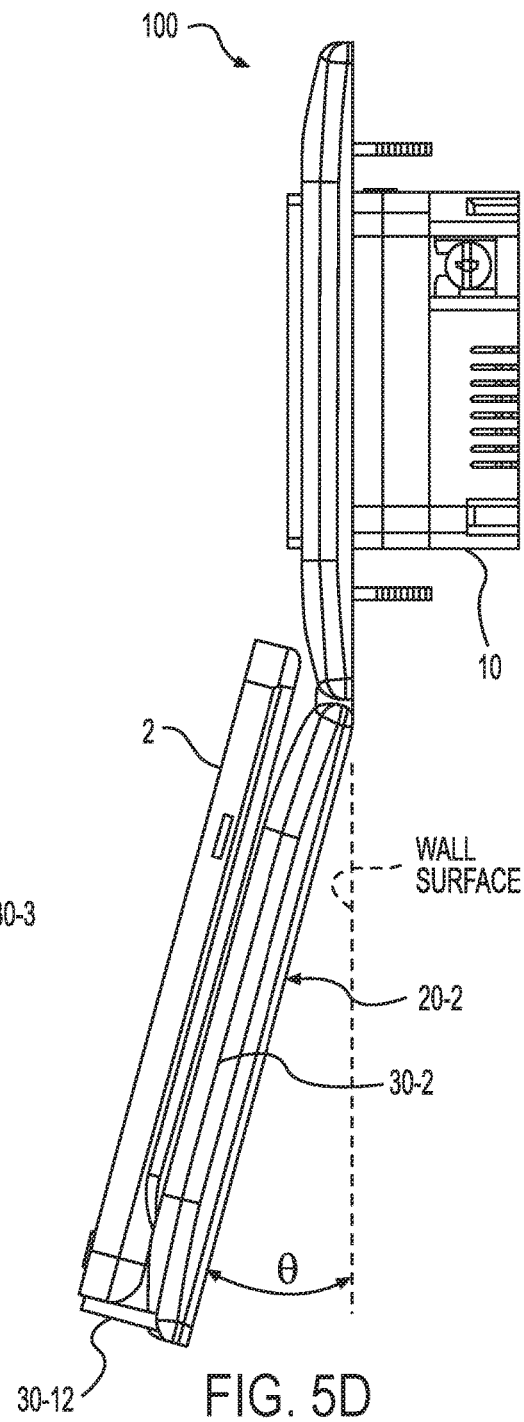
FIG. 5D is a side elevation view of the electrical wiring assembly depicted in FIG. 5A with the portable electronic device in the charging position.

Referring to FIG. 5C, a front isometric view of the electrical wiring assembly 100 depicted in FIG. 5A with a portable electronic device 1 in a charging position is disclosed. FIG. 5D is a side elevation view of the electrical wiring assembly 100 depicted in FIG. 5C; i.e., the electrical wiring assembly 100 is shown with the portable electronic device in the charging position.

Figure 5E:
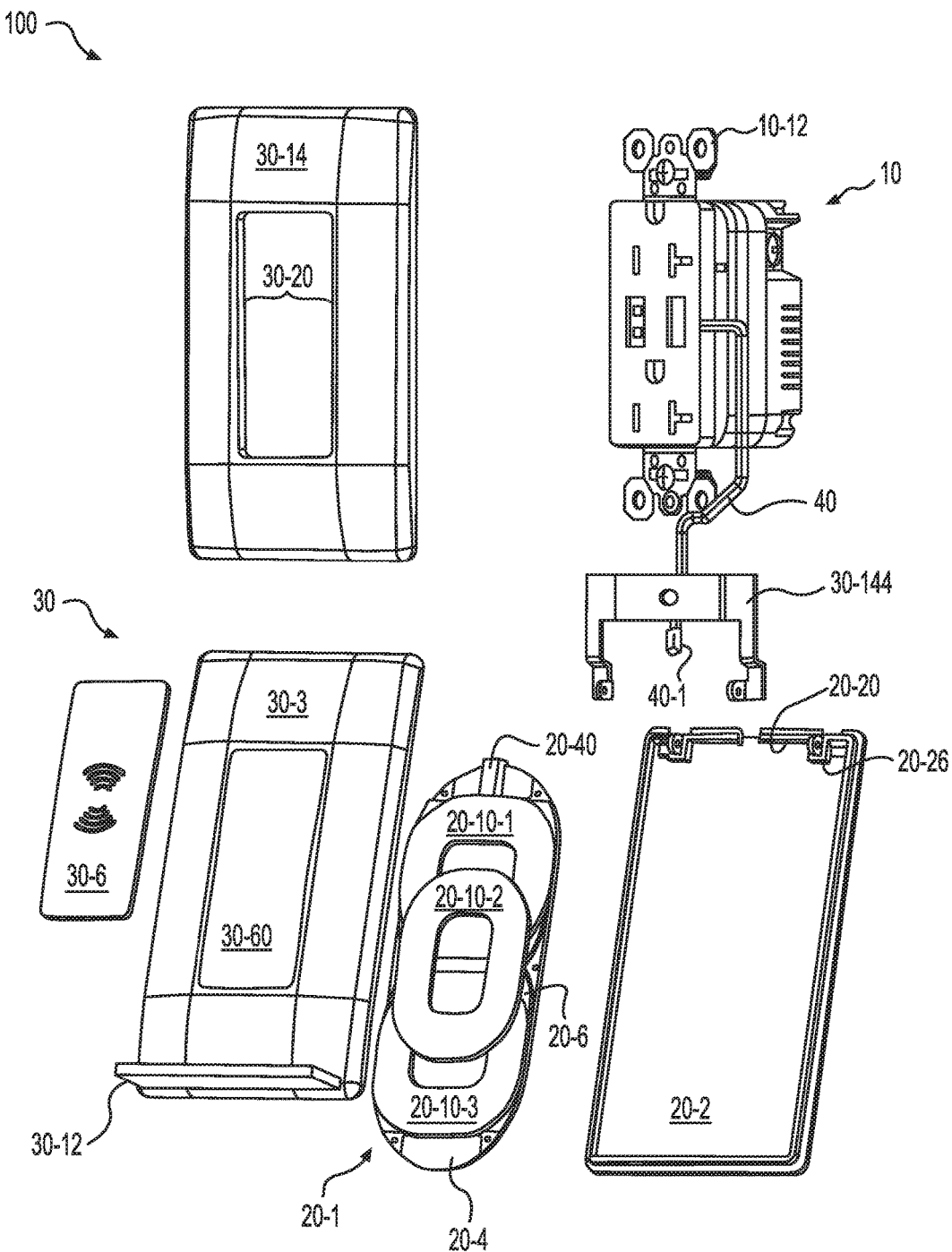
FIG. 5E is an exploded view of the electrical wiring assembly depicted in FIG. 5A.

Referring to FIG. 5E, an exploded view of the electrical wiring assembly depicted in FIG. 5A is disclosed. As shown, the hinge element 30-144 is coupled between the mounting ears 10-12 and the antenna back body 20-2. The slots 20-26 formed in the back body 20-2 accommodate hinge element 30-144. The antenna back body also includes a gap 20-20 that accommodates the plug 40-1 of the low voltage cord 40 so that it can readily engage the female low voltage receptacle 20-40 disposed on the low voltage PCB 20-4.

In an alternate embodiment of the invention hinge element 30-144 may be disposed on any one of the four edges of the wall plate assembly 30-14. (In this instance, the wall plate 30-14 may include a separate frame member that is coupled to the wiring device 10. Depending on the hinge location, the antenna assembly 30-3 can rotates downwardly, side-to-side or upwardly. As before, the angle of inclination (θ) between the wall surface and antenna wall plate assembly 30 can be 0 to 20 degrees. In the embodiments with a lateral hinge, i.e., where the hinge is disposed on one side of the wall plate assembly 30-14, it may be configured to have a closed or "stowed" position in which the angle of inclination (θ) from the wall surface to the assembly is between 0 to 180°. As before, the wall plate assembly 30-14 may be configured to hide or cover the electrical wiring device 10 in the stowed position.

In these embodiments the circuit assembly 20-1 is housed between the antenna housing body 20-2 and the antenna wall plate 30-3. As before, the circuit assembly 20-1 includes a printed circuit board (PCB) 20-4. The PCB 20-4 includes various control circuits (not visible in this view) disposed on the back side thereof. The front side includes a shielding structure 20-6 that accommodates a plurality of antenna coils 20-10. The shielding structure 20-6 prevents a magnetic field from heating any metallic structures behind the assembly 100 (e.g., a metallic device box or an electronic component). In the example shown in this view, the antenna is comprised on three coils (20-10-1, 20-10-2, and 20-10-3). As before, the PCB 20-4 also includes a plug receptacle 20-40 that is configured to accommodate the plug from the DC supply cord 40. Specifically, the DC supply cord will provide a DC supply voltage (e.g., +5 DCV) for the antenna coil and the control circuitry.

Figure 6A:
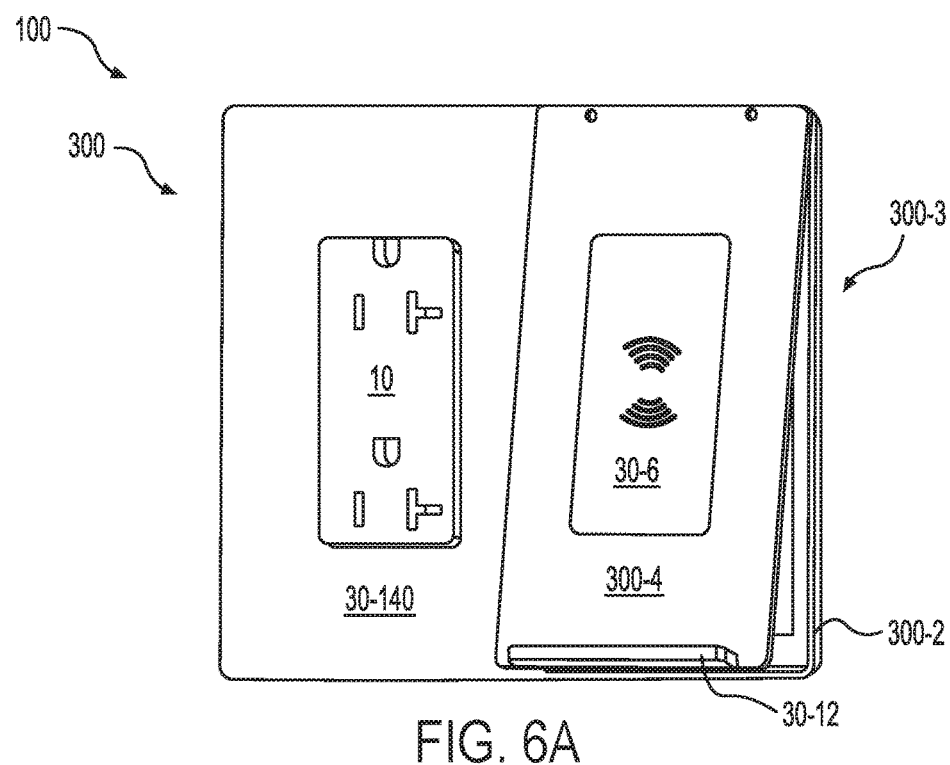
FIG. 6A is a front isometric view of an electrical wiring assembly in accordance with another embodiment of the invention.

Referring to FIG. 6A, a front isometric view of an electrical wiring assembly in accordance with another embodiment of the invention is disclosed. In this embodiment, the electrical assembly 100 includes a wall plate housing assembly 300 that includes an assembly frame 300-2 that accommodates the electrical wiring device 10 and the antenna housing 300-3. A device wall plate 30-140 and an antenna wall plate 300-4 couple to the assembly frame 300-2 while completing the enclosure.

The antenna wall plate 300-4 includes the cradle ledge 30-12 for the device under charge. As before, the antenna logo plate 30-6 is disposed on the antenna assembly wall plate portion 300-4 within a recessed portion (30-60).

Figure 6B:
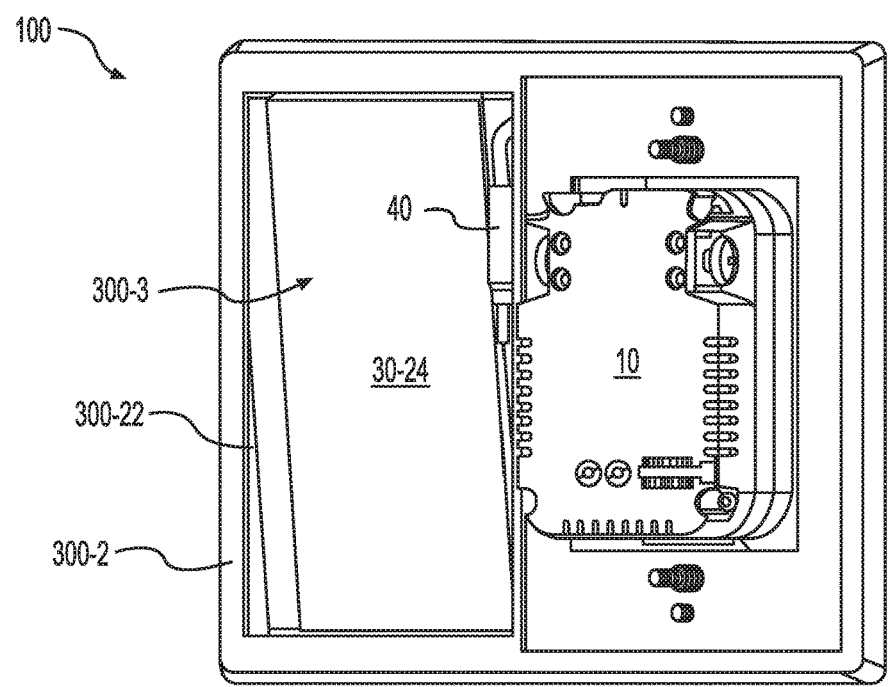
FIG. 6B is a rear isometric view of the electrical wiring assembly depicted in FIG. 6A.

Referring to FIG. 6B, a rear isometric view of the electrical wiring assembly depicted in FIG. 6A is disclosed. As before, the electrical wiring device 10 extends through an opening 300-20 so that the wiring terminals are accessible for AC wiring. Note however, that the antenna housing 300-3 is configured to rotationally move within an antenna frame opening 300-22 between a flush position (i.e., flush with the frame) and an inclined position (i.e., a charging position).

Figure 6C:
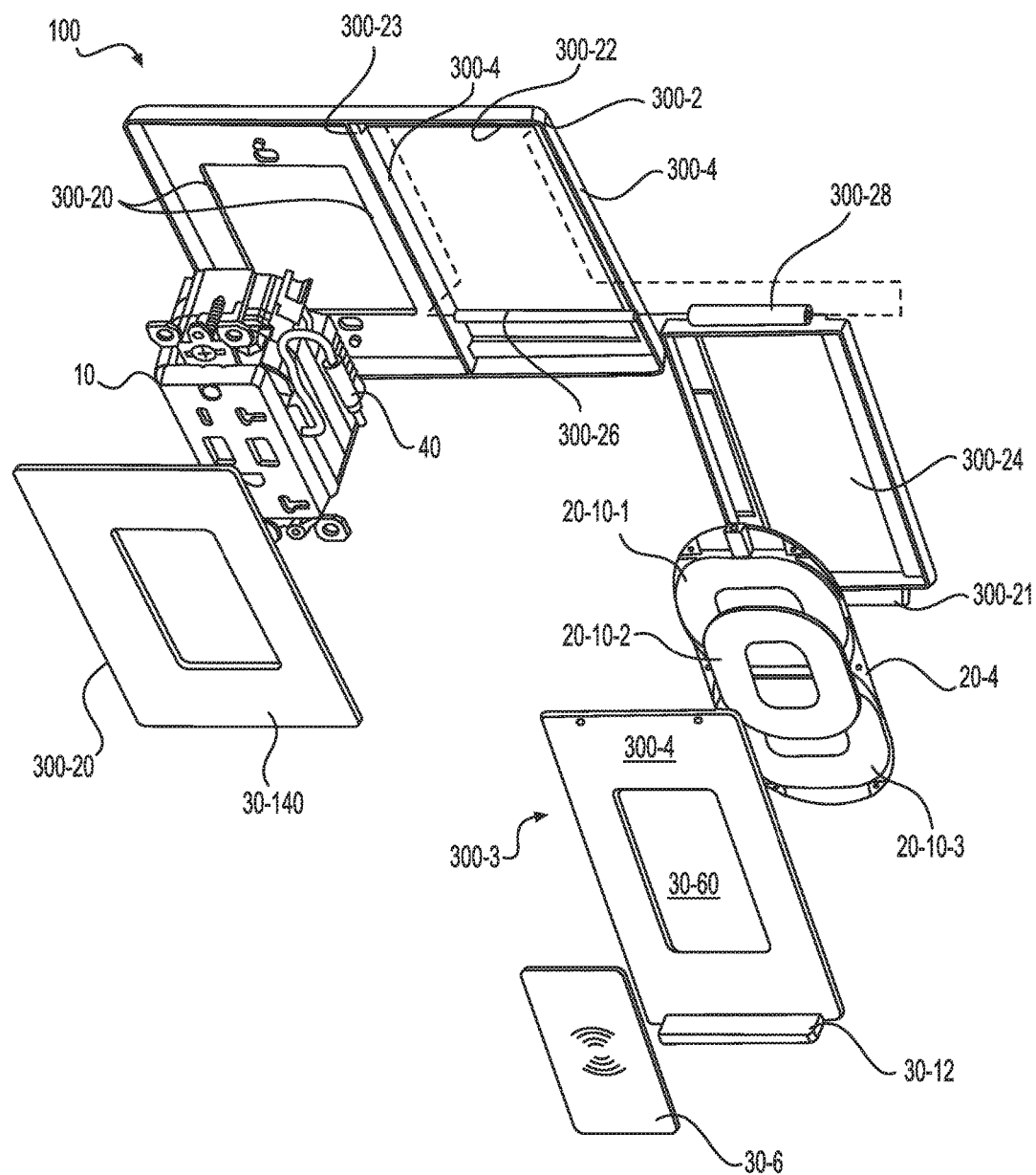
FIG. 6C is an exploded view of the electrical wiring assembly depicted in FIG. 6A.

Referring to FIG. 6C, an exploded view of the electrical wiring assembly depicted in FIG. 6A is disclosed. In this embodiment, the wiring device 10 is mounted to the device box (not shown) via the frame 300-2. The rear portion of the device 10 extends through the opening 300-20. The front wall plate 30-140 includes an opening 300-20 that allows the user to access the front receptacles. The front wall plate 30-140 snaps into the frame 300-2 to complete the electrical wiring device enclosure.

The antenna housing 300-3 includes an antenna compartment 300-24 that contains the AC circuit assembly 20-1. The front wall plate cover 300-4 snaps into the antenna compartment 300-24 so that the AC circuit assembly 20-1 is enclosed. The antenna housing 300-3 further includes a hinge 300-26 that can be inserted into either one of the hinge ferrules 300-28. The hinge 300-26 is inserted into opposing hinge slots 300-23 formed in the upright posts 300-4 that form antenna housing opening 300-22.

Figure 6D:
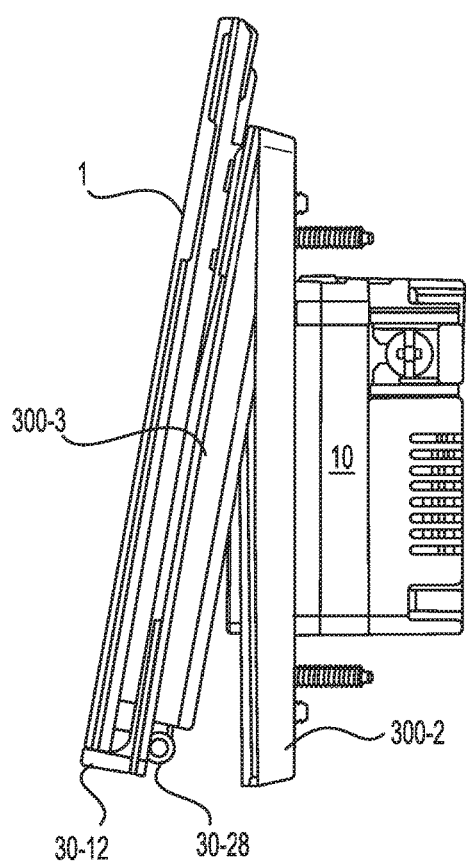
FIG. 6D is a side elevation view of the electrical wiring assembly depicted in FIG. 6A with a portable electronic device in a charging position.
Figure 6E:
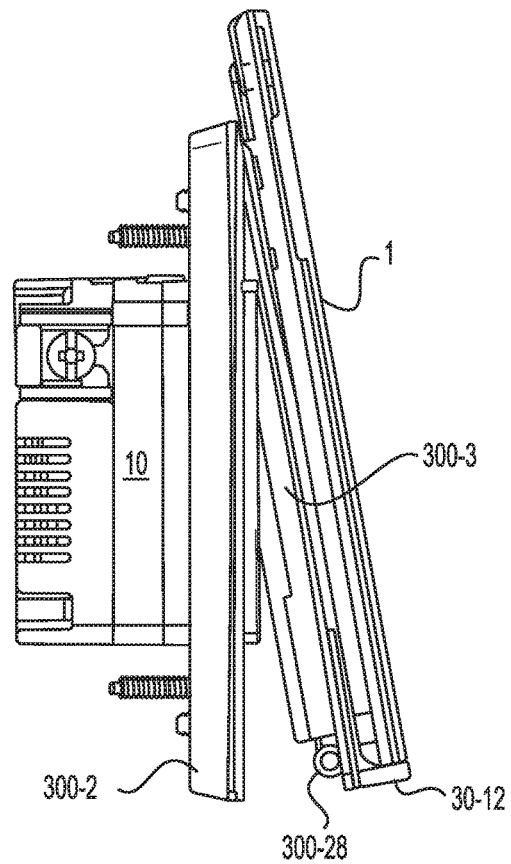
FIG. 6E is another side elevation view of the electrical wiring assembly depicted in FIG. 6A with the portable electronic device in the charging position.

Referring to FIG. 6D, a side elevation view of the electrical wiring assembly depicted in FIG. 6A is shown with a portable electronic device 1 in a charging position. FIG. 6E is the opposing side elevation view of the electrical wiring assembly depicted in FIG. 6D with the portable electronic device 1 in the charging position.

Figure 7A:
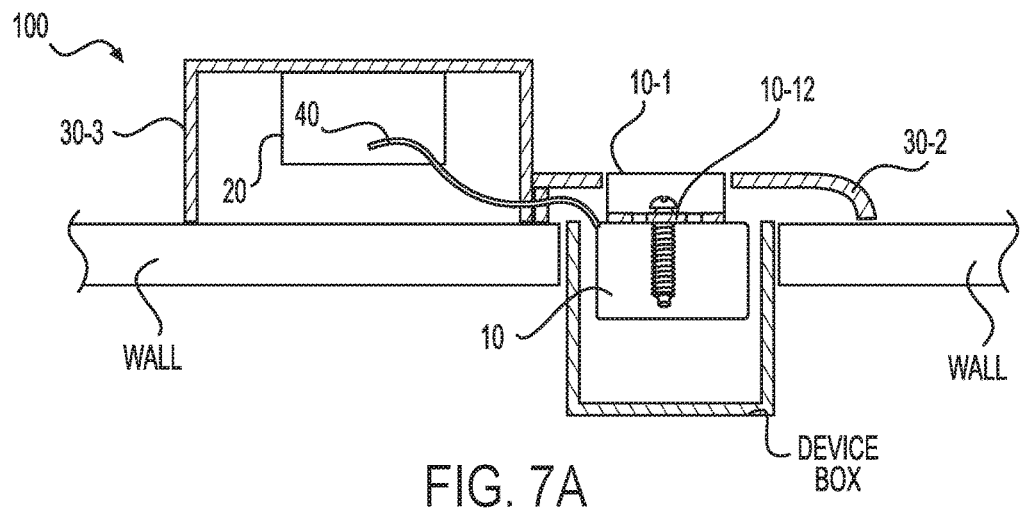
FIGS. 7A-7B are detail sectional views illustrating electrical wiring assembly power interconnections in accordance with the invention.
Figure 7B:
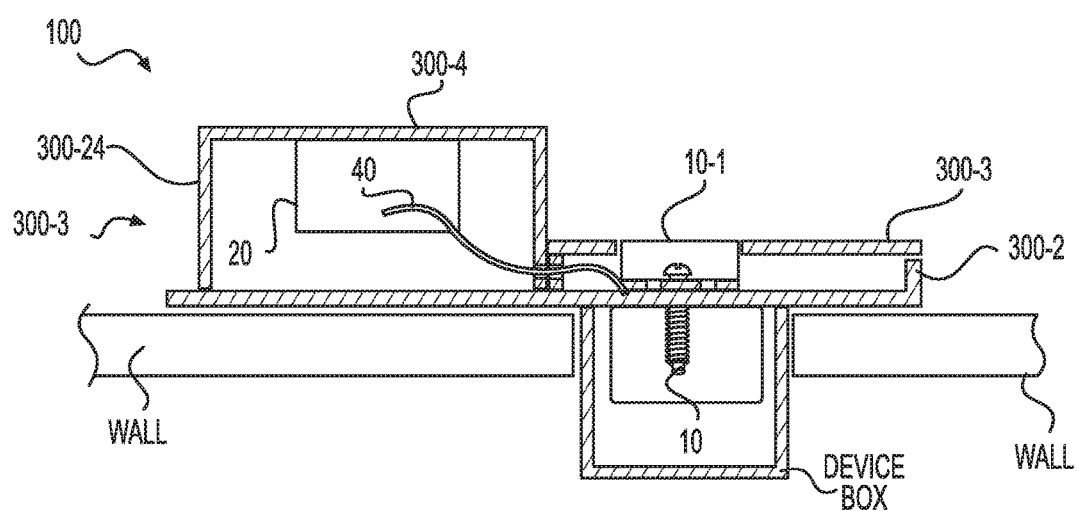

Referring to FIGS. 7A-7B, detail sectional views illustrating electrical wiring assembly power interconnections in accordance with the invention are disclosed. FIG. 7A, for example, shows the wall plate assembly 30 that includes an integral wall plate 30-1 having an electrical wiring device wall plate 30-2 and an antenna assembly wall plate 30-3. As before, the low voltage power cord 40 is connected to the electrical wiring device 10. From there, the cord 40 is routed under the electrical wiring device wall plate 30-2 and passes through an aperture in the wall separating the electrical wiring device 10 from the antenna assembly 20. Once the cord 40 is through the aperture, it can be inserted into the antenna assembly 20.

FIG. 7B shows an arrangement for a wall plate housing assembly 300 such as the embodiment of FIG. 6, for example. In this type of housing arrangement, the electrical wiring device wall plate 30-2 and the antenna assembly wall plate 30-3 are snapped separately into the back plate 300-2. As before, the low voltage power cord 40 is routed through an aperture in the wall separating the electrical wiring device 10 from the antenna assembly 20 and inserted into the antenna assembly 20.

Figure 8:
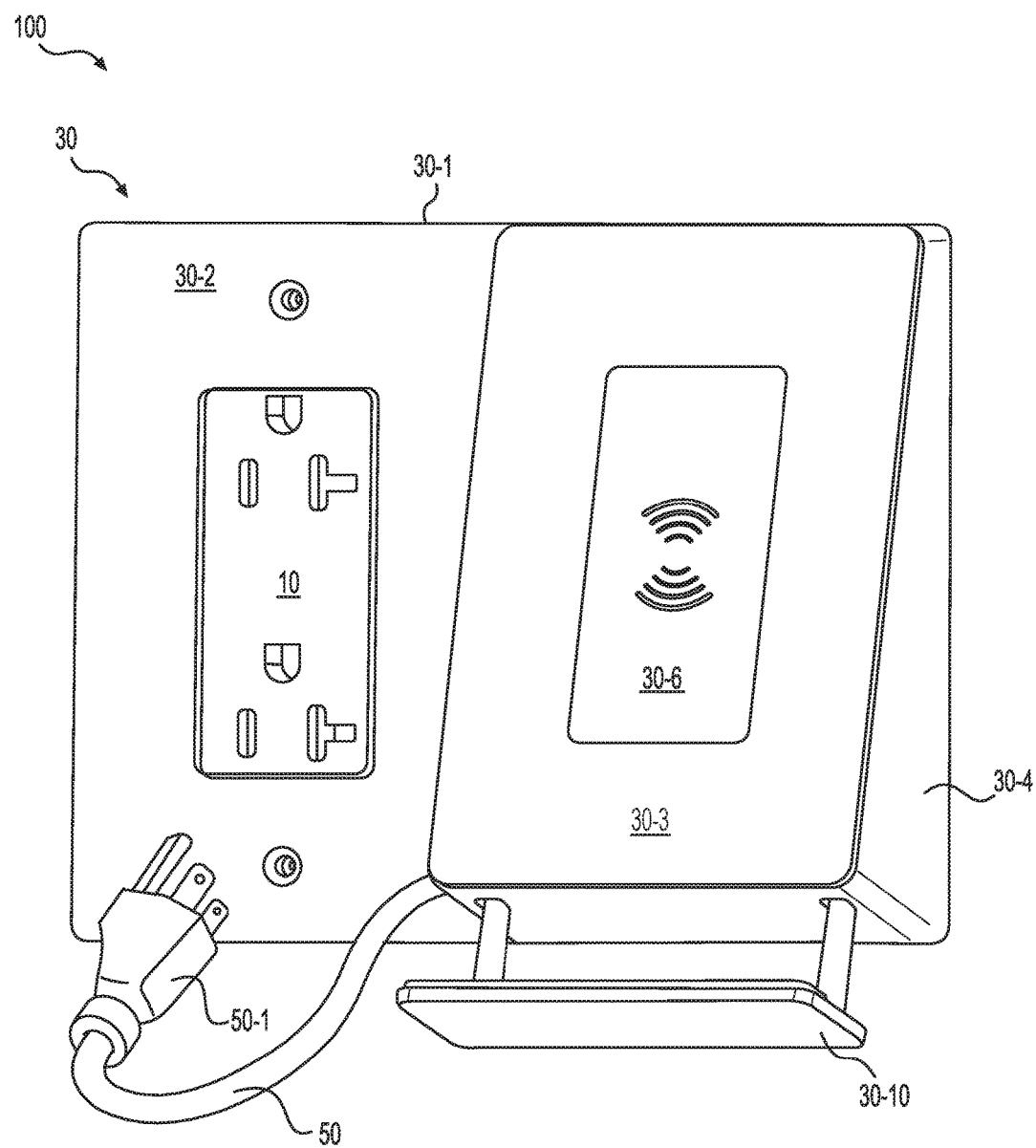
FIG. 8 is a front isometric view of an electrical wiring assembly in accordance with another embodiment of the invention.

Referring to FIG. 8, a front isometric view of an electrical wiring assembly 100 in accordance with another embodiment of the invention is disclosed. This embodiment is very similar to the embodiment of FIG. 1 except that the antenna assembly 20 is directly wired to an AC power supply. In this embodiment, the electrical wiring device 10 is an off the shelf wiring device that does not have to provide special cabling (such as a DC power cord) to the circuit assembly 20-1. Instead, the wall plate includes an aperture (not visible in this view) in the side wall 30-4 that accommodates an AC power cord 50 terminated with an AC plug 50-1. The AC plug 50-1 can be inserted into the outlet receptacle 10. Because the antenna assembly 20 is directly wired to an AC power supply instead of with low voltage DC as in other embodiments of the invention, an AC/DC converter is included in the antenna assembly 20 to provide the circuit assembly 20-1 with a suitable source of power. (Some antenna coils require a lower voltage AC power source. Moreover, the circuitry 20-1 may require a DC voltage source. Thus, all of these requirements may be supported by a power supply assembly disposed within the antenna housing 300-3).

One application of the embodiment of FIG. 8 is directed to a retrofit of an existing AC wiring device installation. Once the original or existing wall plate is removed, the wall plate assembly 30 is installed by coupling the electrical wiring device wall plate 30-2 over the existing wiring device 10. Since the wiring device wall plate 30-2 and the antenna wall plate 30-3 are integrally formed, one need only insert the corded plug assembly 50 into the device 10 to complete the installation. As those skilled in the art will appreciate any of the electrical wiring assemblies 100 disclosed herein can be configured so that the antenna assembly 20 is directly wired to AC power supply.

Figure 9:
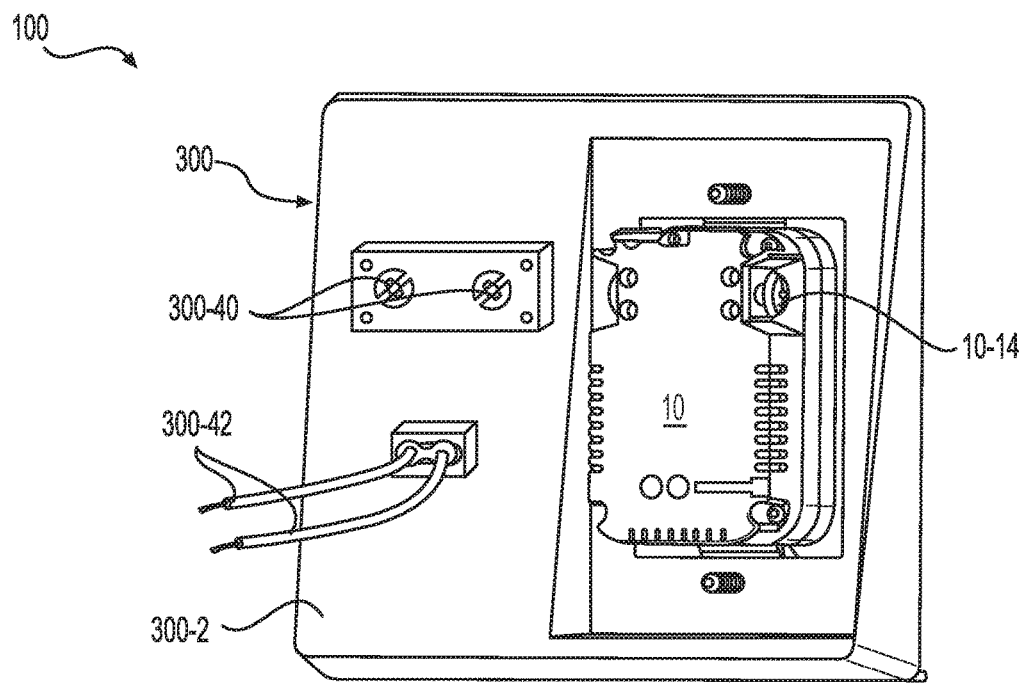
FIG. 9 is a rear isometric view of an electrical wiring assembly in accordance with another embodiment of the invention.

Referring to FIG. 9, a rear isometric view of an electrical wiring assembly 100 in accordance with another embodiment of the invention is disclosed. To illustrate the concept that any of the electrical wiring assemblies 100 disclosed herein can be configured so that the antenna assembly 20 is directly wired to AC power supply, this embodiment is an adaption of the embodiment of FIGS. 4A-C. Moreover, FIG. 9 is very similar to FIG. 4B. For brevity's sake, the rear portion of the wall plate housing assembly 300-2 depicted in FIG. 9 includes two alternative AC wiring termination schemes. The first AC wiring scheme includes the provision of AC wiring terminals 300-40 on the major rear surface of the housing 300-2 to which pigtails 300-42 are connected. The second AC wiring method include AC pigtails 300-42 extending from an aperture formed in the major rear surface of the housing 300-2. Either way, pigtails 300-42 are connected to wiring terminals 10-14 or to wires in the outlet box. The pigtail wires, additional pigtail wires to terminals 10-14 and wires inside the outlet box, may be joined together using twist-on connectors. As before, because the antenna assembly 20 is directly wired to AC power supply, the antenna assembly 20 further includes an AC/AC converter, an AC/DC converter or some other suitable power supply that is configured to provide the circuit assembly 20-1 with suitable (AC and/or DC) power. This embodiment may require use of a double gang wall box if the power supply circuitry or wiring terminals 300-40, pigtail wires or some other feature of antenna assembly 20 prevents housing 300-2 from being installed flush with the wall surface.

In reference to the various embodiments described herein, those skilled in the art will appreciate that embodiments of this invention can include a suitable power supply disposed in either the electrical wiring device, the antenna assembly or both, depending on the functionality of the assembly 100. For example, the power supply may be configured to convert high voltage AC (e.g., 120 VAC) to low voltage AC or convert high voltage AC to DC in order to provide suitable power to the antenna assembly. In some embodiments shown herein, the power supply circuitry may be dual-purpose, i.e., it may also be configured to provide a suitable power source to user accessible low voltage ports (e.g., USB ports), analog circuits, and/or digital circuitry.

Figure 10:
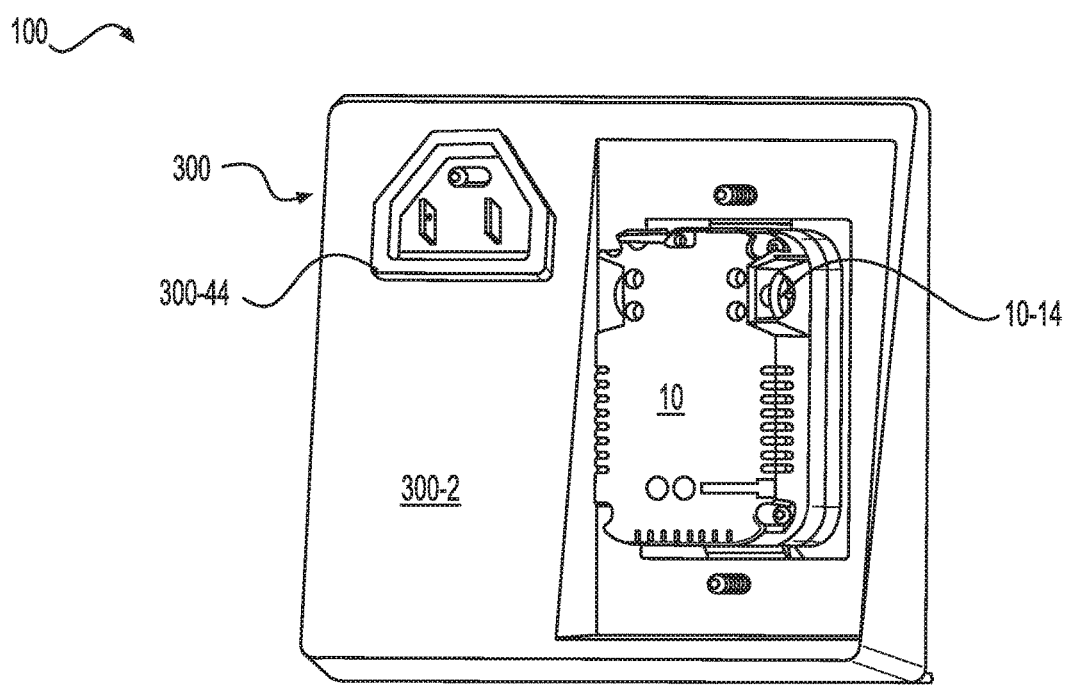
FIG. 10 is a rear isometric view of an electrical wiring assembly in accordance with another embodiment of the invention.

Referring to FIG. 10, another rear isometric view of an electrical wiring assembly is disclosed. FIG. 10 is also very similar to FIG. 4B. In this embodiment, an AC receptacle is formed in the rear of the major rear surface of the housing 300-2. In this method, one need only insert a corded AC power plug into receptacle 300-44 to provide AC power to the antenna assembly 20. Again, because the antenna assembly 20 is directly wired to AC power supply, the antenna assembly 20 further includes an AC/AC converter, an AC/DC converter or some other suitable power supply that is configured to provide the circuit assembly 20-1 with suitable power.

As embodied herein and depicted in FIG. 11A, a front isometric view of an electrical charging wiring device 10 in accordance with an embodiment of the invention is disclosed. This embodiment may be employed in a form factor suitable for a modular wiring device system. Reference is made to U.S. patent application Ser. No. 13/680,675, which is incorporated herein by reference as though fully set forth in its entirety, for a more detailed explanation of the modular wiring device system. The wiring device depicted in FIGS. 11A-C can be configured as a two or three-module device of the type shown in the '675 application and can be disposed in any of the modular frames (See, e.g., FIGS. 1 and 9-12).

This embodiment is similar to the embodiment of FIGS. 6A-E in that the antenna housing 30-3 is configured to rotationally move within a frame opening 30-20 between a flush position (i.e., flush with the frame 30-34) and an inclined position (i.e., a charging position). The frame 30-34 is mounted, in this embodiment, to the front of the antenna housing 30-3, which is disposed within the electrical wiring device housing 10-2. FIG. 11B is a rear isometric view of the electrical wiring device 10 depicted in FIG. 11A. In this view, the rear major surface of the housing 10-2 includes AC wiring terminal openings 10-14. Those skilled in the art, however, will appreciate that conventional wiring terminals 10-14 (see, e.g., FIG. 1B) may be employed instead.

Referring to FIG. 11C, an exploded view of the electrical wiring device depicted in FIG. 11A is disclosed. In this view, the antenna housing may be removably inserted into the opening 10-16-1. Specifically, the AC/DC conversion assembly 10-16 includes DC power terminals 10-160 that are configured as spring loaded push terminals. That is, once the DC terminals (not visible in this view) formed in the rear of the antenna housing are mated with the DC power jacks 10-160, one need only push the front face plate 30-32 and the antenna assembly 30 will be ejected from the opening 10-16-1.

One benefit of this approach relates to the ability of the user to employ different low power wiring device applications as needed. For example, a user may desire to insert an emergency flashlight insert into the opening 10-16-1 after the portable electronic device has been charged. This allows the wiring device to fulfil many different functions. Reference is made to U.S. patent application Ser. No. 13/835,076, which is incorporated herein by reference as though fully set forth in its entirety, for a more detailed explanation of a removable night light. Another benefit of this embodiment relates to the ability of the user to replace, interchange, or upgrade the antenna assembly with a different antenna assembly as needs change and technology evolves. Note that the high voltage wiring remains installed and undisturbed during the antenna replacement process. Thus, the antenna assembly is "modular" in that it is easy to replace.

Figure 11D:
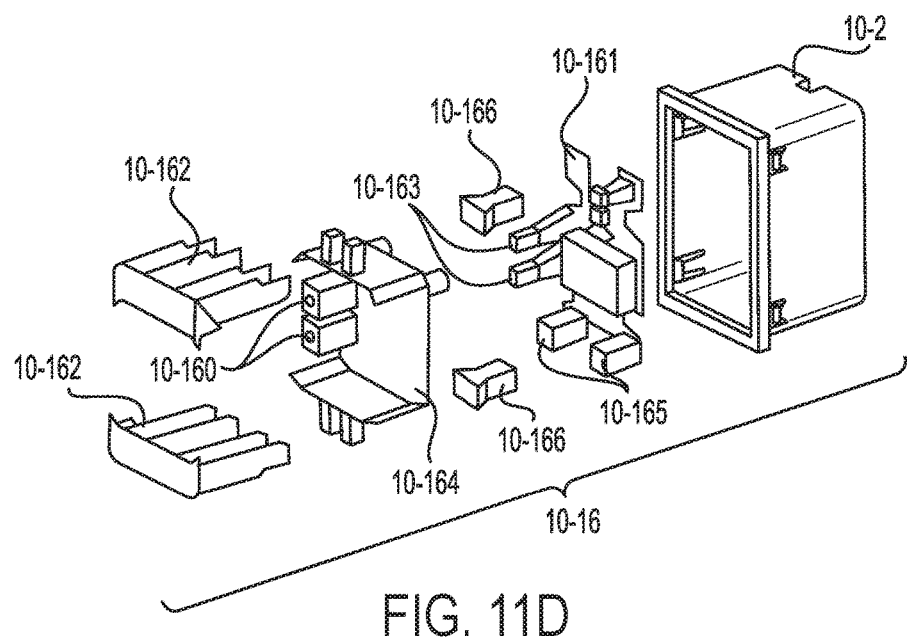
FIG. 11D is an exploded view of an AC module portion of the electrical wiring device depicted in FIG. 11A.

Referring to FIG. 11D, an exploded view of an AC module portion 10-16 of the electrical wiring device depicted in FIG. 11A is disclosed. The AC module portion 10-16 includes push release mechanisms 10-166 that alternately hold the antenna assembly 30 within the housing 10-2 and release the antenna assembly 30 when the user decides to employ another application module. An AC power printed circuit board assembly (AC PCB) 10-161 is disposed in the rear part of the housing 10-2. The AC PCB 10-161 includes power supply jacks 10-163 that are configured to be inserted into the jacks 10-160 formed in the low power assembly tray 110-164. AC PCB 10-161 also includes hardware for AC wiring terminals 10-165; the hardware 10-165 is accessible via the terminal openings 10-14 (See FIG. 11B). Alternatively, the terminal hardware may be implemented using conventional AC wiring terminals. The tray member 10-164 also accommodates slide stop elements 10-162 which are disposed either side of the tray 10-164 as shown. The slide stops 10-162 snap into the housing 10-2 and serve to restrict the travel of the tray 10-164 between two positions governed by the release mechanism 10-166. The slide stops 10-162 also provide a snug fit for the antenna assembly 30 while allowing it to be completely removed from the tray or reinserted into the tray. The slide stops 10-162, on the other hand, are not removable from either the tray or the housing 10-2; when the tray 10-164 and slide stops 10-162 are installed, no AC wiring or parts associated with them or AC PCB 10-161 are accessible to the consumer even when the antenna assembly 30 is removed from tray 10-164.

As before, the power supply circuitry disposed within housing 10-2 may be configured to convert high voltage AC (e.g., 120 VAC) to low voltage AC or convert high voltage AC to DC in order to provide suitable power to the antenna assembly or any a replacement assembly.

Figures 12A, 12B:
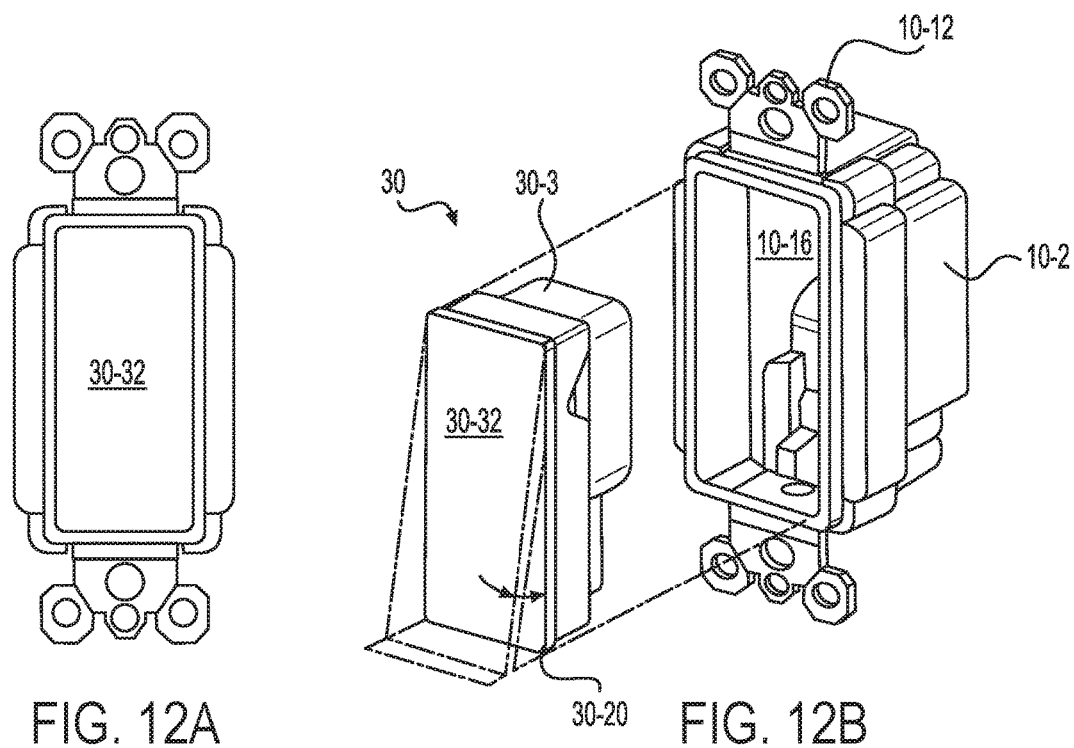
FIG. 12A is a front view of an electrical wiring device in accordance with another embodiment of the invention.
FIG. 12B is an exploded view of the electrical wiring device depicted in FIG. 12A.

Referring to FIG. 12A, a front view of an electrical wiring device in accordance with another embodiment of the invention is disclosed. While this embodiment may be employed in a conventional wiring device form factor for a single gang wall box (See, e.g., FIGS. 8-10), it is functionally identical to the embodiment of FIGS. 11A-D. Since like reference numbers are assigned to like parts, and the embodiment of FIGS. 12A-B is functionally identical to the embodiment of FIGS. 11A-D, further disclosure is unnecessary. Thus, as shown in FIG. 12B—which is an exploded view of the electrical wiring device depicted in FIG. 12A—the antenna assembly 30 can be inserted and removed from the wiring device housing 10-2 in the manner described above.

Figure 13A:
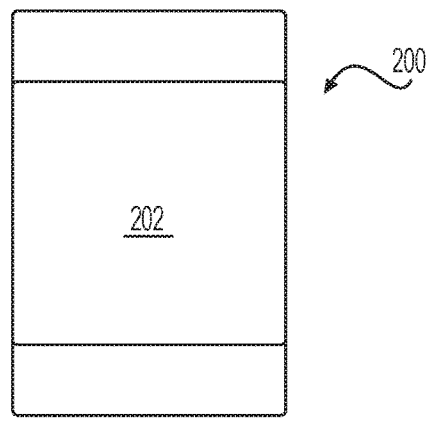
FIGS. 13A-13B include a front view and an exploded view, respectively, of an electrical charger wiring device in accordance with the invention.
Figure 13B:
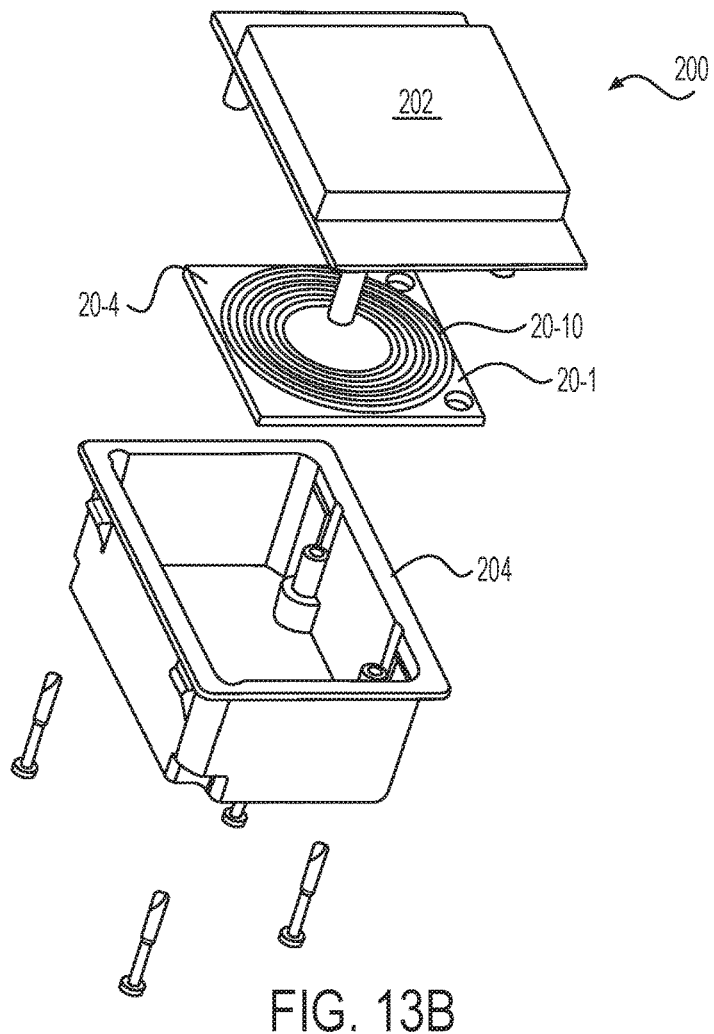

Referring to FIGS. 13A-13B, a front view and an exploded view, respectively, of an electrical charger wiring device 200 in accordance with the invention are disclosed. FIG. 13A is a front view of the electrical charger wiring device 200. Like a previous embodiment, this embodiment is in a form factor suitable for a modular wiring device system. Reference is made to U.S. patent application Ser. No. 13/680,675, which is incorporated herein by reference as though fully set forth in its entirety, for a more detailed explanation of the modular wiring device system. The wiring device 200 depicted in FIGS. 13A-B can be configured as a two or three-module device of the type shown in the '675 application. While a cradle (e.g., 30-12) for the device-under-charge 1 is not shown in this view, those skilled in the art will appreciate that a cradle may be part of the wiring device 200, or part of the wall plate assembly (30, 300 or 3000) as described herein.

In the exploded view shown in FIG. 13B, the circuitry 20-1 is disposed between a front cover 202 and a back body 204. The electrical terminals 20-12 are not shown in this view for clarity's sake. Obviously, AC power must be routed from the AC distribution system to the device 200. In addition, the antenna circuit 20-1 is configured as a single antenna 20-10 device, but those skilled in the art will appreciate that the device 200 can be configured to include an antenna circuit 20-1 with two or three antennas. As before, the underside of the printed circuit board 20-4 may include analog and/or digital control circuitry, a power supply circuit and other suitable circuitry.

Figure 14A:
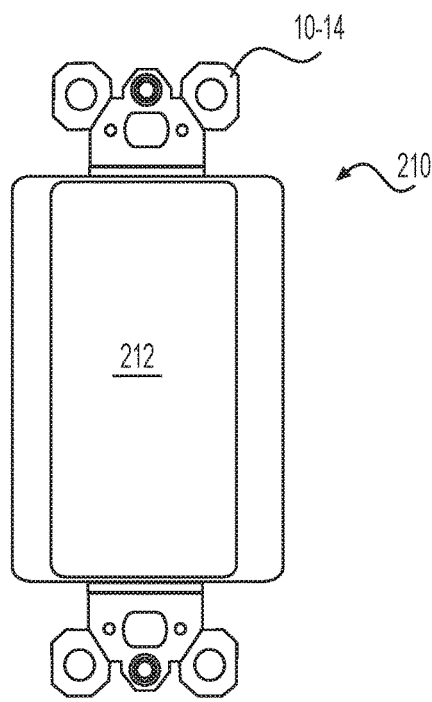
FIGS. 14A-14B include a front view and an exploded view, respectively, of an electrical charger wiring device in accordance with the invention.
Figure 14B:
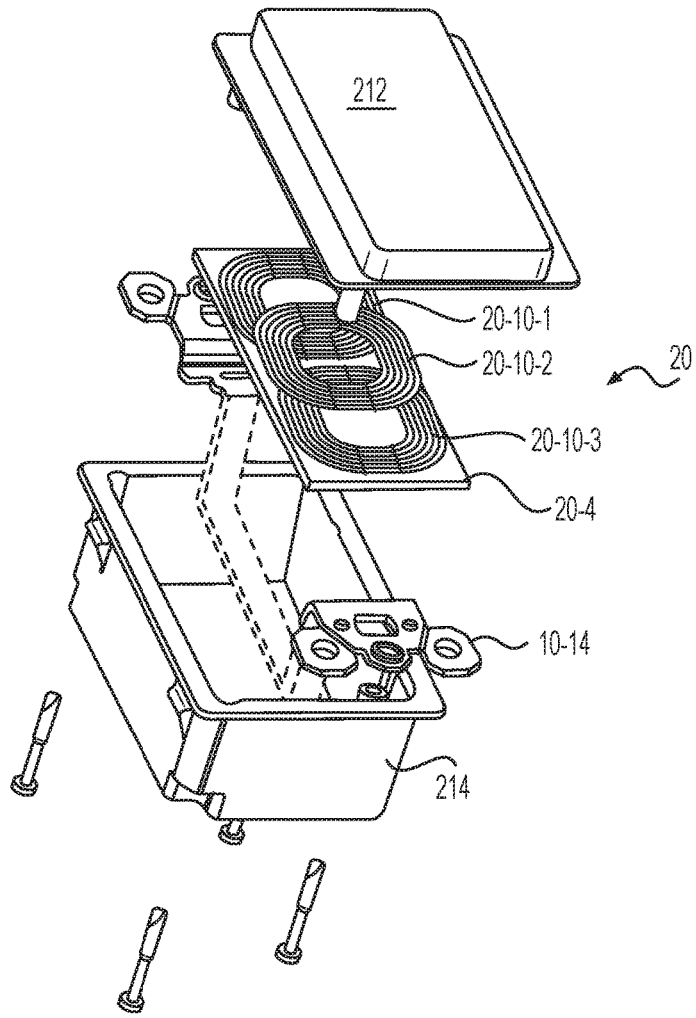

Referring to FIGS. 14A-14B, a front view and an exploded view, respectively, of an electrical charger wiring device 210 in accordance with another embodiment of the invention is disclosed. This embodiment is in a conventional electrical wiring device form factor. FIG. 14A is a front view of the electrical charger wiring device 210 and includes conventional mounting ears 10-14 disposed between the front cover 212 and the back body 214. As before, while a cradle for the device-under-charge 1 is not shown in this view, those skilled in the art will appreciate that a cradle (e.g., 30-12) may be part of the wiring device 210, or part of the wall plate assembly (30, 300 or 3000) as described herein.

FIG. 14B is an exploded view of the device 210 and shows the circuitry 20-1 disposed between a front cover 212 and a back body 214. The electrical terminals 20-12 are not shown in this view for clarity's sake. Obviously, AC power must be routed from the AC distribution system to the device 210. In this view, the antenna circuit 20-1 is configured as a tri-antenna 20-10 device, but those skilled in the art will appreciate that the device 200 can be configured to include an antenna circuit 20-1 with one or two antenna coils. As before, the underside of the printed circuit board 20-4 may include analog and/or digital control circuitry, a power supply circuit and other suitable circuitry. The mounting strap 10-14 is depicted herein in dashed lines because it may be configured in any number of ways depending on the device 210 realization. In this view, it is shown in a wraparound strap form factor. In another embodiment, the strap 10-14 may be disposed over top the circuitry 20-1 and, thus, be configured in a substantially linear through strap form factor.

Figure 15A:
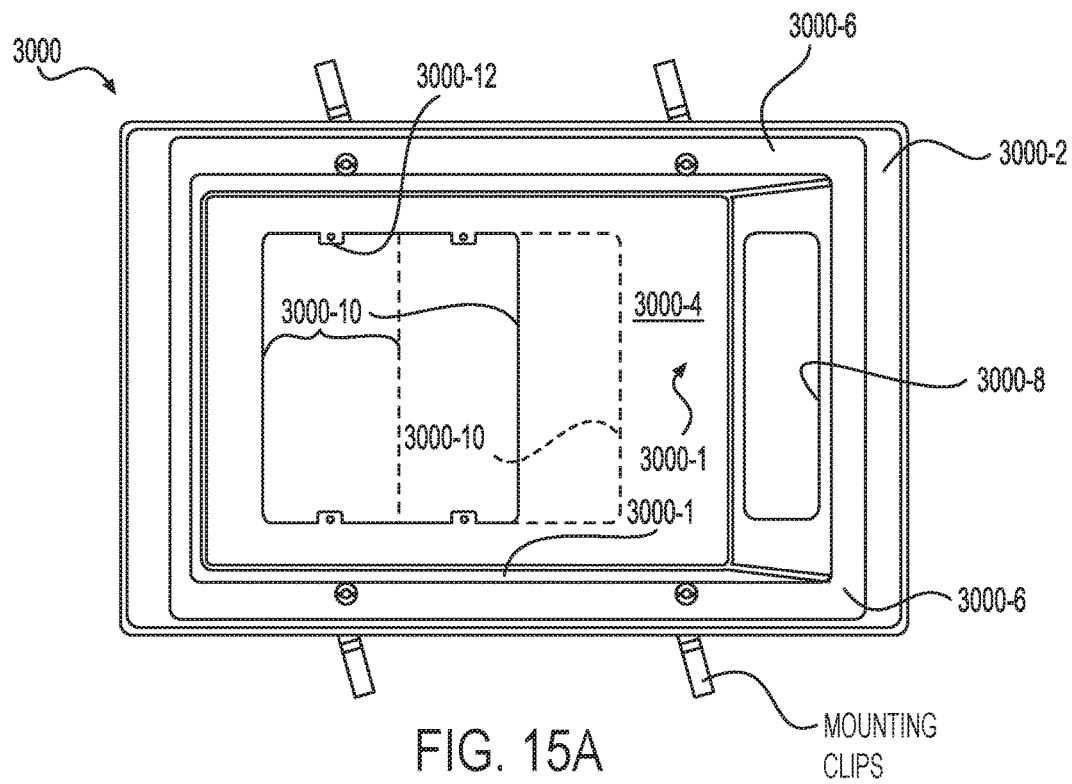
FIG. 15A is a front view of a wall box assembly in accordance with another embodiment of the invention.

As embodied herein and depicted in FIG. 15A, a front view of a wall box assembly 3000 in accordance with another embodiment of the invention is disclosed. This embodiment may be employed in a new construction application. The wall box 3000 includes a framing portion that has upright frame posts 3000-2 connected to horizontal framing members 3000-6. An interior compartment 3000-1 is formed by wall, floor and ceiling surfaces 3000-4. The wall surfaces 3000-4 include an opening 3000-8 that is dedicated to an AC electrical wiring device and another opening 3000-10 that is dedicated to the antenna assembly 30. Note that the size of the antenna device opening 3000-10 may vary depending on the size of the antenna assembly 30 selected by the user. The size of the opening 3000-1 and the antenna assembly 30 may depend on the largest type of portable electronic device that the user foresees charging.

Figure 15B:
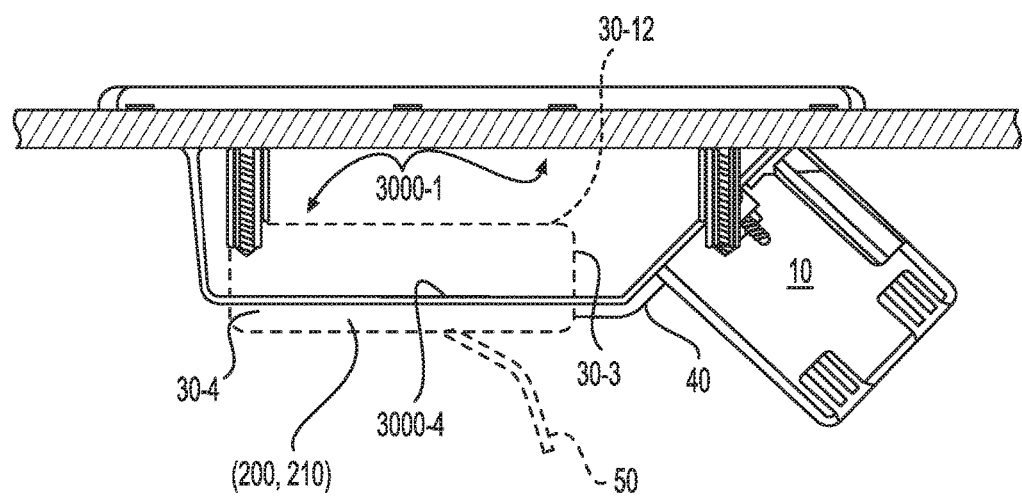
FIG. 15B is a top view of the wall box assembly depicted in FIG. 15A.

Referring to FIG. 15B, a top view of the wall box assembly 3000 depicted in FIG. 15A is disclosed. In this view, the electrical wiring device 10 is installed in the opening 3000-8 and the antenna assembly 30 is installed in the opening 3000-10. In one embodiment, the wiring device 10 provides the antenna assembly 30 with DC power (see embodiments of FIGS. 1-6). In another embodiment, AC power wiring 50 is coupled to the antenna assembly 30 (See, e.g., FIGS. 8-10). The dashed line indicates the footprint of the inclined antenna wall plate 30-3 and the cradle ledge 30-12. The interior compartment 3000-1 provides a region recessed within the wall surface that can accommodates at least one portable electronic device for wireless charging. Thus, the user places the device under charge (DUC) 1 into the interior compartment 3000-1 so that a passerby or pet cannot inadvertently knock the DUC 1 off the cradle.

Those skilled in the art will appreciate that the wiring device embodiments shown in FIGS. 13A-14B and described in the related text may be employed in the wall box assembly embodiments depicted in FIGS. 15A-B as stand-alone charger electrical wiring devices.

Figure 16A:
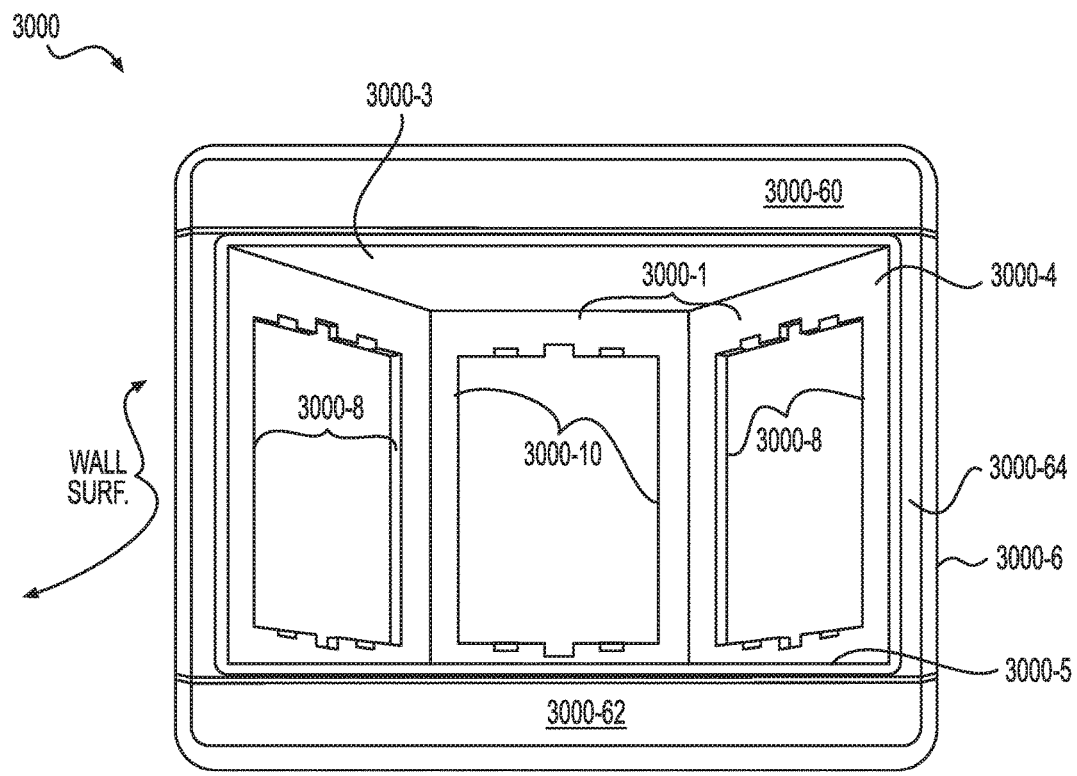
FIG. 16A is a front view of a wall box assembly in accordance with another embodiment of the invention.

As embodied herein and depicted in FIG. 16A, a front view of a wall box assembly 3000 in accordance with another embodiment of the invention is disclosed. In this view, a modular wall box housing assembly includes a frame portion 3000-6 that is substantially flush with the drywall when the assembly 3000 is installed. The frame 3000-6 can include a top aesthetic flange cover 3000-60 and a bottom aesthetic flange cover 3000-62. The aesthetic flanges (3000-60, 62) cover mounting flange portions of the frame 3000-6 so that the mounting screws are hidden from view. Thus, the flange covers (3000-60, 62) provide an aesthetically pleasing finish that consumers appreciate. Reference is made to co-pending U.S. patent application Ser. No. 11/247,896, filed on Oct. 11, 2005, which is incorporated herein by reference as though fully set forth in its entirety, for a more detailed explanation of designer flange covers (3000-60, 62) in accordance with an alternate embodiment of the present invention. In this view, the assembly 3000 is a three gang assembly that includes a recessed region 3000-1 that has three planar device mounting surfaces 3000-4, a planar roof portion 3000-3, and a planar floor surface 3000-5. Thus, in this embodiment, the assembly 3000 is a three-gang assembly that can accommodate any combination of AC wiring devices 10 or antenna assemblies 30. Thus, this assembly 3000 can include more than one antenna assembly 30.

Figure 16B:
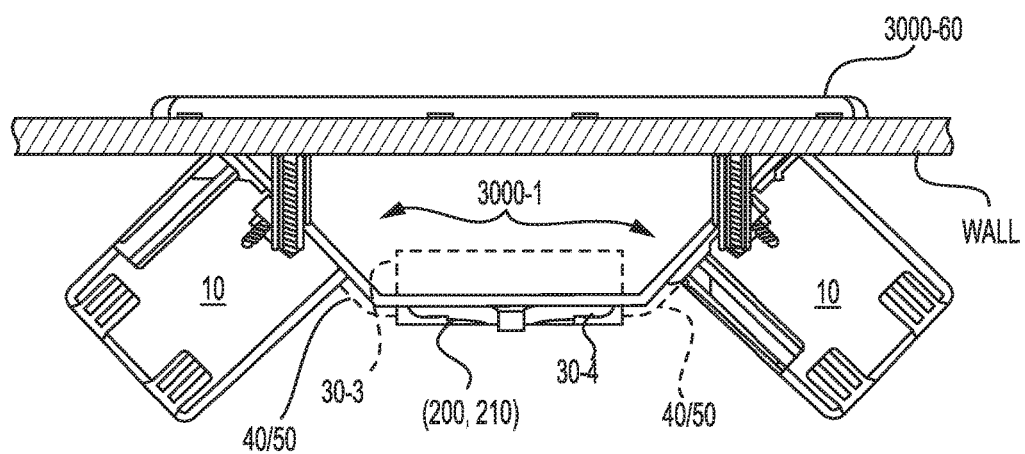
FIG. 16B is a top view of the wall box assembly depicted in FIG. 16A.
Figure 16C:
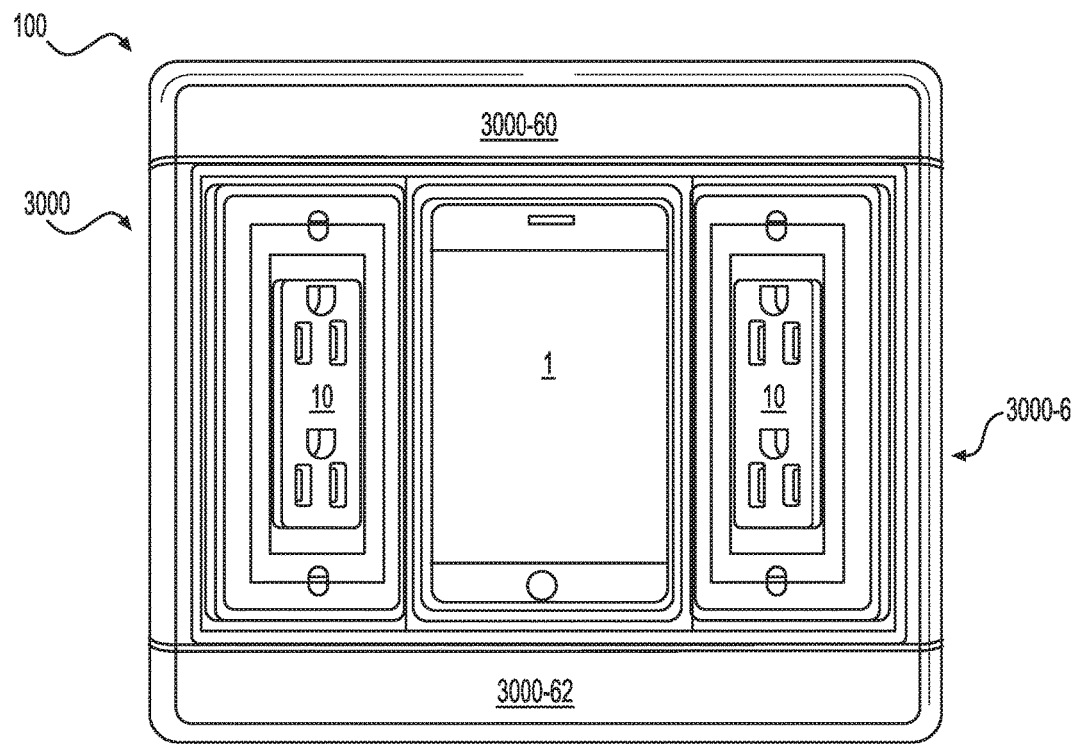
FIG. 16C is a front elevation view of the wall box assembly depicted in FIG. 16A with the portable electronic device in the charging position.

Referring to FIG. 16B, a top view of the wall box assembly depicted in FIG. 16A is shown with an electrical wiring device 10 installed at each end and an antenna assembly 30 disposed in the middle. FIG. 16C is a front elevation view of the wall box assembly depicted in FIG. 16A with the portable electronic device 1 in the charging position.

Those skilled in the art will appreciate that the wiring device embodiments shown in FIGS. 13A-14B and described in the related text may be employed in the wall box assembly embodiments depicted in FIGS. 16A-C as stand-alone charger electrical wiring devices.

Figures 17A, 17B:
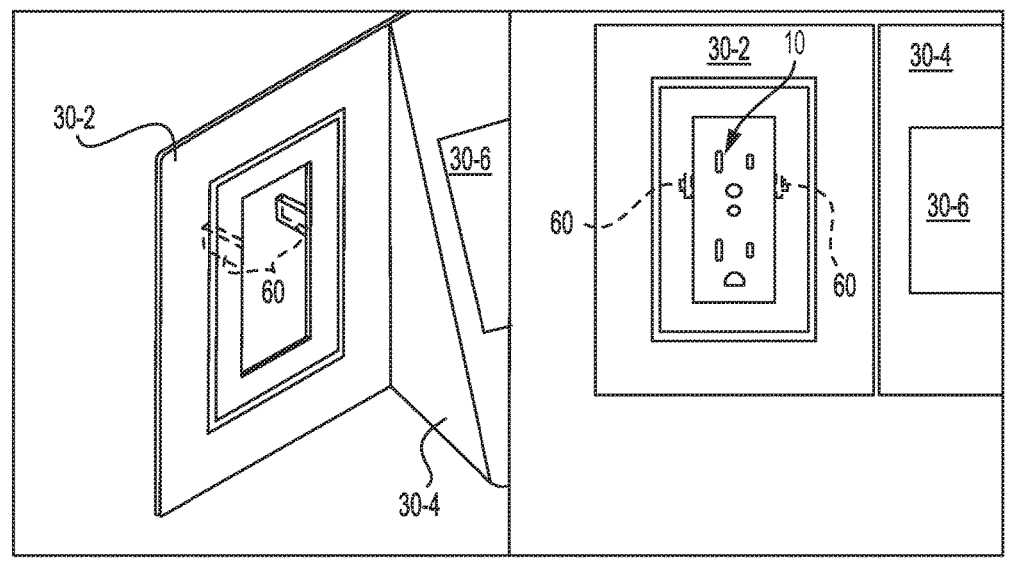
FIG. 17A is a front isometric view of a wall plate assembly in accordance with another embodiment of the invention.
FIG. 17B is a front elevation view of the wall plate assembly depicted in FIG. 17A.

Referring to FIG. 17A, a front isometric view of a wall plate assembly 30 in accordance with another embodiment of the invention is disclosed. This embodiment is similar to the embodiment of FIG. 1 except that the antenna assembly 20 is directly wired to the AC power supply. In this embodiment, the electrical wiring device 10 is an off-the-shelf wiring device in that it does not include an AC/DC converter. Thus, the DC power cord between the wiring device 10 and the antenna assembly 30 is not required. Instead, the electrical wiring device wall plate portion 30-2 includes AC power connection fingers 60 that are configured to contact the electrical wiring device terminals 10-14 when the wall plate 30 is installed. FIG. 17B is a front elevation view of the wall plate assembly depicted in FIG. 17A.

Because the antenna assembly 20 is directly wired to AC power supply, the antenna assembly 20 further includes a suitable power supply that provides the circuit assembly 20-1 with suitable power.

Like FIG. 8, one application of the embodiment of FIGS. 17A-B is a retrofit of an existing AC wiring device installation. The user need only remove the existing wall plate and install the wall plate assembly 30. To be specific, once the original or existing wall plate is removed, the electrical wiring device wall plate 30-2 is installed over the existing wiring device 10 so that the fingers 60 make contact with the wiring terminals 10-14. Since the wiring device wall plate 30-2 and the antenna wall plate 30-3 are integrally formed, the antenna assembly 30 is automatically installed once the wall plate 30-2 is installed.

Figure 18A:
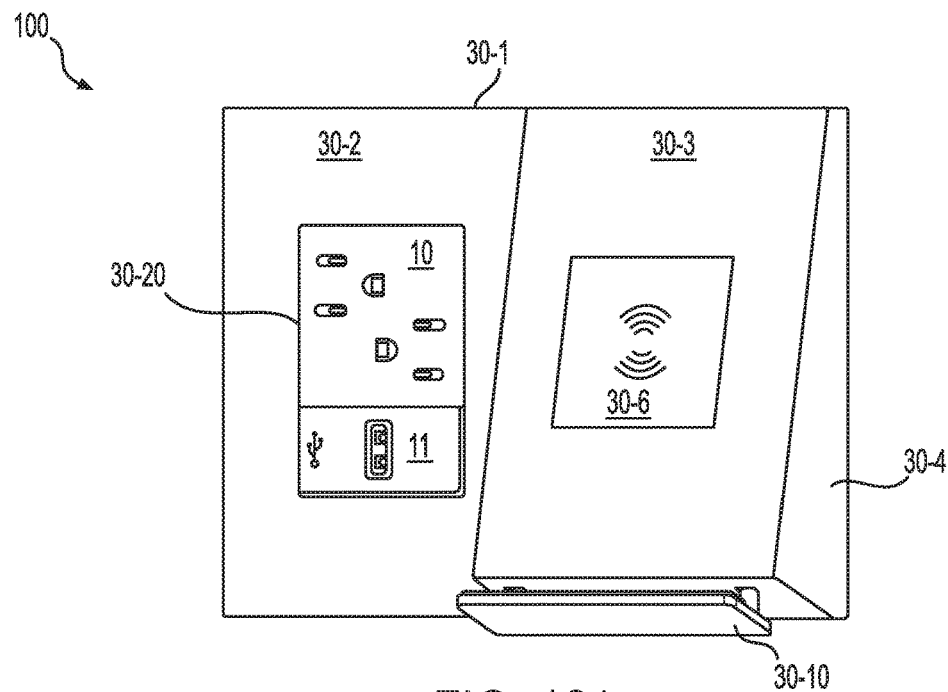
FIG. 18A is a front isometric view of an electrical wiring assembly in accordance with an embodiment of the invention.

As embodied herein, and depicted in FIG. 18A, a front isometric view of an electrical wiring assembly 100 in accordance with an embodiment of the invention is disclosed. Like the embodiment of FIGS. 11A-11D and 13A-B, this embodiment may be employed in a form factor suitable for a modular wiring device system. Thus, reference is made to U.S. patent application Ser. No. 13/680,675, which is incorporated herein by reference as though fully set forth in its entirety, for a more detailed explanation of the modular wiring device system. The components depicted in FIGS. 15A-15B are similar to the components depicted in FIGS. 1A-1F, but it should be appreciated that any of the embodiments depicted herein may be employed using the modular system disclosed in the '675 application referenced above.

The electrical assembly 100 includes a wall plate assembly 30 that is configured to accommodate an electrical wiring device 10 and an antenna assembly 20 (not shown in this view). The wall plate assembly 30 includes an integrally formed aesthetic wall plate 30-1 that is configured to couple to the frame member 12 (not shown in this view). The aesthetic wall plate 30-1 includes an electrical wiring device wall plate portion 30-2 and an antenna assembly wall plate portion 30-3. The integrally formed wall plate also includes a side wall 30-4 having a substantially triangular shape; i.e., it includes a first major side that is configured to abut a wall surface and a second major side that extends at an angle so that the antenna wall plate 30-3 is inclined.

The wall plate assembly 30 also includes a device cradle 30-10 that includes a cradle pad 30-100. The cradle pad 30-100 is comprised of a material that has a relatively high coefficient of friction. An antenna logo plate 30-6 is disposed on the antenna assembly wall plate portion 30-3 within a recessed portion (30-60). The plate 30-6 is also comprised of a material that has a relatively high coefficient of friction. Thus, a portable electronic device under charge that is resting in the cradle 30-10 and propped against the antenna wall plate 30-3 will remain in place (due to the frictional forces exceeding gravitational forces).

The electrical wiring device wall plate portion 30-2 has a three module sized opening 30-20 formed therein to accommodate a two-module sized electrical wiring device 10 and a one module sized USB port device 11. According to the present invention, an electrical wiring device 10 may be configured as an outlet receptacle or as a protective device, such as a ground fault circuit interrupter (GFCI), an arc fault circuit interrupter (AFCI), a transient voltage surge suppressor (TVSS), or a surge protective device (SPD). Other electrical wiring device examples include dimmers, fan speed controls, night lights, low voltage ports, or USB ports. Finally, each of these wiring device modules may be found in mix-and-match combinations with other kinds of these wiring devices. For example, a GFCI/AFCI combination device may be included within a single housing.

Figure 18B:
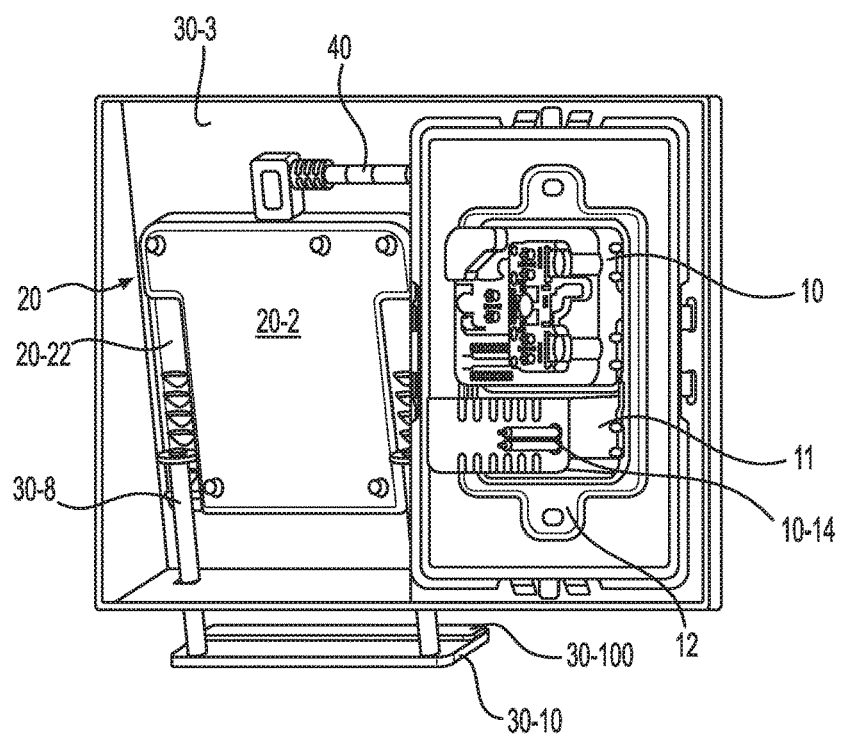
FIG. 18B is a rear isometric view of the electrical wiring assembly depicted in FIG. 18A.

Referring to FIG. 18B, a rear isometric view of the electrical wiring assembly 100 depicted in FIG. 18A is disclosed. The electrical wiring device 10 and the USB port device 11 are shown extending through the frame member 12. In this embodiment, the USB port device 11 includes an AC/DC converter circuit (not shown). A DC power cord 40 is coupled to the AC/DC converter via a terminal in the side of the electrical wiring device 10. The opposite end of the cord 40 includes a plug that is configured to be inserted into the antenna plug opening 20-20 disposed at the top end of the antenna back body 20-2. Of course, the antenna back body 20-2 is configured to form a rear volume together with side wall 30-4. Moreover, the antenna back body 20-2 is configured to be connected to the inside of the antenna wall plate portion 30-3 to complete the antenna assembly 20 enclosure.

Note that the portable device cradle 30-10 is coupled to a ratchet member 30-8 on each side thereof. The ratchet members 30-8 allow the cradle 30-10—and hence the portable device 1—to be adjusted up or down so that the antenna coil in the antenna housing 20-2 substantially aligns with the antenna coil disposed in the portable device 1. Specifically, each ratchet 30-8 is disposed within a recess 20-22 formed in a side portion of the antenna back body 20-2. Each ratchet 30-8 also includes a catch element 30-80 disposed on the ratchet 30-8 end opposite the cradle 30-10. The catch member 30-80 is configured to move between the ratchet steps 20-24 that are formed in the ratchet recess regions 20-22.

As described in the '675 application, the frame member 12 is configured to "complete the electrical enclosure" when one or more modular electrical devices and/or modular alignment connectors are properly installed within the frame opening such that the device wall box interior is substantially inaccessible. Stated differently, instead of using a conventional wall plate to complete the enclosure, the frame member 12 is used to prevent individuals from being shocked or electrocuted by concealing all electrical wiring under the frame 12 within the device wall box interior. Reference is again made to U.S. patent application Ser. No. 13/680,675, which is incorporated herein by reference as though fully set forth in its entirety, for a more detailed explanation of the frame member 12 and the modular connectors (not shown herein).

Figure 18C:
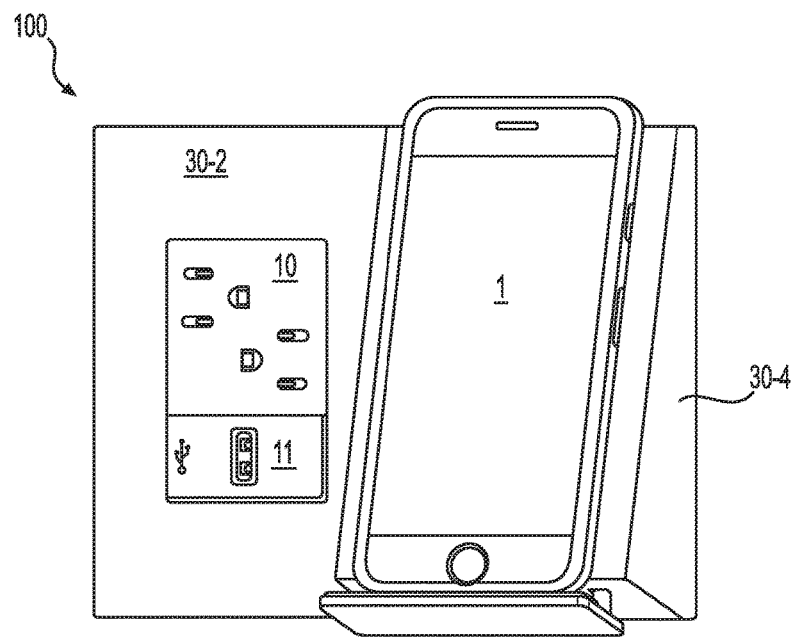
FIG. 18C is a front isometric view of the electrical wiring assembly depicted in FIG. 18A with a portable electronic device in a charging position.

Referring to FIG. 18C, a front isometric view of the electrical wiring assembly 100 depicted in FIG. 18A is disclosed with a portable electronic device in a charging position. This view is identical to FIG. 18A with the exception that a portable device 1 (e.g., a cell phone) is shown resting on the cradle 30-10.

Figures 18D, 18E:
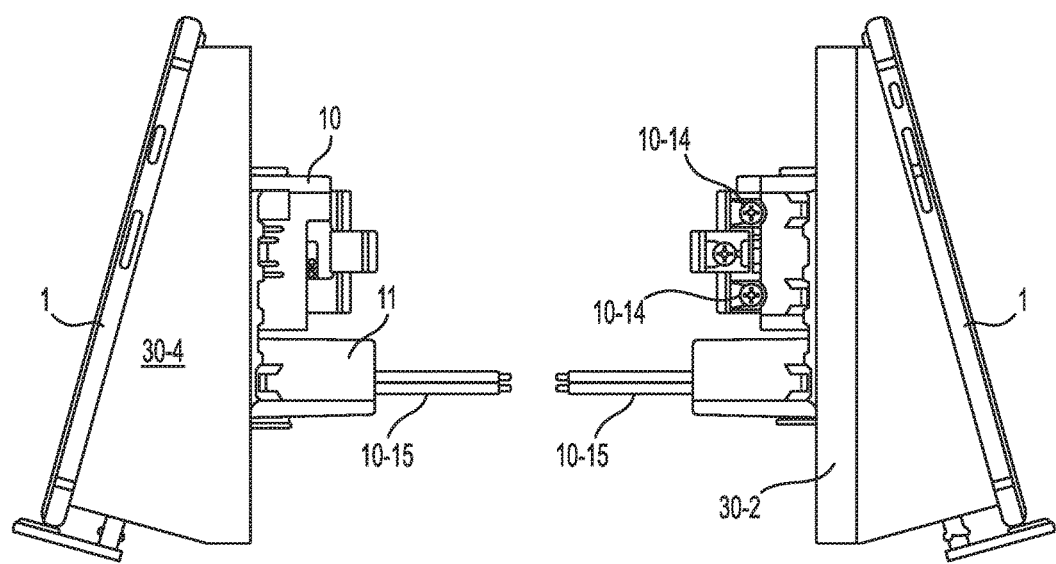
FIG. 18D is a side elevation view of the electrical wiring assembly depicted in FIG. 18A with the portable electronic device in the charging position.
FIG. 18E is another side elevation view of the electrical wiring assembly depicted in FIG. 18A with the portable electronic device in the charging position.

Referring to FIG. 18D, a side elevation view of the electrical wiring assembly 100 depicted in FIG. 18A is disclosed. In this view, the portable electronic device is shown in the charging position. As before, the side wall 30-4 has a substantially triangular shape; thus, the antenna wall plate 30-3 is inclined at an angle θ relative to the substantially vertical wall surface. The angle θ may be within a range substantially between 0° and 20°. Referring to FIG. 18E, another side elevation view of the electrical wiring assembly 100 depicted in FIG. 18A is disclosed. Again, the portable electronic device is shown in the charging position.

Figure 18F:
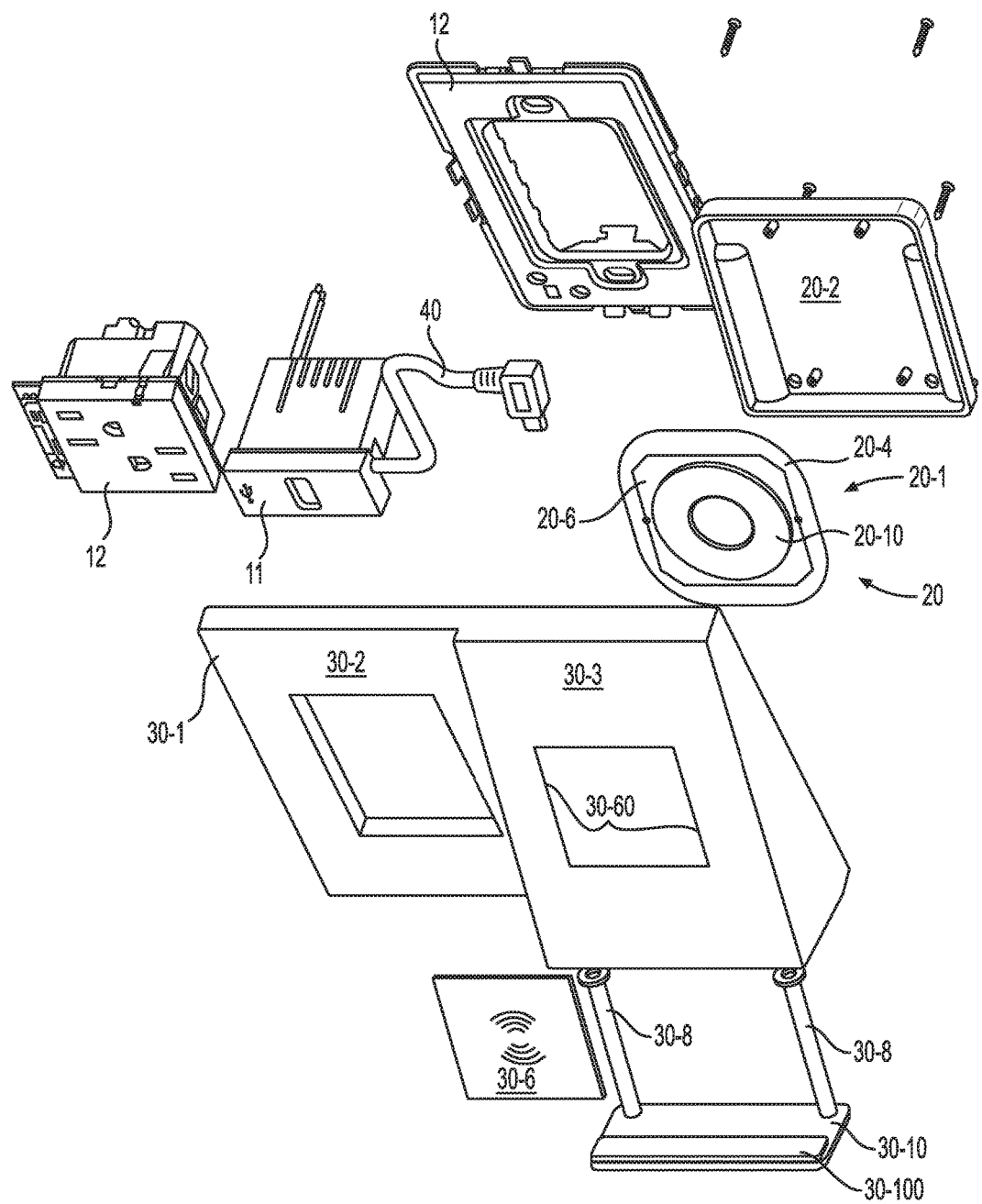
FIG. 18F is an exploded view of the electrical wiring assembly depicted in FIG. 18A.

As embodied herein and depicted in FIG. 18F, an exploded view of the electrical wiring assembly 100 depicted in FIG. 18A is shown. This view shows with more clarity the aesthetic wall plate 30-1 that couples to frame 12; again, the aesthetic cover 30-1 includes an electrical wiring device wall plate portion 30-2 that is integrally formed with the antenna assembly wall plate portion 30-3. The wall plate portion 30-3 includes a recessed region 30-60 that is configured to accommodate the antenna bearing plate 30-6. The antenna housing 20-2 includes a circuit assembly 20-1 that is disposed within the space formed by the antenna back body member 20-2 and the interior wall of plate 30-3. The antenna housing 20-2 is further protected by the side wall 30-4.

As before, the circuit assembly 20-1 includes a printed circuit board (PCB) 20-4. The PCB 20-4 includes various control circuits (not visible in this view) disposed on the back side thereof. The front side includes a shielding structure 20-6 that accommodates a single antenna coil 20-10. The shielding structure 20-6 prevents a magnetic field from heating any metallic structures behind the assembly 100 (e.g., a metallic device box). The PCB 20-4 also includes a plug receptacle 20-40 that is configured to accommodate the plug from the DC supply cord 40. Specifically, the DC supply cord will provide a DC supply voltage (e.g., +5 DCV) for the antenna coil and the control circuitry.

Figure 19A:
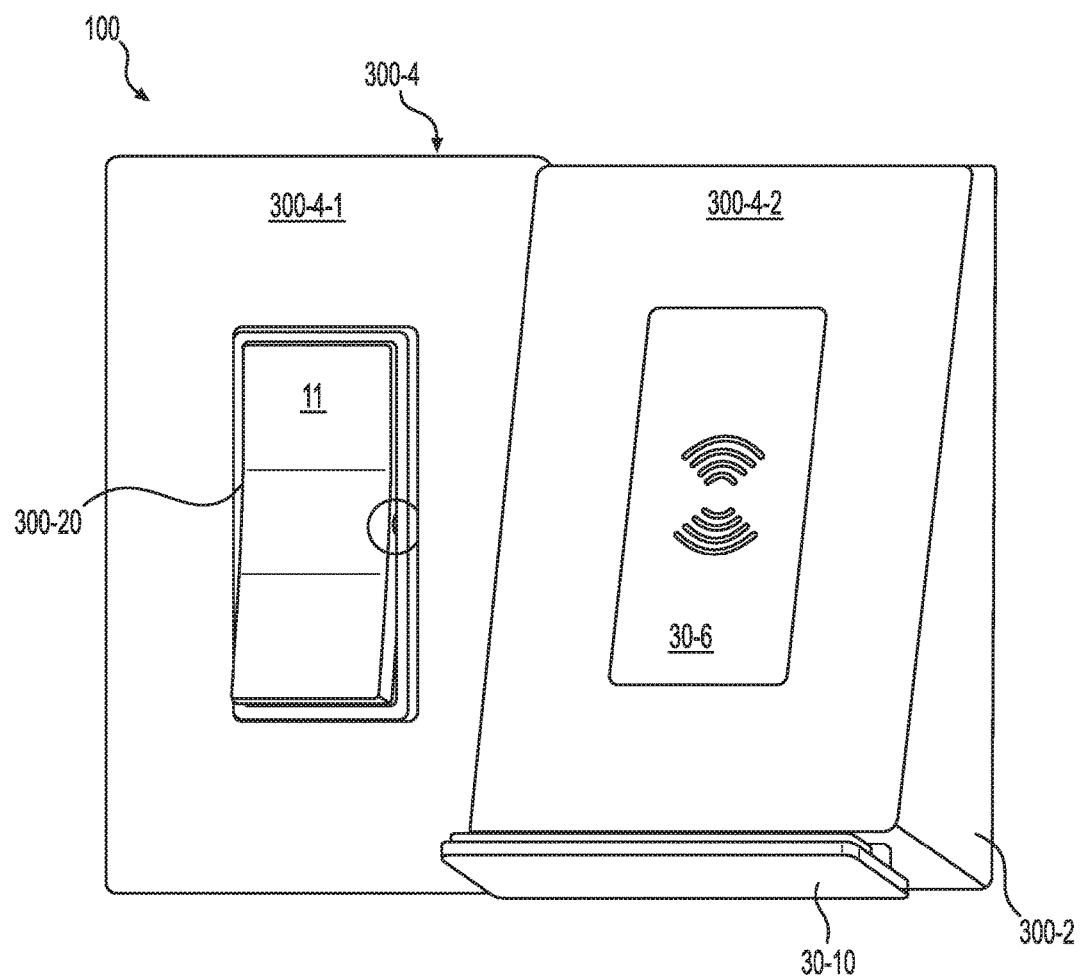
FIGS. 19A-19D are various views of an electrical wiring assembly featuring an electric switch wiring device in accordance with the invention.

Referring to FIGS. 19A-19D, various views of an electrical wiring assembly featuring an electric switch wiring device 11 in accordance with the invention are disclosed. FIG. 19A is a front isometric view of the electrical wiring assembly 100 and features a wall plate housing assembly 300 that is configured to accommodate an electrical switch device 11 and an antenna assembly 20 (not shown in this view). The wall plate assembly 300 includes an integrally formed wall plate 300-4 that includes an electrical wiring device wall plate portion 300-4-1 and an antenna assembly wall plate portion 300-4-2. The integrally formed wall plate 300-4 also includes a side wall 300-2 that has a substantially triangular shape. As before, the wall plate assembly 300 also includes a device cradle 30-10 that includes a cradle pad 30-100 (not shown in this view). The electrical wiring device wall plate portion 300-4-1 has an opening 300-20 formed therein to accommodate the electrical switch device 11.

Figure 19B:
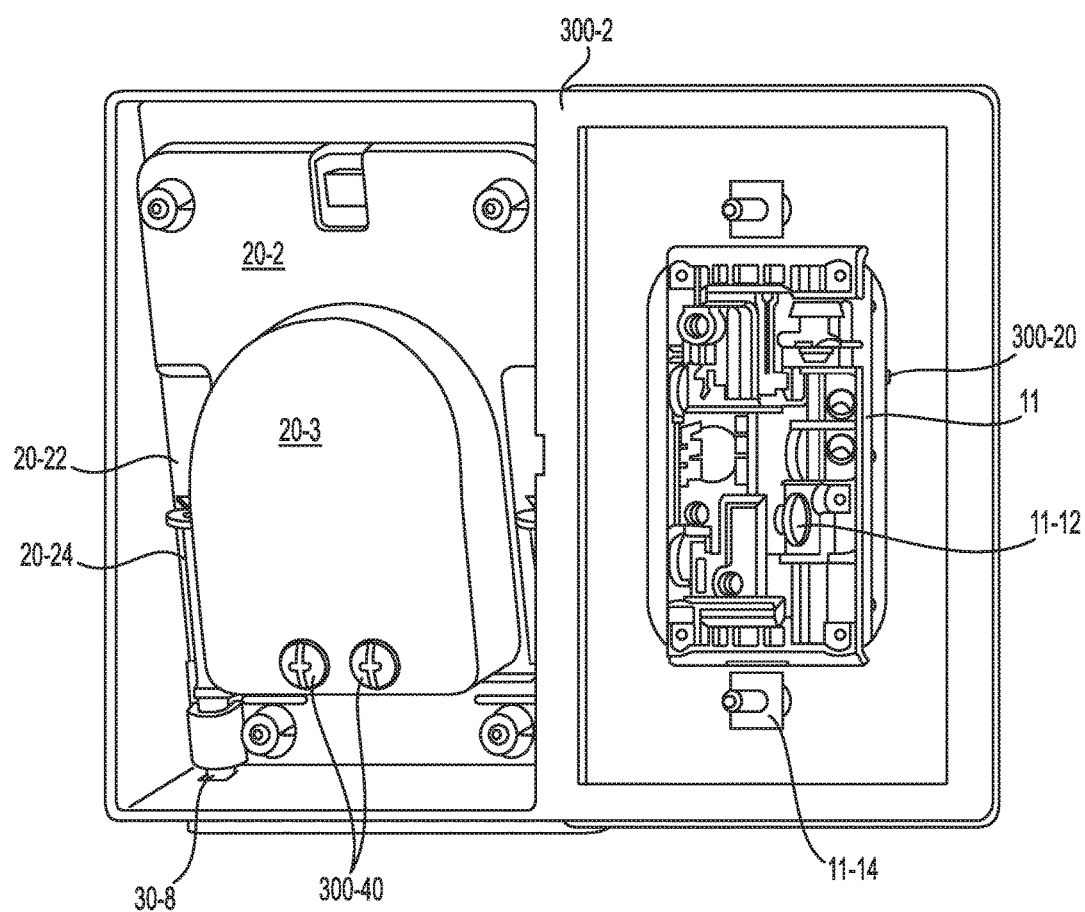

Referring to FIG. 19B, a rear isometric view of the electrical wiring assembly 100 depicted in FIG. 19A is disclosed. The electrical switch device 11 is shown extending through the opening 300-20 so that the wiring terminals 11-12 are accessible for AC wiring. In practice, the electrical switch device 11 is mounted to a single gang device box via the mounting ears 11-12 after the AC wiring is connected to the wiring terminals.

The antenna back body 20-2 is configured to form a rear volume together with the antenna wall plate portion 300-4 and the side wall 300-2. Moreover, the antenna back body 20-2 is configured to be connected to the inside of the antenna wall plate portion 300-4 to complete the antenna assembly 20 enclosure. The antenna back body 20-2 may include a protruding portion 20-3 that accommodates a power supply circuit to convert the 120 VAC into a voltage suitable for the antenna coils 20-10 and the circuitry 20-1. The wiring terminals 300-40 are provided on the protruding portion 20-3 and are coupled to the power supply circuitry therewithin.

As before, the portable device cradle 30-10 is coupled to a ratchet member 30-8 on each side thereof. The ratchet members 30-8 allow the cradle 30-10—and hence the portable device 1—to be adjusted up or down so that the antenna coil(s) in the antenna housing 20-2 are substantially aligned with the antenna coil disposed in the portable device 1. Each ratchet 30-8 is disposed within a recess 20-22 formed in a side portion of the antenna back body 20-2. Each ratchet 30-8 also includes a catch element 30-80 disposed on the ratchet 30-8 end opposite the cradle 30-10. The catch member 30-80 is configured to move between the ratchet steps 20-24 that are formed in the ratchet recess regions 20-22.

Figure 19C:
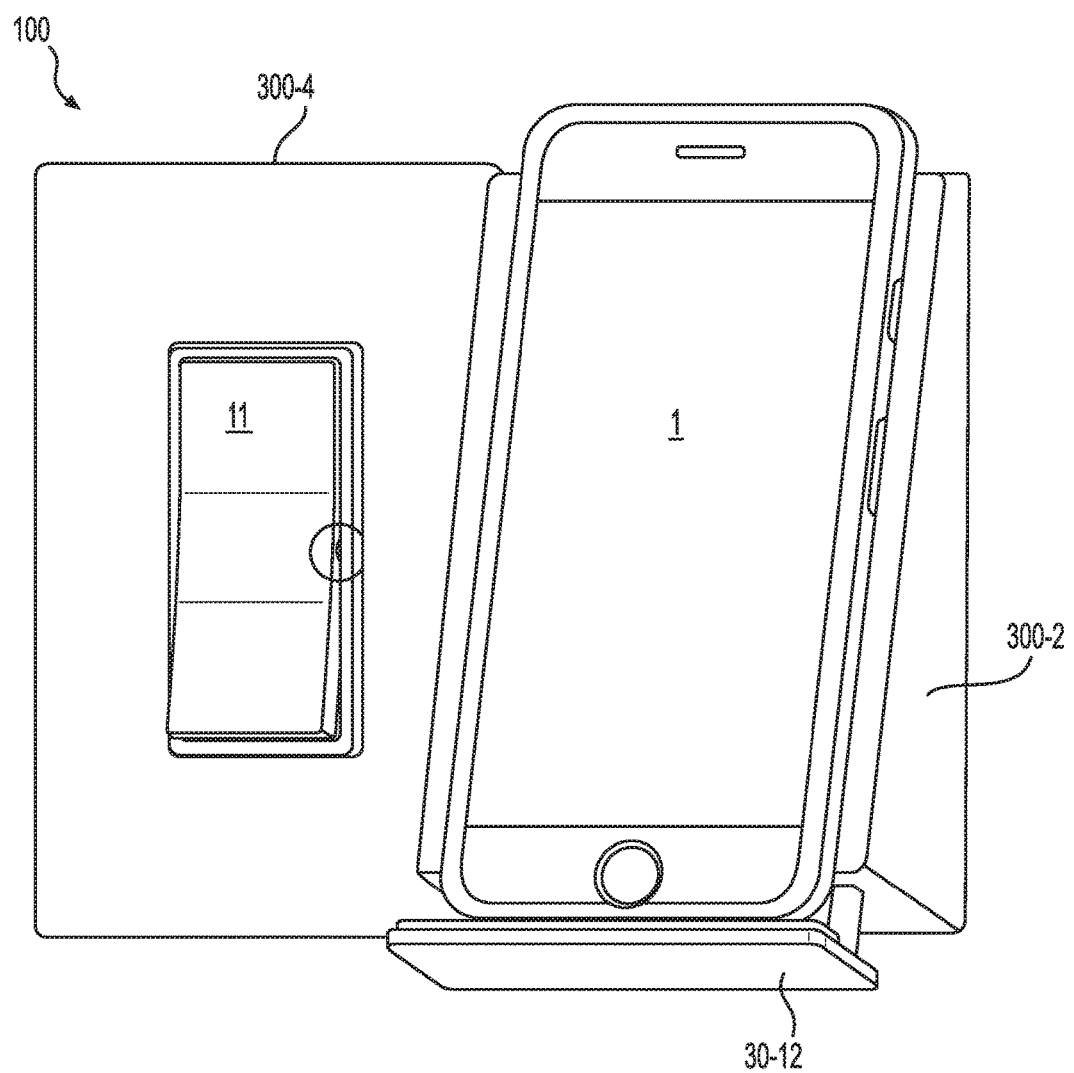

FIG. 19C is another front isometric view of the electrical wiring assembly 100 and is identical to the view provided in FIG. 19A, with the exception that a portable device 1 is disposed on the cradle 30-12.

Figure 19D:
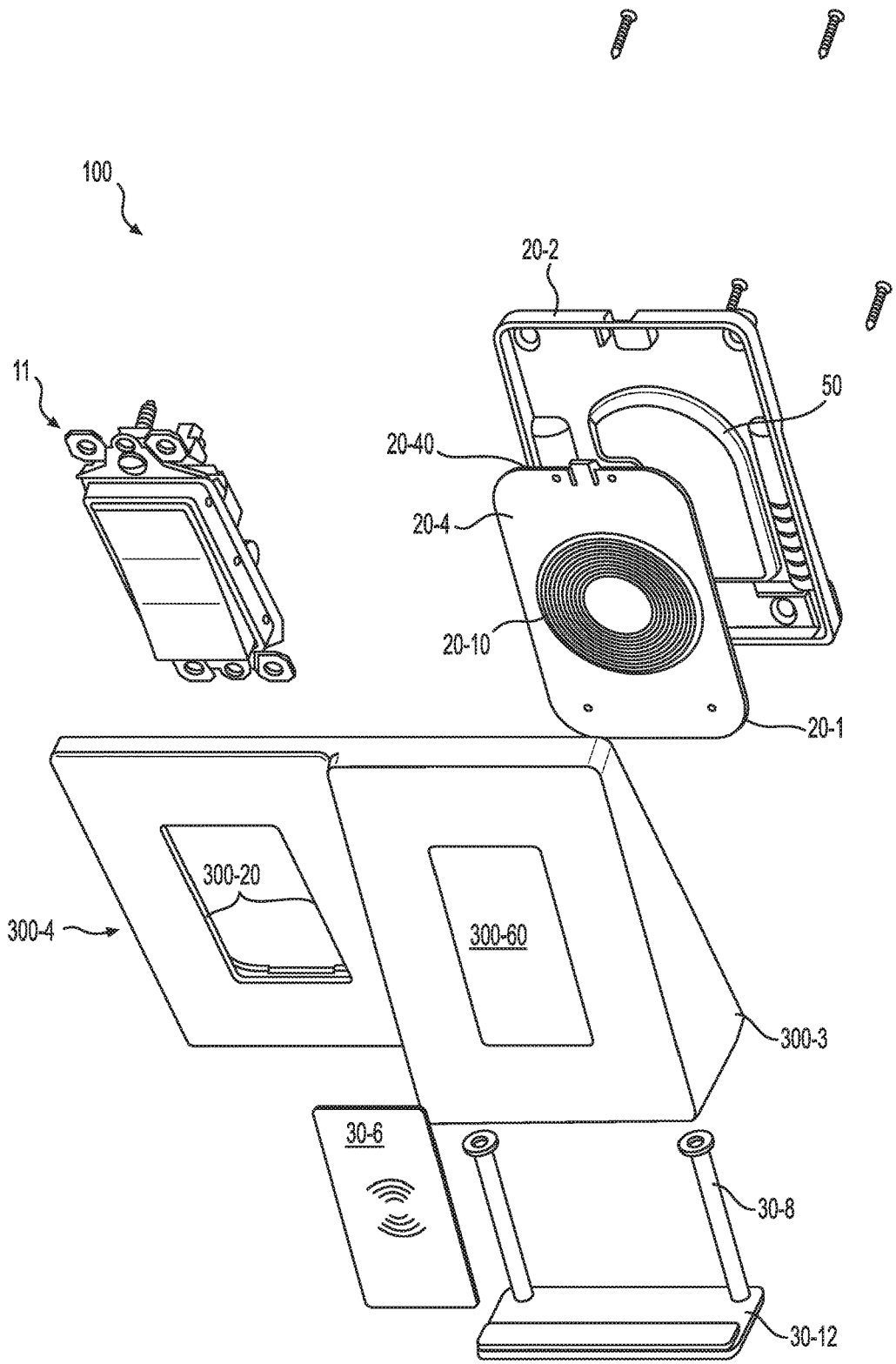

As embodied herein and depicted in FIG. 19D, an exploded view of the electrical wiring assembly 100 depicted in FIG. 19A is shown. This view shows with more clarity the wall plate 300-4, and shows the electrical wiring device wall plate portion 300-4-1 that is integrally formed with the antenna assembly wall plate portion 300-4-2. The wall plate portion 300-4 includes a recessed region 300-60 that is configured to accommodate the antenna bearing plate 30-6. The antenna housing 20-2 includes a circuit assembly 20-1 that is disposed within the space formed by the antenna back body member 20-2 and the interior of the wall plate housing 300-4. The antenna housing 20-2 is further protected by the side wall 300-3.

The circuit assembly 20-1 includes a printed circuit board (PCB) 20-4. The PCB 20-4 includes various control circuits (not visible in this view) disposed on the back side thereof. The front side includes a shielding structure 20-6 that accommodates a single antenna coil 20-10. The shielding structure 20-6 prevents a magnetic field from heating any metallic structures behind the assembly 100 (e.g., a metallic device box or electronic components). The PCB 20-4 also includes an AC interconnection 20-40 that is configured to connect the AC power wiring 50 to the PCB 20-4. The AC wiring 50 is, of course, connected to the wiring terminals 300-40 shown in FIG. 19B.

Figure 20A:
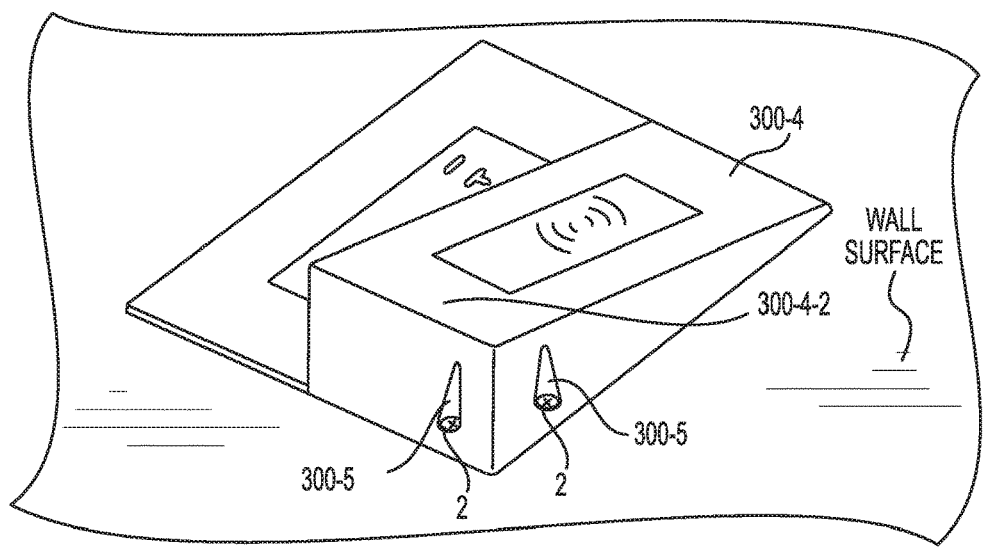
FIGS. 20A-20B are detail views illustrating a method for fastening an antenna wall plate to a mounting surface in accordance with the invention.
Figure 20B:
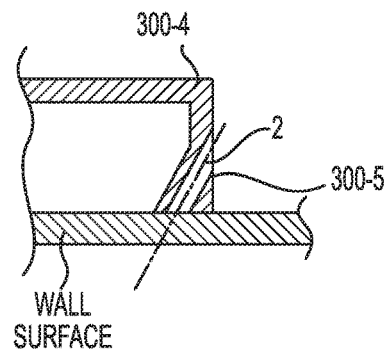

Referring to FIGS. 20A-20B, detail views illustrating a method for fastening an antenna wall plate (30, 300 or 3000) to a mounting surface is disclosed. FIG. 20A is an isometric view of the wall plate 300 from substantially underneath the assembly 100. In this view, the wall plate housing 300-4 is shown to include fastener apertures 300-5; each aperture 300-5 accommodates a suitable fastener 2. FIG. 20B is a sectional view of one of the fastener apertures 300-5 depicted in FIG. 20A. Thus, each fastener aperture 300-5 is substantially slanted so that the fastener screw 2 can attach the antenna wall plate portion 300-4-2 to the wall surface. This embodiment may be employed in conjunction with any of the wall plate embodiments (30, 300 or 3000) described herein.

Figure 21:
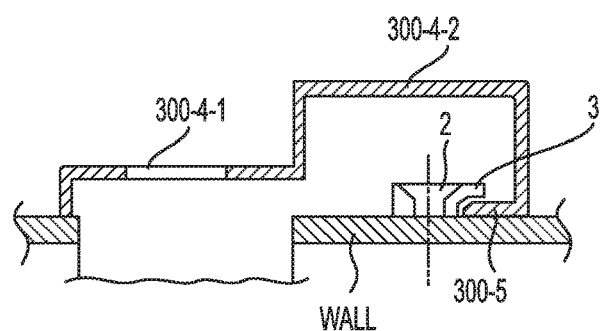
FIG. 21 is a detail view illustrating another method for fastening an antenna wall plate to a mounting surface in accordance with the invention.

Referring to FIG. 21, a detail view illustrating another method for fastening an antenna wall plate (30, 300 or 3000) to a mounting surface is disclosed. In this embodiment, a rear wall mount structure 3 is attached to the wall surface after the wiring device (10, 11) is mounted to the wall box and before the wall plate assembly 300 is installed. The wall plate 300 includes a wall mount catch 300-7 that is configured to engage the rear wall mount structure 3 so that the antenna assembly wall plate portion 300-4-2 is affixed to the wall. Subsequently, the screws for the wiring device portion 300-4-1 can be threaded into the mounting ears 10-14 or wall box to complete the installation. This embodiment may be employed in conjunction with any of the wall plate embodiments (30, 300 or 3000) described herein.

Figure 22:
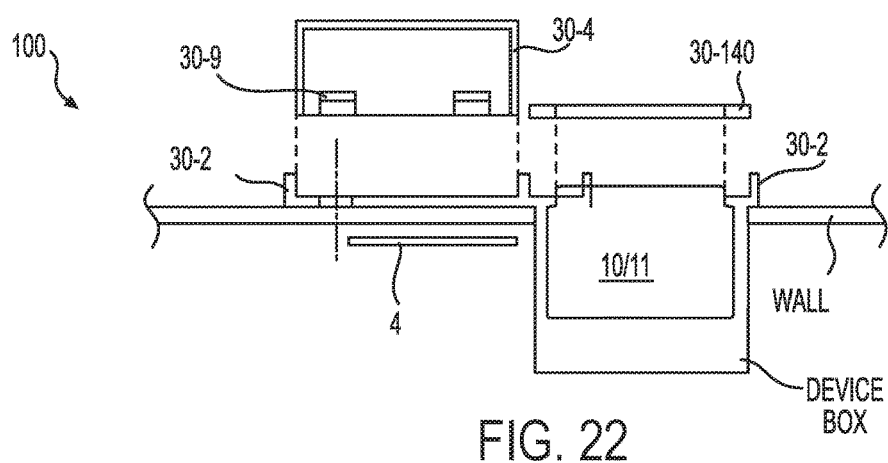
FIG. 22 is a detail view illustrating another method for fastening an antenna wall plate to a mounting surface in accordance with the invention.

Referring to FIG. 22, a detail view illustrating another method for fastening an antenna wall plate to a mounting surface is disclosed. This embodiment may be employed with a wall plate assembly (30, 300, or 3000) that features a rear frame element 30-2, for example. Before the electrical wiring device (10/11) is mounted to the device box via the frame 30-2, an adhesive (PSA) material 4 is applied to the wall at a location under the frame 30-2 that supports the antenna assembly wall plate portion 30-4. Once the frame 30-2 is affixed to the wall by the PSA 4, the electrical device 10/11 may be coupled to the device box via the frame 30-2. After this, the electrical wall plate 30-140 and the antenna wall plate 30-4 may be snapped into the frame 30-2 to complete the installation.

Figure 23A:
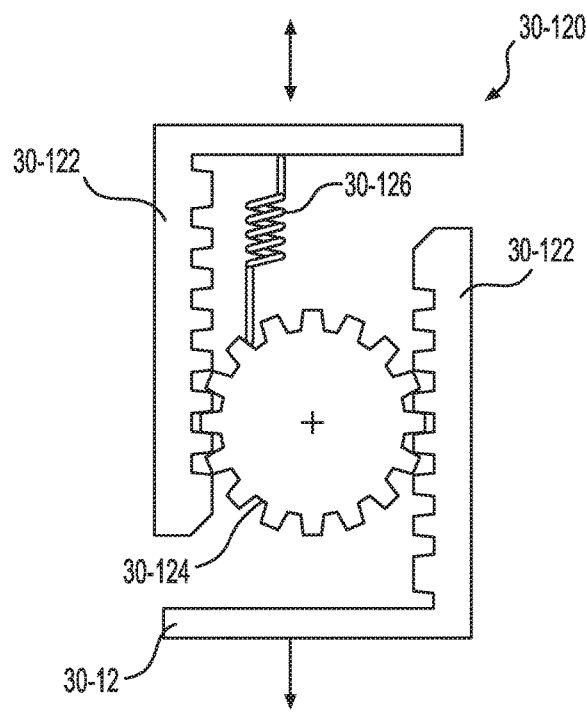
FIGS. 23A-23B are detail views illustrating a holder for accommodating portable electronic devices of varying sizes.
Figure 23B:
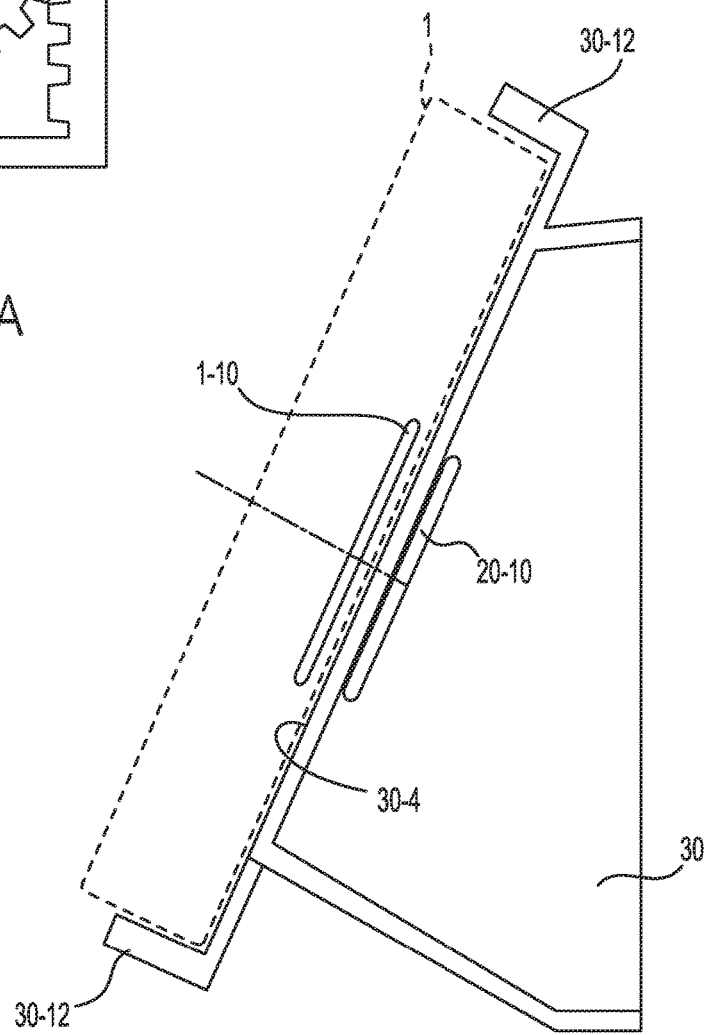

Referring to FIGS. 23A-23B, detail views illustrating a cradle assembly 30-120 for accommodating portable electronic devices of varying sizes are disclosed. In this embodiment, the cradle assembly 30-120 includes top and bottom cradles 30-12 that are coupled to a movable rack portion 30-122. The movable rack portion 30-122 is, in turn, coupled to pinion gear 30-124. The pinion gear 30-124 is coupled to a spring element 30-126 that is configured to drive the rack 30-122 into a minimum sized opening. Thus, when a user places the portable electronic device 1 between the cradles 30-12, the top and bottom cradles 30-12 will separate until the device 1 is therebetween. Moreover, the spring force urges the cradles 30-12 together so that the device is kept firmly in place.

Note that the wall plate assembly 30 is shown to include an inclined surface 30-4; however, this embodiment fully supports an antenna wall plate surface 30-4 that is substantially parallel to the wall surface (i.e., substantially no inclination).

Figure 24A:
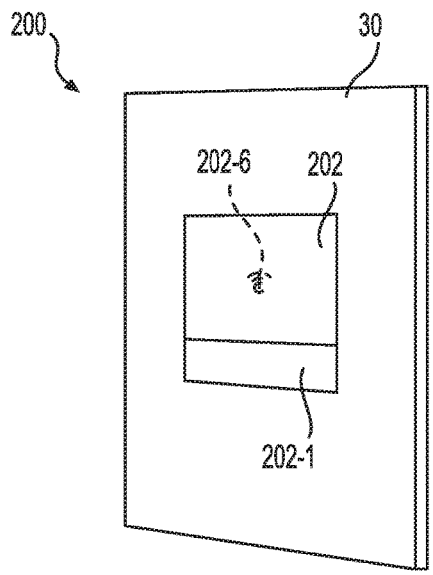
FIGS. 24A-24D include various isometric views of an electrical charger wiring device in accordance with the invention.

Referring to FIGS. 24A-24D, various isometric views of an electrical charger wiring device in accordance with the invention are disclosed. FIG. 24A is a front view of the electrical charger wiring device 200. In this view, the front cover 202 is substantially flush with the wall plate 30. Like a previous embodiment, this embodiment is in a form factor suitable for a modular wiring device system. Reference is made to U.S. patent application Ser. No. 13/680,675, which is incorporated herein by reference as though fully set forth in its entirety, for a more detailed explanation of the modular wiring device system. The wiring device 200 is configured as a two-module device of the type shown in the '675 application. As before, the circuitry 20-1 (not shown in this view) is disposed between a front cover 202 and a back body 204.

Figure 24C:
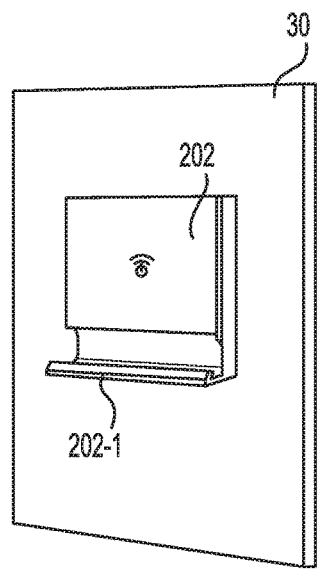
Figure 24B:
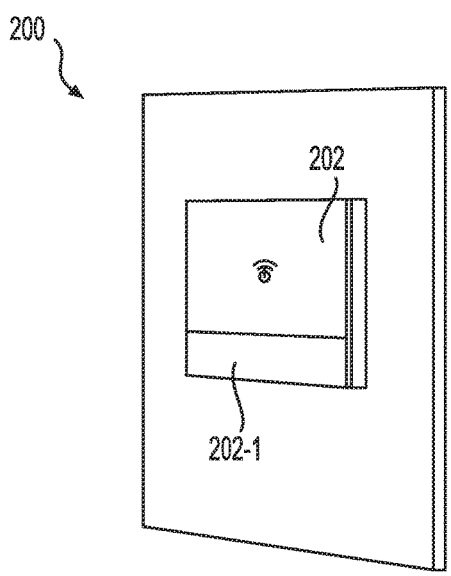
Figure 24D:
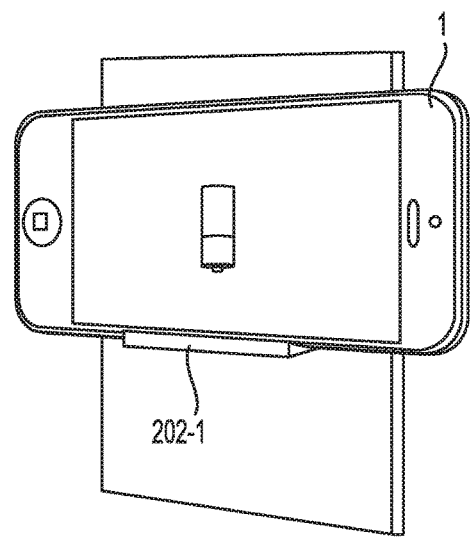

In FIG. 24B, a portion of the front cover 202 is shown extending from the wall plate 30. The back body 204 (not shown in this view) includes push release mechanisms that alternately hold the front cover 202 (and the antenna assembly 20) within the housing 204 and release the front cover 202 in response to being depressed by a user. In FIG. 24C, the cradle is opened and in FIG. 24D, a portable device 1 is placed in the cradle door 202-1. The opening of the cradle door 202-1 can be configured to actuate a switch in the interior of the device that signals the controller to begin a charging routine.

Figures 25A, 25B:
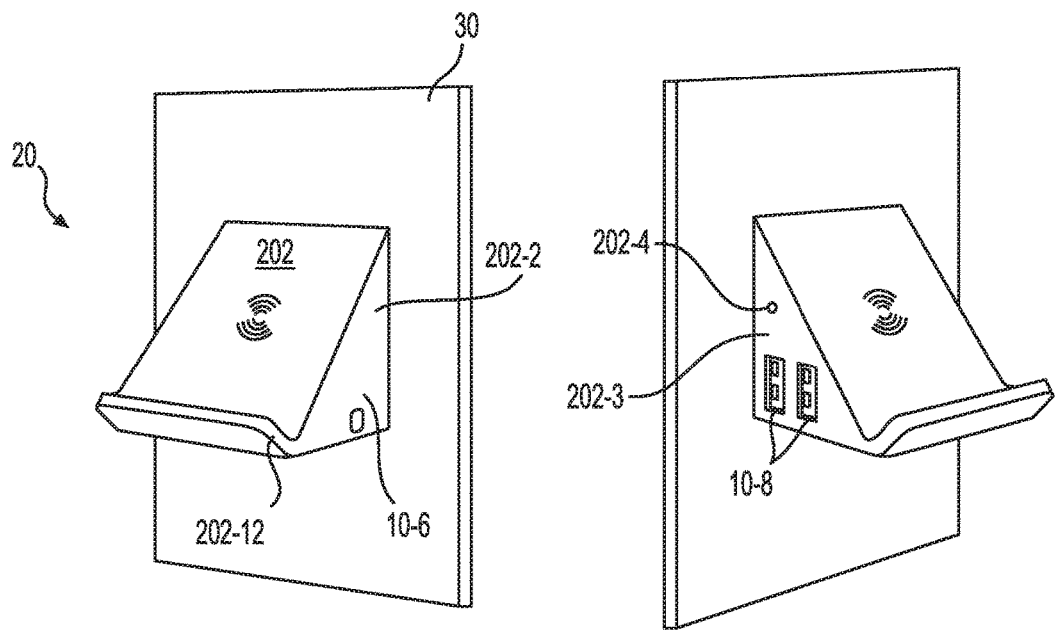
FIGS. 25A-25C include various isometric views of an electrical charger wiring device in accordance with the invention.
Figure 25C:
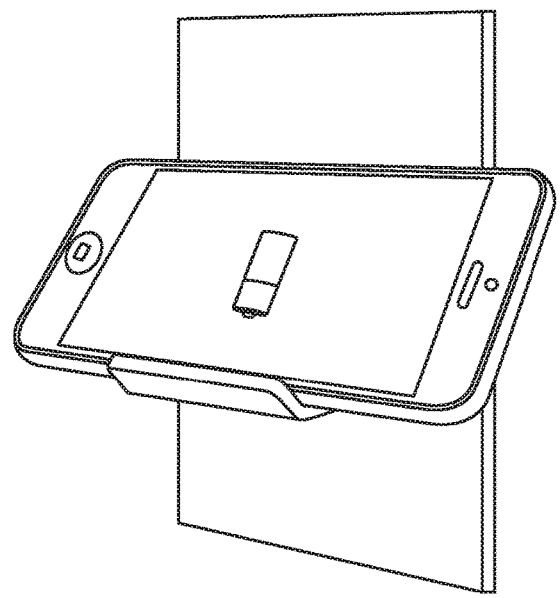

Referring to FIGS. 25A-25C, various isometric views of an electrical charger wiring device 200 in accordance with the invention are disclosed. Like a previous embodiment, this embodiment is in a form factor suitable for a modular wiring device system. Reference is made to U.S. patent application Ser. No. 13/680,675, which is incorporated herein by reference as though fully set forth in its entirety, for a more detailed explanation of the modular wiring device system.

In FIG. 25A, the front cover 202 is inclined to accommodate a portable electrical device 1 so that side wall 202-2 has a substantially triangular form factor that accommodates an electrical receptacle 10-6. The opposing side wall 202-3 includes several USB ports 10-8. Thus, the triangularly shaped wiring device 202 includes a 120 VAC to low voltage power supply of the type described herein. The opposing side wall 202-3 also includes a charger switch 202-4 that may be used to signal the controller to begin a charging routine. FIG. 25C shows the portable device in charging position.

Referring to FIGS. 26A-26D, various isometric views of an electrical charger wiring device 200 in accordance with the invention are disclosed. Like a previous embodiment, this embodiment is in a form factor suitable for a modular wiring device system. Reference is made to U.S. patent application Ser. No. 13/680,675, which is incorporated herein by reference as though fully set forth in its entirety, for a more detailed explanation of the modular wiring device system.

Figure 26A:
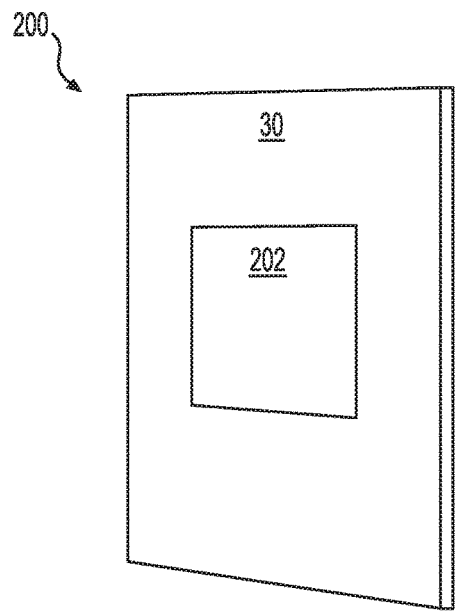
FIGS. 26A-26D include various isometric views of an electrical charger wiring device in accordance with the invention.
Figure 26B:
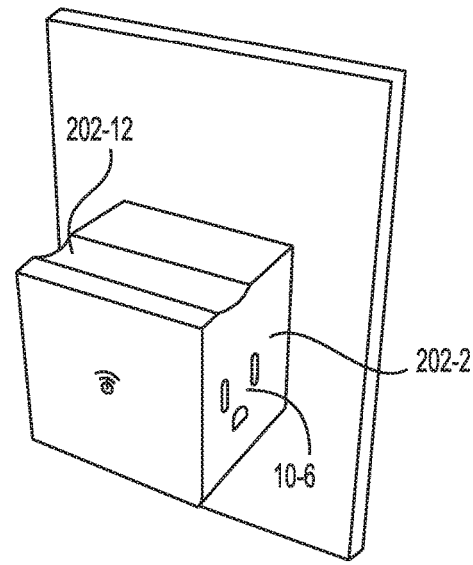

FIG. 26A shows the front cover 202 flush with the cover plate 30. As illustrated by FIG. 26B, a rear housing 204 (not shown in this view) includes push release mechanisms that alternately hold a front enclosure 202 (and the antenna assembly 20) within the rear housing 204 and release the front enclosure 202 in response to being depressed by a user.

Figure 26C:
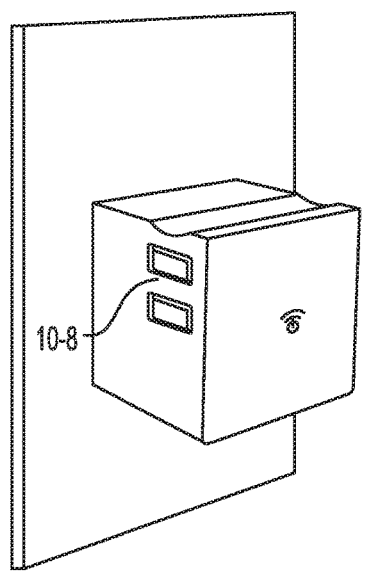
Figure 26D:
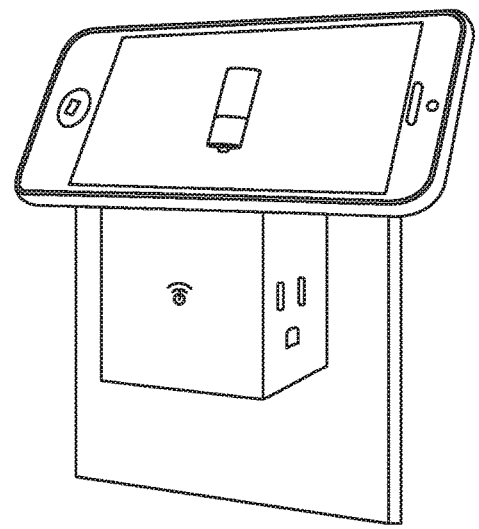

In FIG. 26B, a side wall 202-2 of the front enclosure 202 has a substantially rectangular form factor that accommodates an electrical receptacle 10-6. The opposing side wall 202-3 includes several USB ports 10-8. Thus, the rectangular shaped wiring device 202 includes a 120 VAC to low voltage power supply of the type described herein. In FIG. 26C, the opposing side wall 202-3 may include a charger switch 202-4 that may be used to signal the controller to begin a charging routine (not shown in this view). In another embodiment, the cradle surface 202-12 may include a capacitive touch plate that signals the controller to begin charging. FIG. 26D shows the portable device in charging position.

Figure 27A:
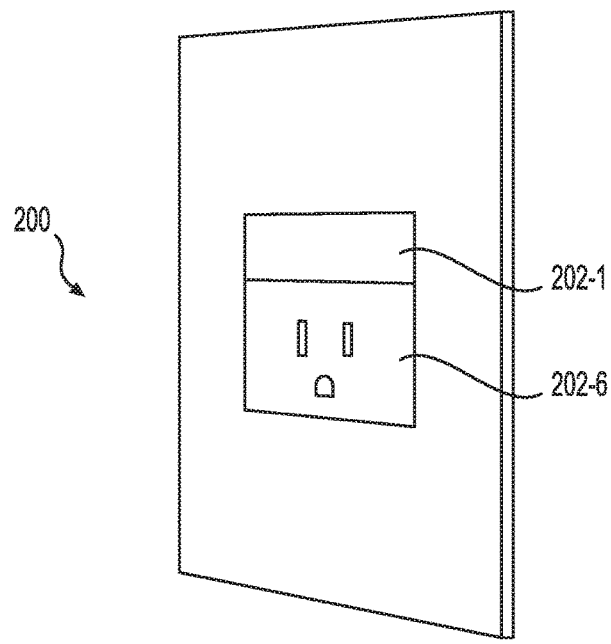
FIGS. 27A-27B include various isometric views of an electrical charger wiring device in accordance with the invention.
Figure 27B:
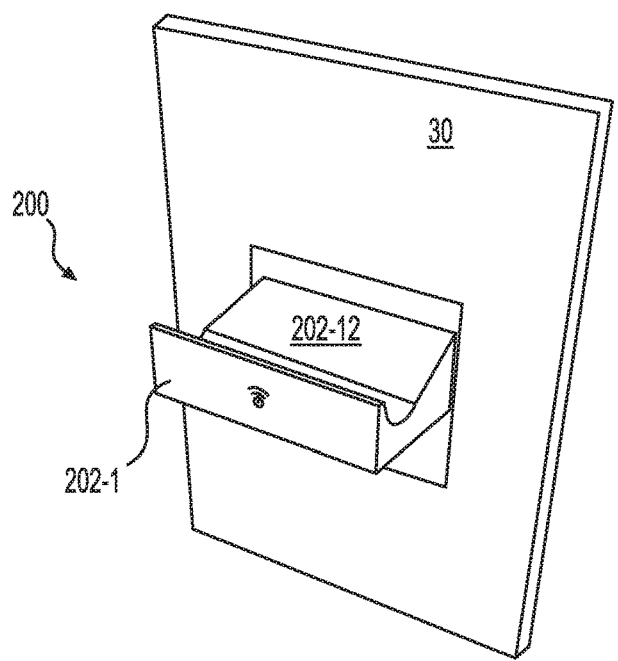

Referring to FIGS. 27A-27B, various isometric views of an electrical charger wiring device 200 in accordance with the invention are disclosed. Like a previous embodiment, this embodiment is in a form factor suitable for a modular wiring device system. Reference is made to U.S. patent application Ser. No. 13/680,675, which is incorporated herein by reference as though fully set forth in its entirety, for a more detailed explanation of the modular wiring device system.

In FIG. 27A, the front cover 202 is flush with the cover plate 30. As illustrated by FIG. 27B, a rear housing 204 (not shown in this view) includes push release mechanisms that alternately hold the cradle assembly 202-12 within the rear housing 204 and release the cradle assembly 202-12 in response to being depressed by a user. In this embodiment, the antenna logo plate—which locates the antenna coil—is disposed on the cradle. Thus, the antenna coil 20-10 is disposed in the retractable cradle 202-12. In an alternate embodiment, the antenna coil 20-10 may be disposed behind the wall plate 30.

Figure 28A:
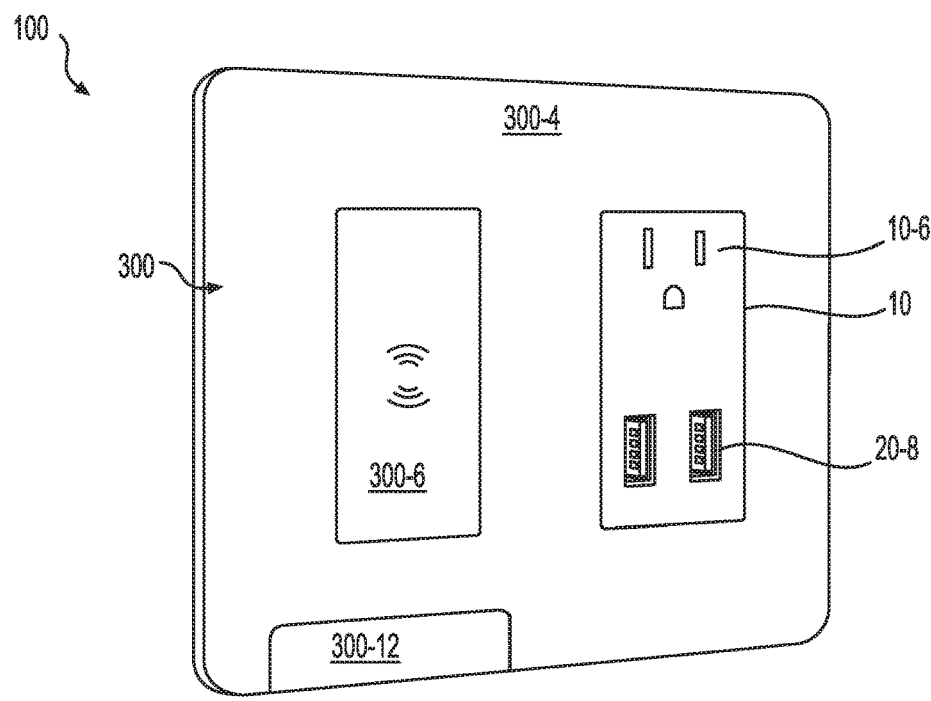
FIGS. 28A-28B include isometric views of an electrical wiring assembly in accordance with another embodiment of the invention.
Figure 28B:
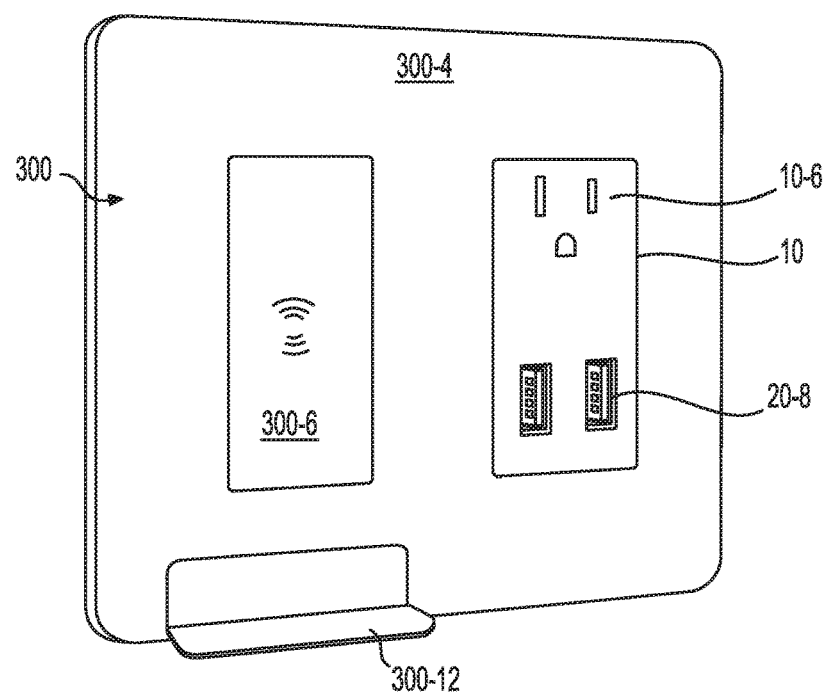

Referring to FIGS. 28A-28B, isometric views of an electrical wiring assembly 100 in accordance with another embodiment of the invention are disclosed. This embodiment is similar to the embodiments described in conjunction with FIGS. 1-6. Thus, in reference to the embodiment of FIG. 4, for example, the electrical assembly 100 may include a wall plate housing assembly 300 that includes a back body sub-plate 300-2 (not shown) coupled to a single wall plate cover 300-4 to form the wall plate housing assembly 300. The electrical wiring device 10 and the antenna assembly 20 (not shown in this view) are substantially disposed within the housing 300. Note that the rear portion of the electrical wiring device is open at the rear to allow for access to the AC wiring terminals 10-14 (not shown). This embodiment differs from previous embodiments in that the wall plate cover 300-4 is flush relative to the mounting (wall) surface. In this embodiment, the wall plate cover 300-4 includes a device cradle door 300-12 that is flush in FIG. 28A and open in FIG. 28B. As before, the antenna logo plate 300-6 is disposed on the wall plate cover 300-4 to identify the position of the antenna assembly 20 within the housing 300.

Figure 29A:
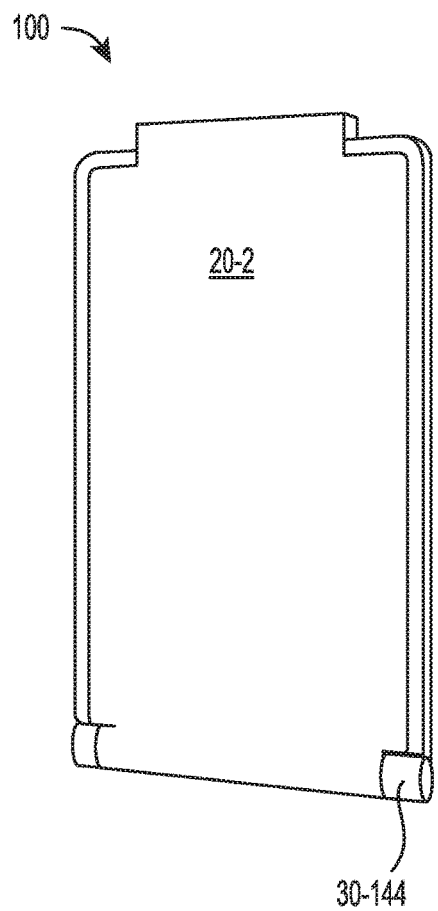
FIGS. 29A-29B include isometric views of an electrical wiring assembly in accordance with another embodiment of the invention.
Figure 29B:
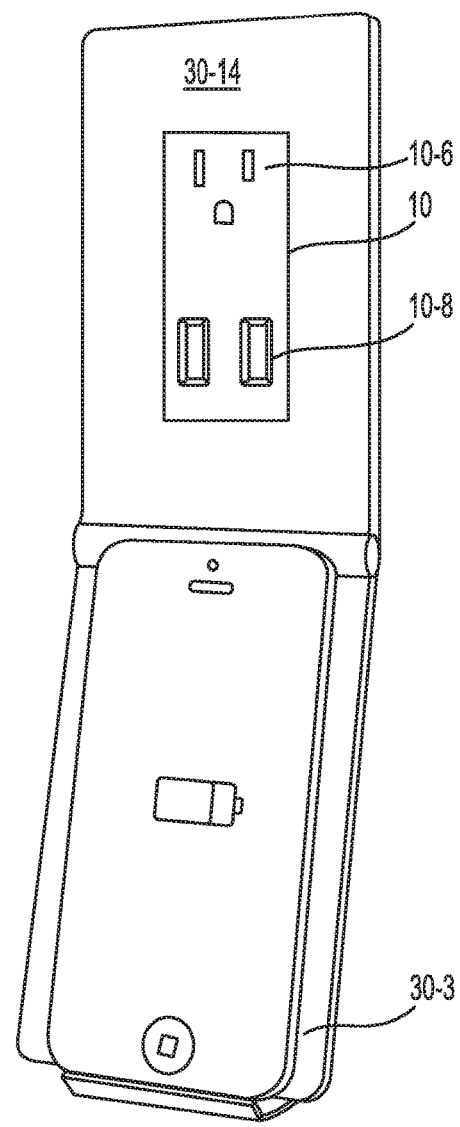

Referring to FIGS. 29A-29B, isometric views of an electrical wiring assembly 100 in accordance with another embodiment of the invention are disclosed. This embodiment is similar to the one shown in FIGS. 5A-5E. Similarly, the wall plate assembly 30 includes a wall plate 30-14 that is coupled to that antenna back plate 20-2 by a hinge element 30-144. The antenna assembly 20 is disposed between the antenna back plate 20-2 and the antenna wall plate 30-3. In FIG. 29A, the antenna wall plate assembly 30 is shown in the stowed position substantially flush to the wall surface. In FIG. 29B, the antenna wall plate assembly 30 is rotated outwardly and inclined at an inclination angle θ relative to the wall surface.

Figure 30:
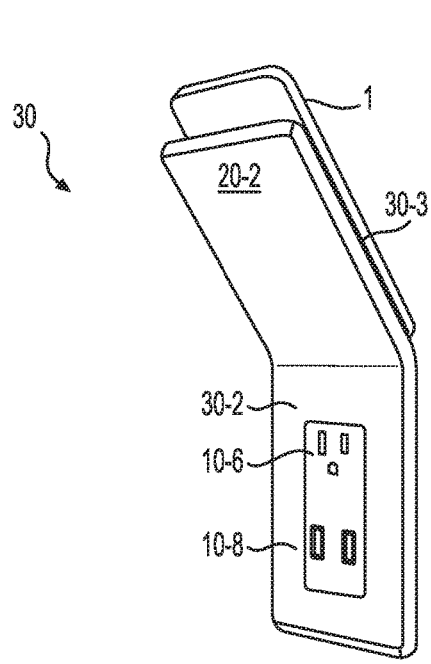
FIG. 30 includes an isometric view of an electrical wiring assembly in accordance with another embodiment of the invention.

Referring to FIG. 30, an isometric view of an electrical wiring assembly in accordance with another embodiment of the invention is disclosed. This embodiment is similar to the one depicted in FIGS. 29A-B, with the exception that the charger portion 30 is disposed above the wiring device 10 and at a fixed angle relative to the mounting surface. Moreover, since the antenna wall plate cover 30-3 is facing the wall, the antenna rear compartment 20-2 faces outwardly. Since the same reference numbers are used to refer to the same or like parts, no further description is deemed necessary.

Figure 31:
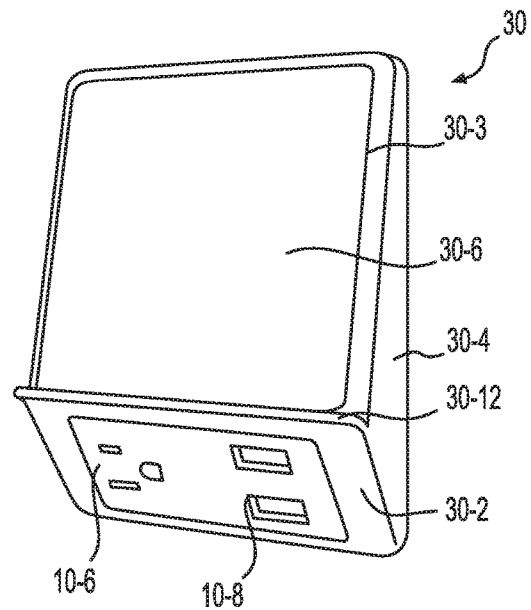
FIG. 31 includes an isometric view of an electrical wiring assembly in accordance with another embodiment of the invention.

Referring to FIG. 31, an isometric view of an electrical wiring assembly in accordance with another embodiment of the invention is disclosed. This embodiment is similar to the one depicted in FIGS. 4A-4C because it includes an integrally formed wall plate 30 that has substantially triangular side walls 30-4 that extend at an angle so that the antenna wall plate portion 30-3 is inclined. This embodiment features a lower inclined wall 30-2 that is configured to accommodate an outlet receptacle 10-6 and two USB ports

10-8. Since the same reference numbers are used to refer to the same or like parts, no further description is deemed necessary.

Figure 32A:
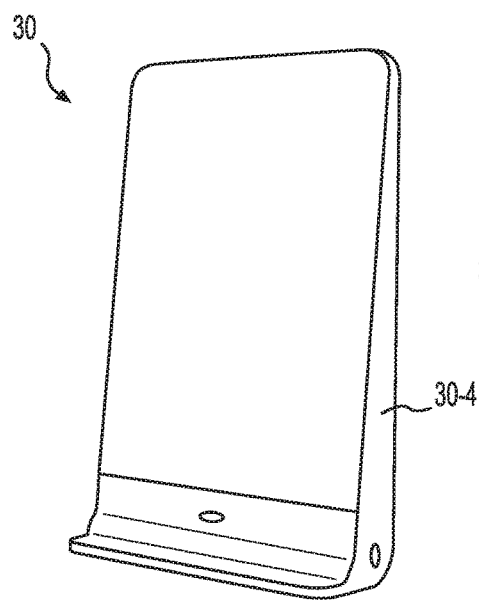
FIGS. 32A-32B include isometric views of an electrical wiring assembly in accordance with another embodiment of the invention.
Figure 32B:
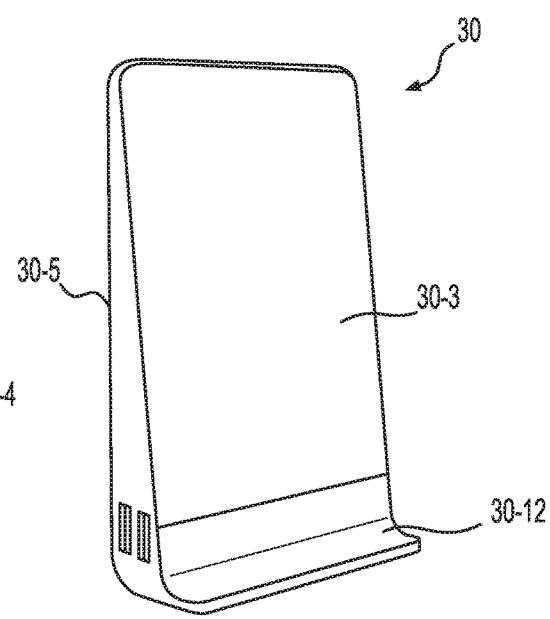

Referring to FIGS. 32A-32B, isometric views of an electrical wiring assembly in accordance with another embodiment of the invention are disclosed. This embodiment is similar to the one depicted in FIGS. 4A-4C and 31 because it includes an integrally formed wall plate 30 that has substantially triangular side walls 30-4 that extend at an angle so that the antenna wall plate portion 30-3 is inclined. One side wall 30-4 includes an outlet receptacle 10-6. The opposite side wall 30-5 includes two USB ports 10-8. Since the same reference numbers are used to refer to the same or like parts, no further description is deemed necessary.

Referring to FIG. 33 A, a front isometric view of an electrical wiring assembly in accordance with another embodiment of the invention is disclosed. In this embodiment, electrical assembly 100 includes a wall plate housing assembly 300. The wall plate housing assembly 300 includes a single wall plate cover 300-4 coupled to a rear sub-plate 300-2 and an antenna back body 20-2 to form the wall plate housing assembly 300. The electrical wiring device 10 and the antenna assembly 20 (not shown in this view) are substantially disposed within the housing 300. Note that the rear portion of the electrical wiring device is open at the rear to allow for access to the AC wiring terminals 10-14. The wall plate cover 300-4 has an opening 300-20 formed therein to accommodate the electrical wiring device 10, and a recessed portion 300-60 configured to retain the antenna logo plate 300-6. As described herein, wiring device 10 includes a USB port 10-8 for charging a portable device by way of a cord terminated with a USB plug when inserted in port 10-8. The USB port 10-8 is powered by an AC/DC converter circuit inside electrical wiring device 10 (not shown). Reference is made to U.S. Pat. No. 8,758,031 which is incorporated herein by reference in its entirety for all that it teaches including a USB wiring device and all of its related circuitry and mechanical aspects.

The antenna logo plate 300-6 is disposed on the wall plate cover 300-4 within a recessed portion (30-60) for identifying the position of the antenna assembly 20 within the housing 300. The plate 300-6 is comprised of a material that has a relatively high coefficient of friction for the reasons provided above. As described below, the antenna housing includes two primary coils (20-10-1, 20-10-2) that are configured to provide a more robust magnetic field, thus the need for an adjustable cradle is eliminated.

The wall plate cover 300-4 also includes a portable device cradle 70. The cradle 70 may include a cradle gripper 70-1 that is spring biased or otherwise configured such that cradle 70 holds the portable electronic device against the antenna logo plate 300-6. The cradle 70 is mounted to a bottom portion 70-2 of the front cover 300-4.

Figure 33A:
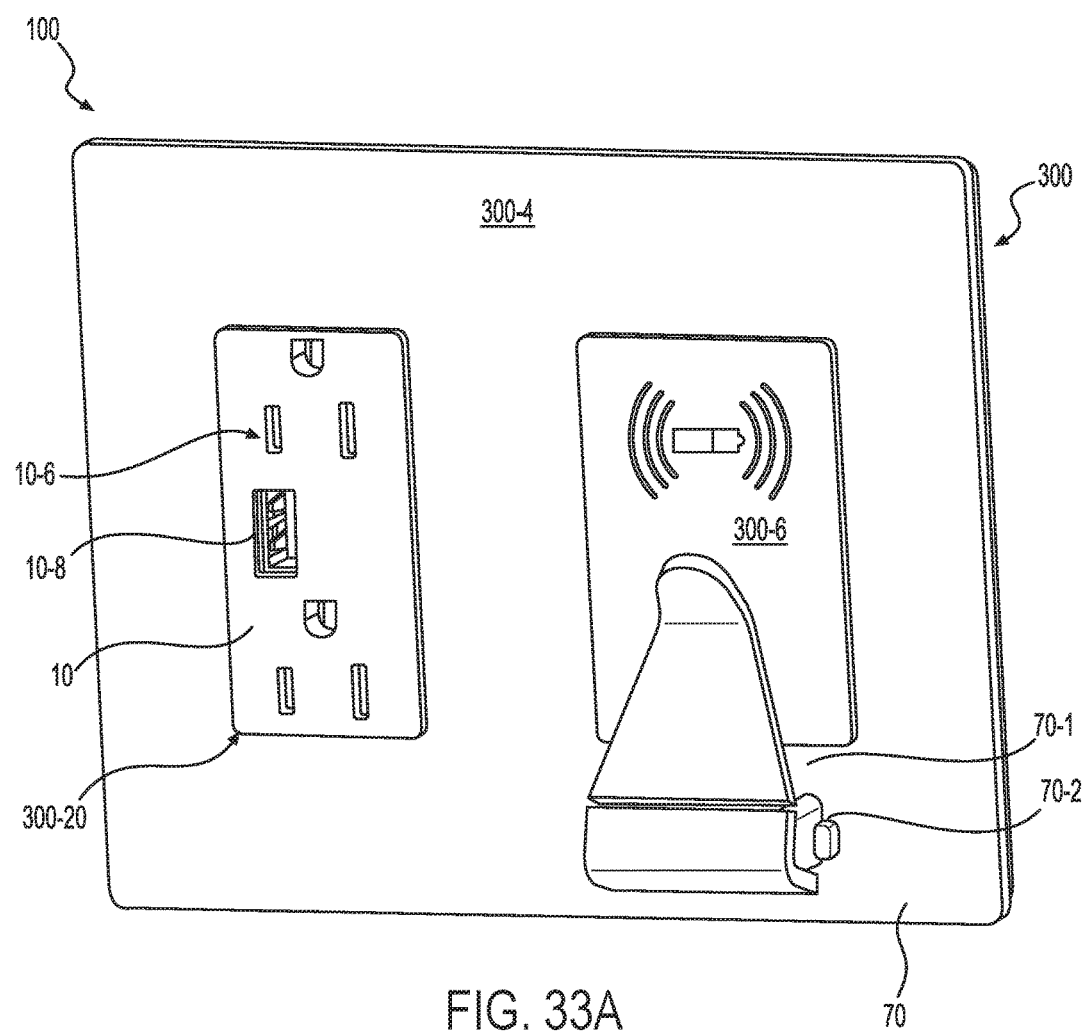
FIG. 33A is a front isometric view of an electrical wiring assembly in accordance with another embodiment of the invention.
Figure 33B:
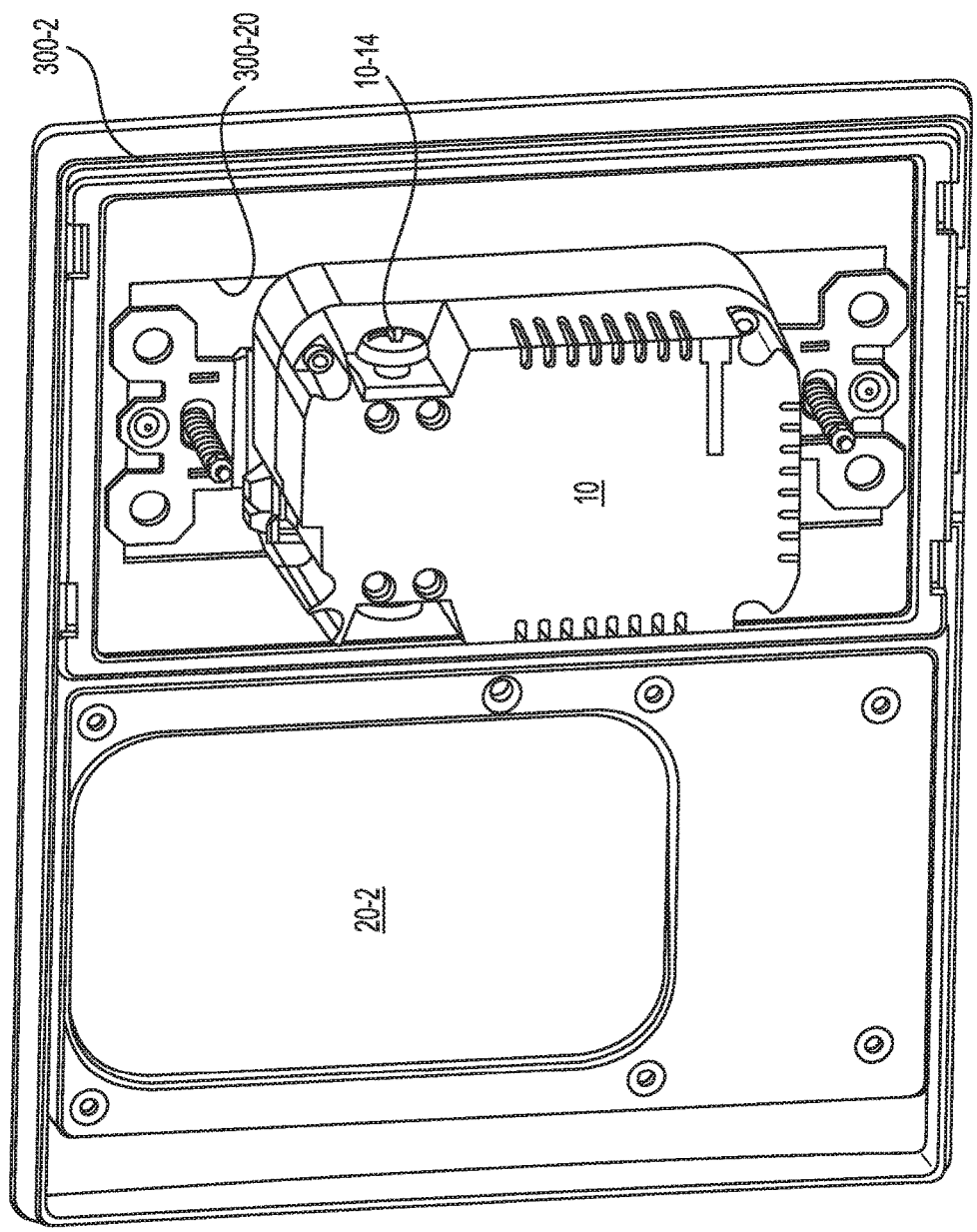
FIG. 33B is a rear isometric view of the electrical wiring assembly depicted in FIG. 33A.

Referring to FIG. 33B, a rear isometric view of the electrical wiring assembly 100 depicted in FIG. 33A is disclosed. The electrical wiring device 10 extends through the opening 300-20. As before, the electrical wiring device 10 is mounted to the device box after the AC wiring is connected to the wiring terminals 10-14 and then the wall plate cover 300-4 is attached.

Figure 33C:
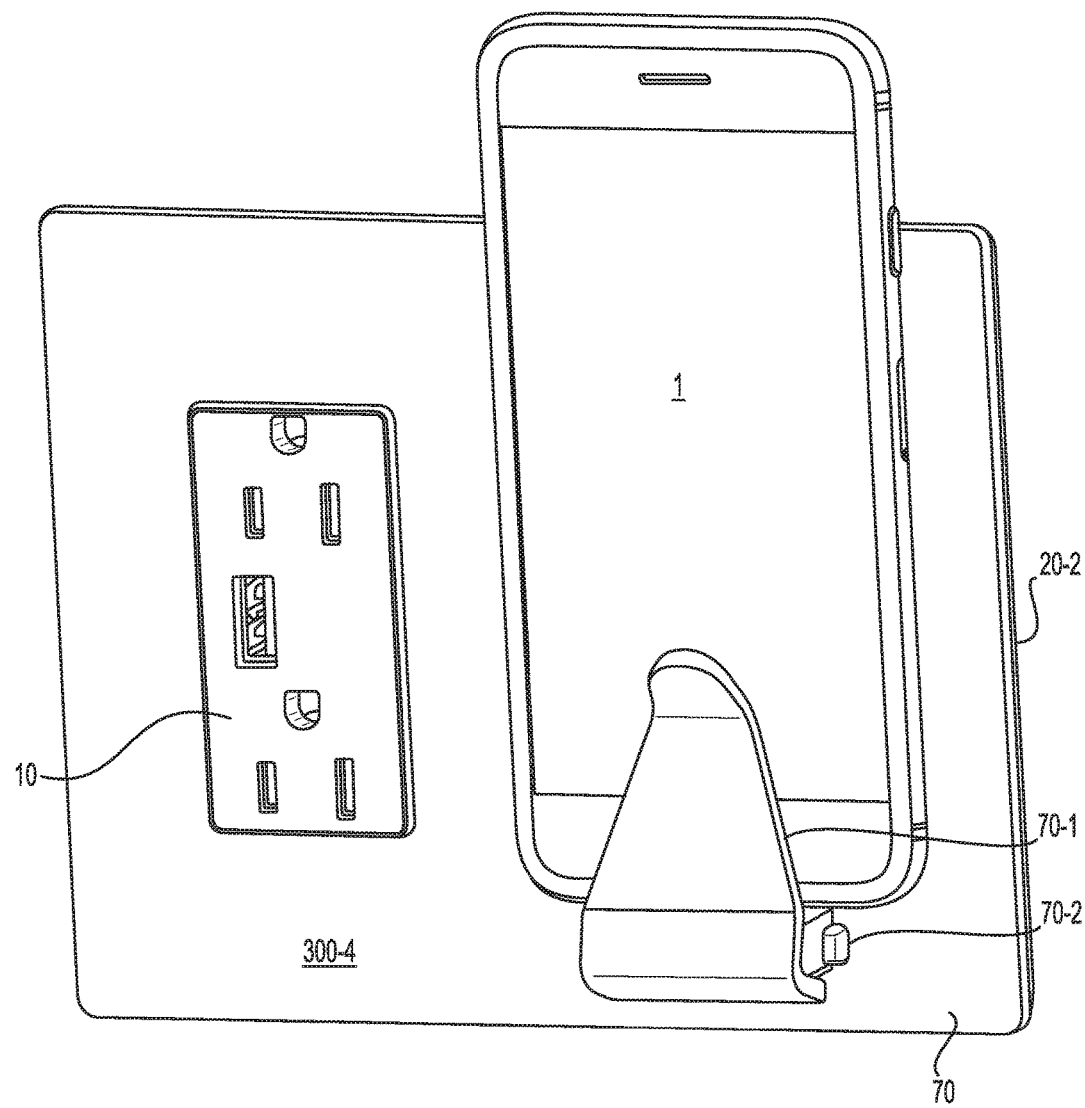
FIG. 33C is a front isometric view of the electrical wiring assembly depicted in FIG. 33A with a portable electronic device in a charging position.

Referring to FIG. 33C, a front isometric view of the electrical wiring assembly depicted in FIG. 33A is disclosed with a portable electronic device in a charging position. This view is identical to FIG. 33A with the exception that a portable device 1 (e.g., a cell phone) is shown resting within cradle 70. The portable electronic device so held is designed to be charged via wireless transmission, a cord whose plug is configured to plug into USB port 10-8, or a cord connected to a battery pack and plug arrangement that derives power from one of the outlet receptacles 10-6.

Figure 33D:
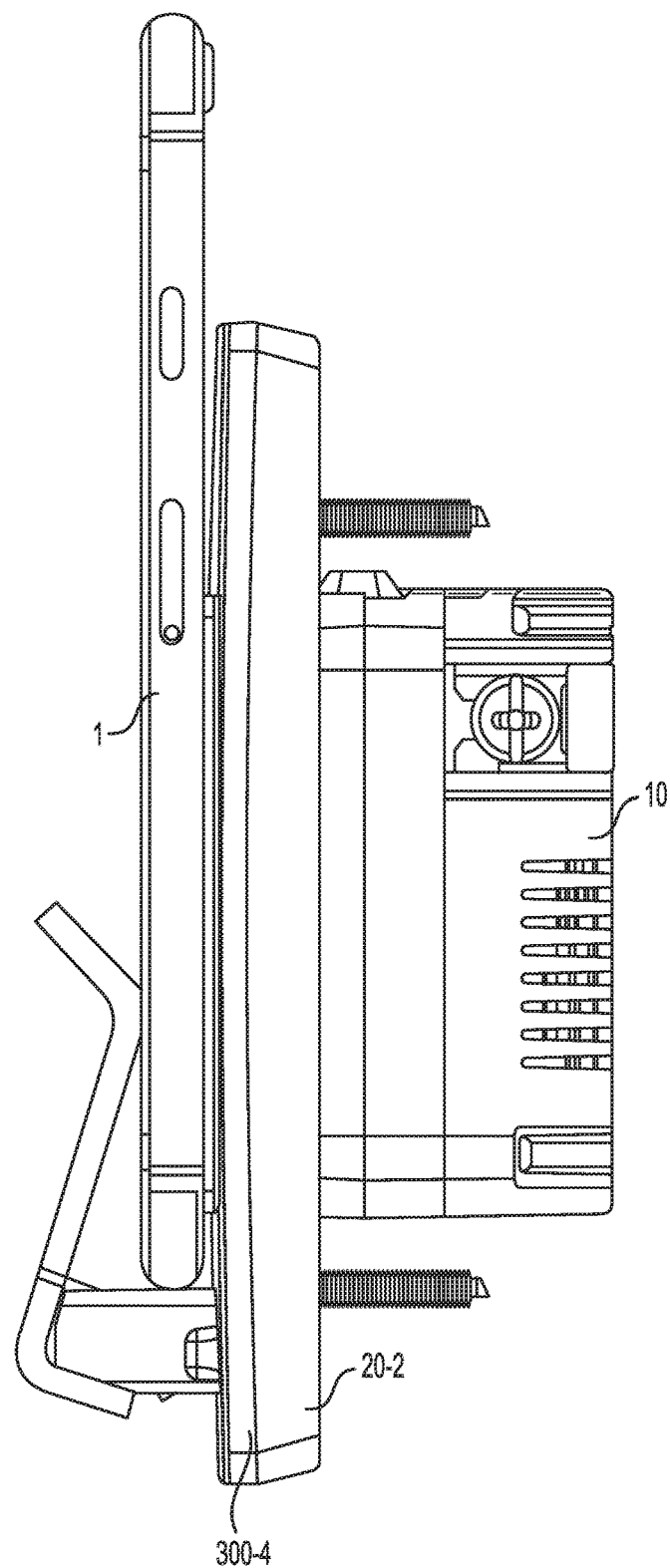
FIG. 33D is a side elevation view of the electric wiring assembly depicted in FIG. 33A with a portable electronic device in a charging position.

Referring to FIG. 33D, a side elevation view of the electrical wiring assembly depicted in FIG. 33A is disclosed. In this view, a portable electronic device is shown in the charging position. As noted above, the cradle gripper 70-1 is spring biased such that the user can pull gripper 70-1 away from the antenna logo plate 300-6, insert the portable electronic device between the gripper 70-1 and the plate 300-6 and release cradle gripper 70-1 to secure the device in position against the plate 300-6.

Figure 33E:
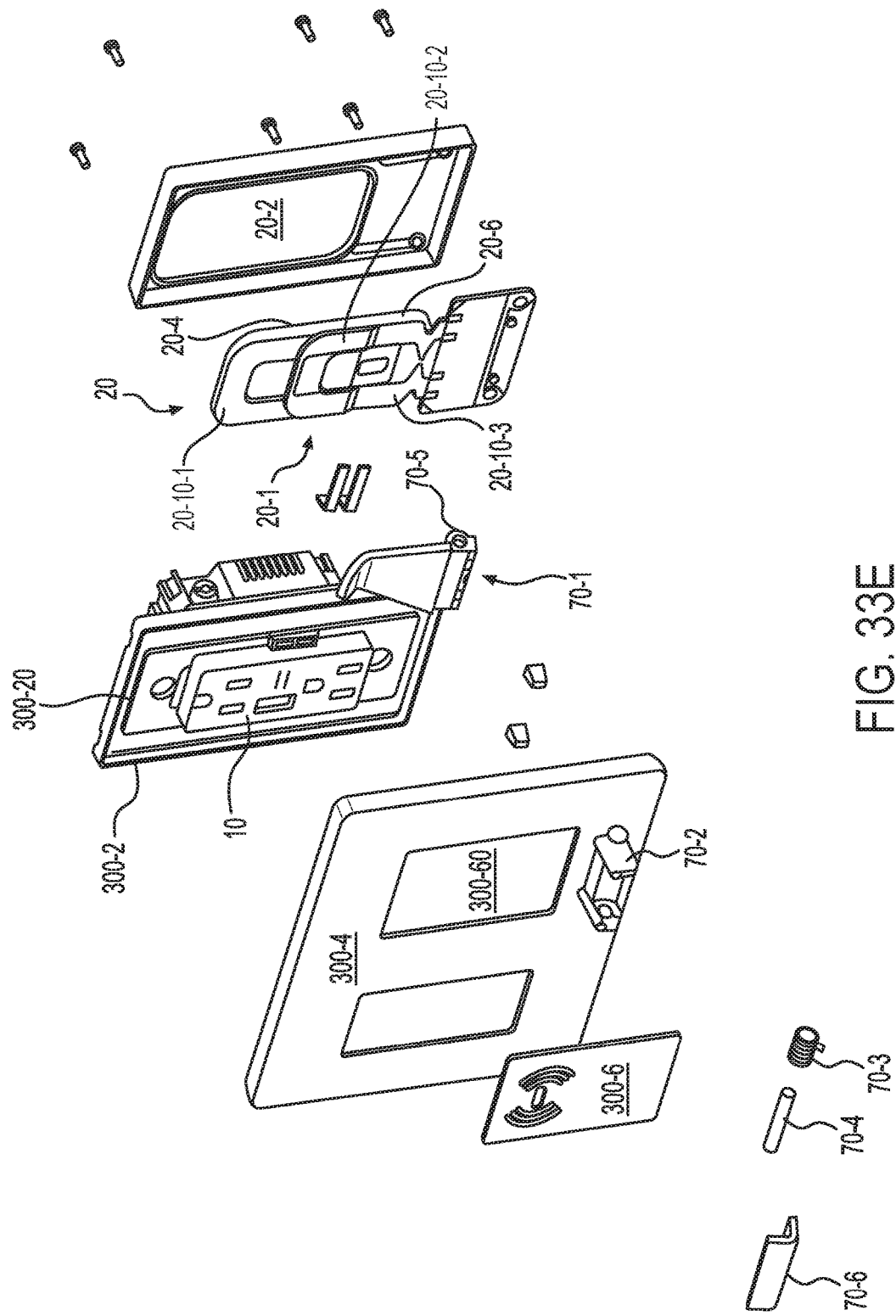
FIG. 33E is an exploded view of the electrical wiring assembly depicted in FIG. 33A.

Referring to FIG. 33E, an exploded view of the electrical wiring assembly depicted in FIG. 33A is disclosed. The wall plate housing 300 is shown to include an electrical wiring device portion disposed directly within a rear sub-plate 300-2. The electrical wiring device portion is shown to include the device opening 300-20. The front wall plate cover 300-4 is disposed over the sub-plate frame 300-2 and the antenna back body 20-2 to complete the enclosure. Like previous embodiments, the front cover 300-4 includes a recessed region 300-60 that is configured to accommodate the antenna logo plate 300-6.

As shown, the cradle gripper 70-1 may be spring-biased with the cradle spring 70-3. Spring 70-3 may fit over a dowel 70-4, which, in turn, may insert through openings 70-5 in the gripper 70-1 and fit into a slotted recess formed into mounting 70-2, so as to secure the spring 70-3 and gripper 70-1 to mounting and form a spring-biased pivot by which gripper 70-1 may be pulled away from antenna logo plate 300-6. Again, because gripper 70-1 is biased by spring 70-3, when gripper 70-1 is released, it will return to antenna logo plate 300-6, or will secure a portable device that is positioned between gripper 70-1 and antenna logo plate 300-6. Cradle 70 may further comprise a front portion 70-6 that abuts the lower edge of the gripper 70-1, and is curved so as to contact front wall plate cover 300-4 when the gripper 70-1 is pulled away from antenna logo plate 300-6, to limit the distance the gripper 70-1 may pull away from the antenna logo plate 300-6.

The antenna housing 20-2 includes a circuit assembly 20-1 that is disposed within the space formed between the antenna back body 20-2 and the interior wall of the front wall plate cover 300-4. The circuit assembly 20-1 includes a printed circuit board (PCB) 20-4 that has various control circuits (not visible in this view) disposed on the back side thereof. The front side includes a shielding structure 20-6 that accommodates a plurality of antenna coils 20-10. The shielding structure 20-6 prevents a magnetic field from heating any metallic structures behind the assembly 100 (e.g., a metallic device box or an electronic component). In the example shown in this view, the antenna is comprised of two coils, 20-10-1, and 20-10-2 (in alternate embodiments, antenna may be comprised of a single coil arrangement (20-10-1), a double coil arrangement (20-10-2), or a three coil arrangement (20-10-1, 20-10-2, and 20-10-3)).

Figure 34:
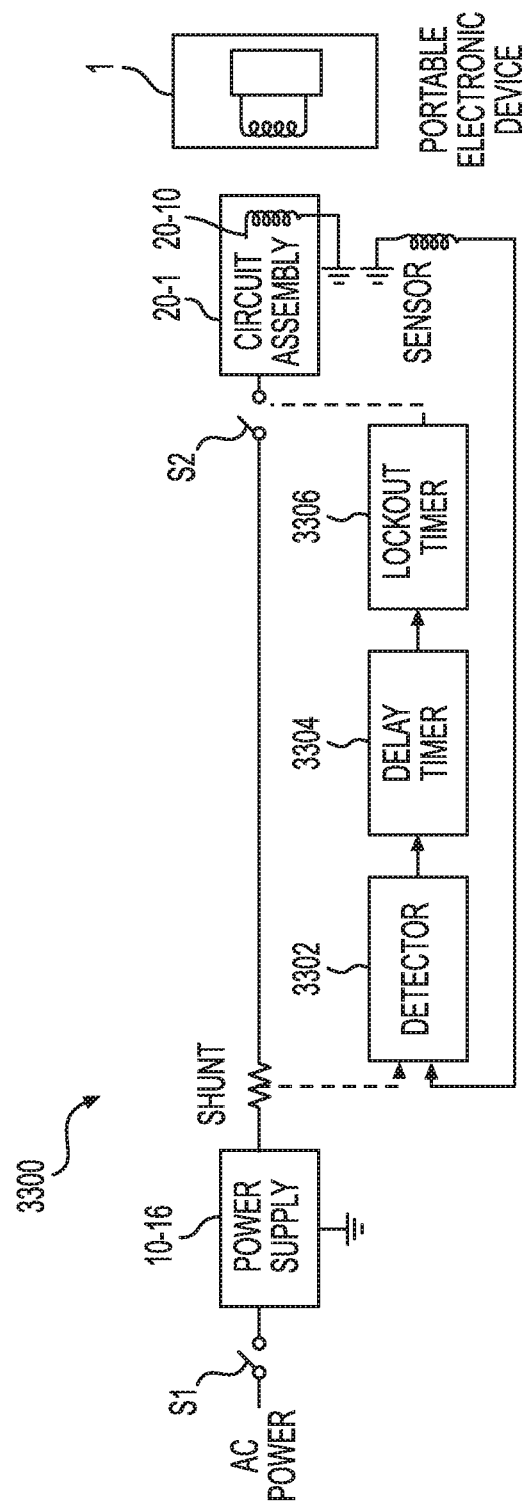
FIG. 34 is a schematic block diagram illustrating a wireless charging device with a lock-out timer circuit in accordance with the invention.

As embodied herein and depicted in FIG. 34, a schematic block diagram illustrating a wireless charging device with a lock-out timer circuit 3300 is disclosed. In one embodiment, the AC power (e.g., 120 VAC, 60 Hz) is provided to the power supply 10-16 via a power station enable switch S1. In another embodiment, the power station enable switch S1 may be provided at the output of the power supply 10-16. In the latter case, the position of the switch S1 allows the user to turn off the wireless charger while, for example, the low voltage (e.g., USB) receptacle remains energized. See, e.g., FIG. 1A. S1 may be provided on any suitable surface of the wall plate assembly 30 (300, 3000). See, e.g., switch 202-4 at FIG. 25B. In any event, the power supply 10-16 is configured to convert AC power to one or more low voltage power supply signals in accordance with the requirements of the charger circuitry 20-1 and the charger coil(s) 20-10.

The lockout circuit may include any suitable sensor configured to sense the operation of the charger coil(s) 20-10. In one embodiment, the sensor may be realized by a resistive shunt that signals to the detector 3302 that the charger coil(s) 20-10 are pulling current (and thus operating). In another embodiment, the sensor may be implemented using a sensing coil that is configured to be magnetically coupled to the coils 20-10 when they are in operation. Briefly then, once the detector 3302 detects that sensor signal, it provides the delay timer 3304 with a detection signal. The delay timer is a type of filter and functions much like a de-bounce signal; it allows the lockout circuit 3300 to ignore sensor "sputtering" (e.g., momentary interruptions to the charging process) and noise so that the lockout timer is not prematurely activated. Once the detector signal is reasserted during the delay timer period, the delay timer 3304 will reset, otherwise it times out and sends a signal to the lockout timer 3306.

When the lockout timer 3306 receives the signal from the delay timer 3304, it opens a switch S2 (electronic or mechanical) that decouples the circuit assembly 20-1 from power supply 10-16 for a predetermined interval so that the circuit assembly 20-1 cannot charge the battery. The predetermined interval may be in a range that includes 15 seconds, 30 seconds, one (1) minute or up to an hour.

The reason for the lockout timer 3300 is as follows. Many portable electronic devices are configured to provide an audible signal (e.g., a beep) that signals the user that its battery has been fully charged. However, once the battery charges, the battery voltage starts to decay. Even when the amount of decay is slight, the charger will recommence the charging process to bring the battery voltage back up to full charge. Each time the battery voltage is brought back up to full charge, the portable electronic device will provide the audible signal. Accordingly, the user may hear a series of beeping sounds every few seconds. The lockout circuit 3300 prevents this annoyance from occurring.

Note that with or without the lockout circuit 3300, the switch S1 may be configured to interrupt the power supply 10-16, circuit assembly 20-1, and/or the lock-out circuit 3300 when these elements are not in use. In another embodiment of the invention, the switch S1 may be mechanically coupled to the reciprocating gripper 30-120 (see, e.g., FIG. 23A). When a portable electronic device is disposed between the grippers, the switch S1 may be closed to thus enable a charging sequence. When the portable electronic device 1 is removed, power may also be removed to terminate the charging sequence.

Figure 35:
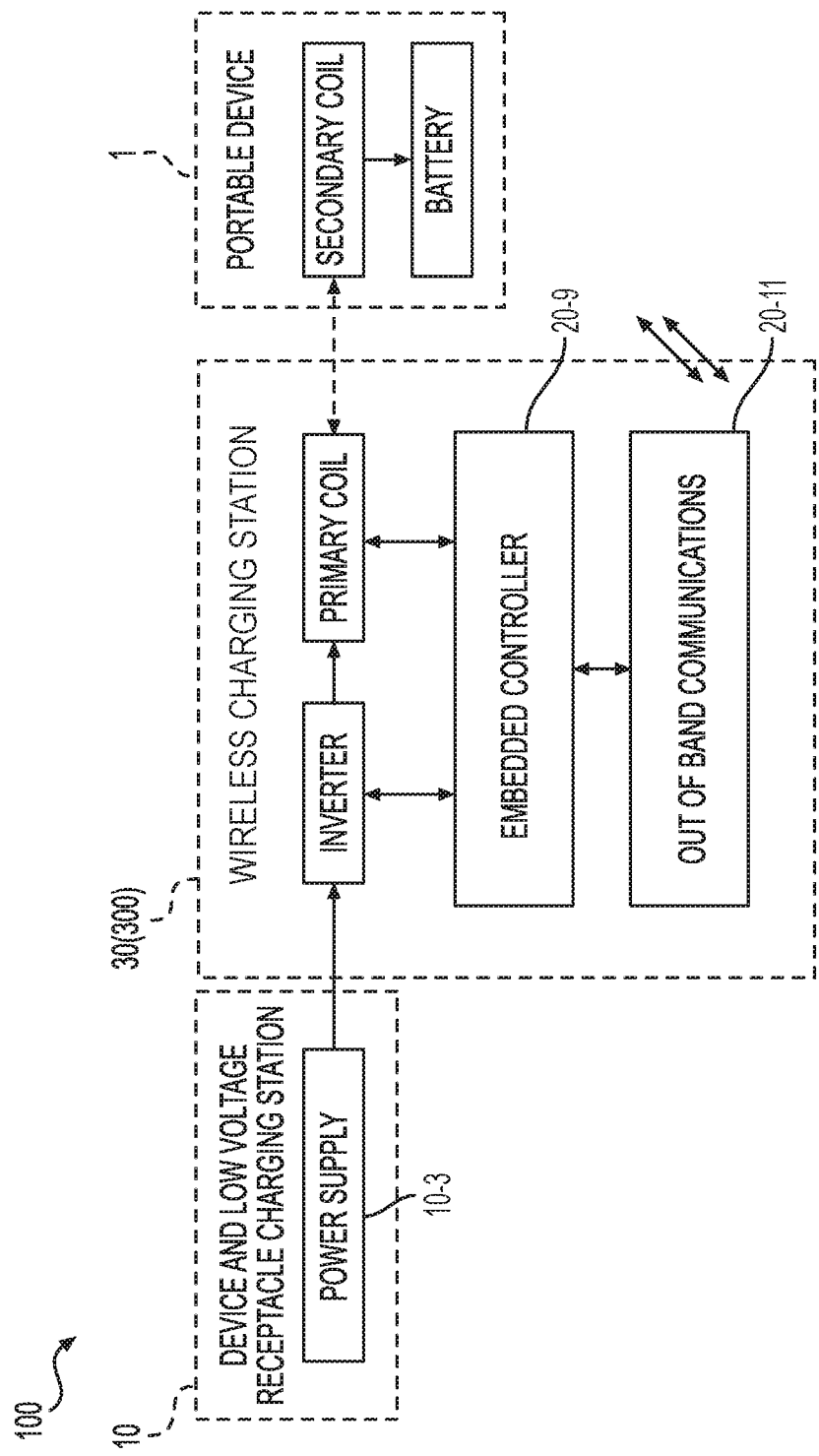
FIG. 35 is a diagrammatic depiction of an electrical wiring assembly in accordance with the present invention.

Referring to FIG. 35, a diagrammatic depiction of an electrical wiring assembly 100 in accordance with the present invention is disclosed. As shown herein, the electrical wiring assembly 100 may include an electrical wiring device 10 and a wireless charging facility 30 (300, 3000) disposed within a wall plate housing 30-1. As described herein, the power supply 10-3 is configured to provide a low voltage signal to, e.g., one or more USB ports 10-8 (See, e.g., FIG. 1A) and a low voltage signal to the wireless charging facility 30 (300, 3000). In this embodiment, the low voltage signal provided to the wireless facility 30 is a DC signal that can be modulated by the inverter disposed in charger 30. The DC signal may be of any suitable voltage amount depending on the requirements of the charger circuit 20-1 (e.g., +5 VDC, +/−5 VDC, +12 VDC, +15 VDC, +/−15 VDC, +19 VDC, etc.).

As described herein, the circuit 20-1 typically includes an embedded controller 20-9 that is configured to drive the inverter in accordance with the system specification. The charging coil(s) 20-10 provide the embedded controller 20-9 with a feedback signal for closed-loop control of the inverters and the charging process. The embedded controller is coupled to a communication interface 20-11 that is configured to communicate with the portable device using a suitable communications channel (in-band or out-of-band). The term "out-of-band" refers to the use of a communications interface other than primary and secondary charging coils to establish communications between the portable device 1 and the assembly 100. The communication interface may be implemented by any suitable wireline or wireless communications interface. For example, one embodiment of the communication interface employs a Bluetooth wireless communications protocol.

In one embodiment, the wireless charging station 30 is configured to employ magnetic induction charging. As those skilled in the art will appreciate, magnetic induction establishes an electromagnetic field in the primary coil(s) 20-10 to transfer energy to the secondary coil in portable device 1. The embedded controller 20-9 modulates the primary coil(s) 20-10 to create an alternating electromagnetic field; the secondary coil in the portable device converts the electromagnetic field into electrical current to charge its battery. As those skilled in the art will further appreciate, the primary coil(s) 20-10 and the secondary coil—in close proximity—form an electrical transformer. Under the direction of the embedded controller 20-9, the primary coil(s) 20-10 may be driven by any suitable time-varying drive signal such as, e.g., a sinusoidal signal, a square wave signal, an amplitude modulated signal, a frequency modulated signal, and a phase modulated signal or any other suitable drive signal. The present invention may be configured in accordance with any suitable system specification such as the so-called "Qi" standard for Wireless Power Transfer Specification (2013) developed by the Wireless Power Consortium. The Qi Wireless Power Transfer Specification is incorporated herein by reference as though fully set forth in its entirety, for a more detailed explanation of power transmitter designs A1-A18 and B1-B5 (See, e.g., pp. 11-111), System Control (see, e.g., pp. 123-137) and Communications Interfacing (see, e.g., pp. 139-148).

In one embodiment, the wireless charging station 30 is configured to employ resonant inductive coupling. As those skilled in the art will appreciate, an inductive charging system that uses resonant inductive coupling may charge a secondary coil that is located at a relatively greater distance. The primary coil(s) 20-10 and the secondary coil (in the portable device 1) are configured as resonant circuits that are tuned to resonate at the same frequency. Accordingly, the primary coil 20-10 and the secondary coil are tuned by capacitors connected across the windings to make two coupled LC circuits that operate as magnetically coupled resonators. The resonant frequency may be in the MHz range between, for example, 1 MHz and 30 MHz to enable efficient power transfer from the primary 20-10 to the secondary.

As before, the embedded controller is configured to drive the inverters using any suitable time-varying drive signal such as, e.g., a sinusoidal signal, a square wave signal, an amplitude modulated signal, a frequency modulated signal, and a phase modulated signal or any other suitable drive signal. The present invention may be configured in accordance with any suitable system specification such as the A4WP Wireless Power Transfer System Baseline System Specification (BSS) AW4P-S-0001 v 1.3., published by the Alliance for Wireless Power Transfer (A4WP), November, 2014. The A4WP BSS Specification is incorporated herein by reference as though fully set forth in its entirety, for a more detailed explanation of the system design including system description, resonator designs, transmitter designs, power transfer specifications, networking and signaling (see, e.g., pp. 1-108).

Figure 36:
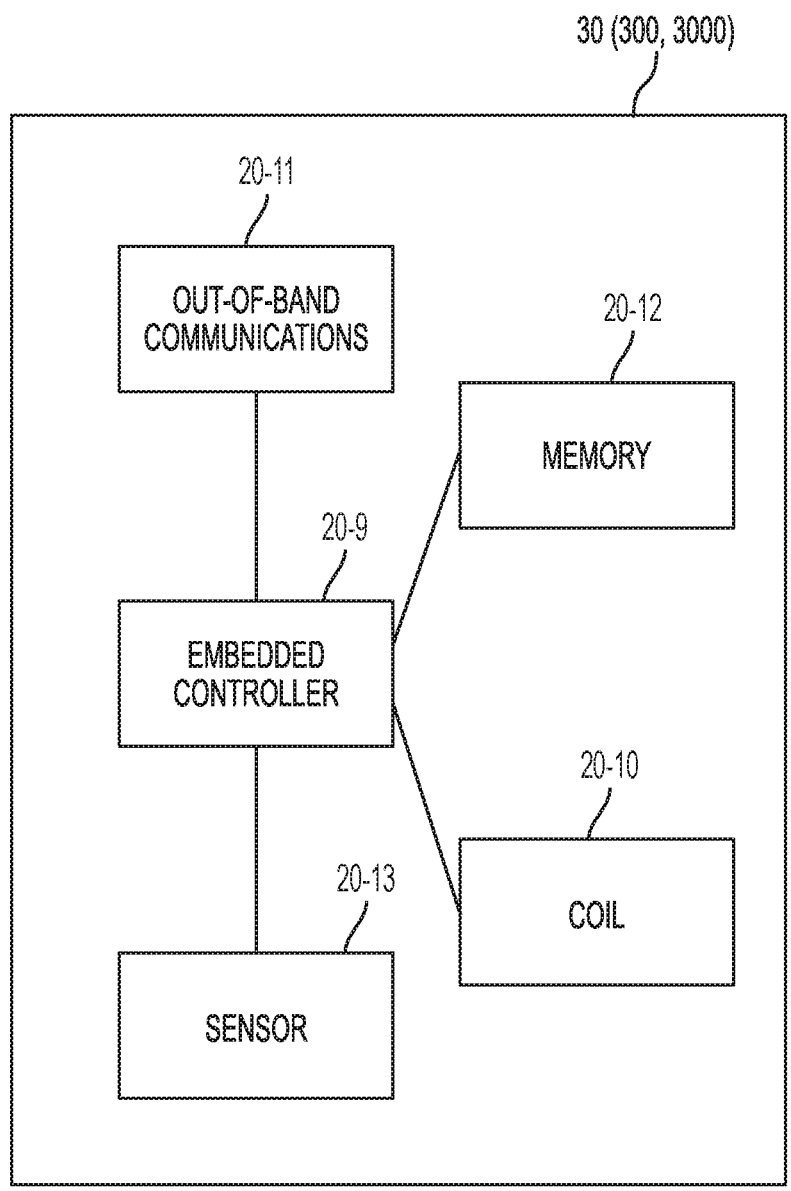
FIG. 36 is a schematic block diagram illustrating a wireless charging device.

Referring to FIG. 36 there is shown a schematic block diagram of processing circuitry which may include embedded controller 20-9 and associated memory 20-12 that may be implemented in connection with antenna assembly 20 (and coil 20-10). Embedded controller 20-9 may be a microcontroller or other device suitable for executing program code stored in memory 20-12 as described below. Embedded controller 20-9 may be implemented using hardware, software, general purpose processors, signal processors, application specific integrated circuits (ASICs), field programmable gate array (FPGA) devices, customized integrated circuits and/or a combination thereof. Memory 20-12 may include RAM and/or ROM, wherein the ROM may store operational firmware or provide long-term data storage when the device is not powered, and RAM may provide quickly-accessible memory for use with the processor when antenna assembly is powered. Memory 20-12 may alternately be referred to as "computer-readable medium," which as used herein, refers to any medium that participates in providing data and/or instructions to the processor for execution. One of ordinary skill in the art will appreciate that memory 20-12 may be included together with embedded controller 20-9, for example, as an integrated-circuit or microcontroller. Alternately, memory 20-12 may be separate and apart from embedded controller 20-9 but coupled to the embedded controller 20-9 such that embedded controller 20-9 may access the program code stored in memory. Embedded controller 20-9 may further include I/O circuitry, communication interface circuitry, and be coupled together with memory 20-12 by a bus system.

Embedded controller 20-9 may be in further connection with coils 20-10, a sensor 20-13, and the communications interface 20-11. As mentioned above, memory 20-12 may store program code necessary for operation of embedded controller 20-9. Program code may include instructions to communicate with sensor 20-13, wherein sensor 20-13 is configured to detect the presence of a phone. Sensor 20-13 may, for example, be in physical communication with device cradle 30-10 and may detect the weight of the portable mobile device is positioned on cradle 30-10 and notify (e.g., by sending a signal) embedded controller 20-9 that a portable mobile device is present. In another example, sensor 20-13 may detect the presence of a portable mobile device reactively by measuring the change in inductance or capacitance of a reactive element in response to a portable mobile device. Indeed, embedded controller 20-9 may not employ a separate sensor 20-13 at all, but may instead measure the inductance of electromagnetic coil 20-10.

Embedded controller 20-9 may communicate with a portable mobile device via communications interface 20-11. For example, embedded controller 20-9 may perform a "handshaking" operation with the portable mobile device, which may, among other things, notify embedded controller 20-9 of the type of device to be charged, authorize charging, and prepare the portable mobile device to be charged. Once embedded controller 20-9 ascertains the type of device to be charged, embedded controller 20-9 may configure, drive, or otherwise prepare electromagnetic coils 20-10 to transmit the correct frequency, voltage, etc., as is necessary to charge a device of the appropriate type. As mentioned above, memory 20-12 may store program code necessary for embedded controller 20-9 to suitably drive coils 20-10 (e.g., according to the relevant protocols) to charge the portable mobile device.

Communications interface 20-11 may also communicate with the portable electronic device to determine the present charge of the battery of the portable electronic device. For example, the portable electronic device may communicate to embedded controller 20-9 via the communications interface 20-11 that the battery of the portable device is completely charged. Appropriately notified, embedded controller 20-9 may instruct antenna assembly 20 to cease transmitting power to the portable device (or may otherwise disconnect circuit assembly 20-1 to cease transmitting power, by, for example, opening switches S1 or S2). Furthermore, once completely charged, embedded controller 20-9 may turn on an LED (not shown) to notify a user that the portable electronic device has completed charging.

Those skilled in the art will appreciate that the diagrammatic depiction of FIG. 36 is suitable for various forms of wireless charging technology including magnetic resonance technology and magnetic induction technology. Magnetic resonance technology typically operates at a resonance frequency within the range of 1 MHz and 30 MHz and is described in greater detail in the Wireless Power Transfer System Baseline System Specification (BSS) AW4P-S-0001 published by the Alliance for Wireless Power Transfer (A4WP.) Magnetic induction technology operates at a lower frequency, e.g. within the range of 100 kHz to 200 kHz and is described in greater detail in the so-called "Qi" standard for Wireless Power Transfer Specification (2013) developed by the Wireless Power Consortium.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring assembly comprising:
   a plurality of line terminals configured to be coupled to a source of AC power;
   an antenna assembly including a circuit assembly coupled to the plurality of line terminals, the circuit assembly including a control circuit coupled to at least one electro-magnetic coil, the control circuit being configured to provide an electrical drive signal to the at least one electro-magnetic coil in accordance with a predetermined wireless charging regimen, the at least one electro-magnetic coil being configured to propagate a magnetic field in accordance with the electrical drive signal; and
   a wall plate assembly including an electrical wiring device region configured to accommodate an electrical wiring device therewithin, and a separate antenna assembly region configured to accommodate the antenna assembly and the circuit assembly therewithin, the antenna assembly region including a charging interface region configured to accommodate a portable electronic device, the charging interface region being configured to position the portable electronic device proximate the at least one electro-magnetic coil so that the portable electronic device is disposed within the propagated magnetic field in accordance with the predetermined wireless charging regimen.

2. The assembly of claim 1, wherein the electrical wiring device is selected from a group of electrical wiring devices that include an outlet receptacle, an electric switch, a ground fault circuit interrupter (GFCI), an arc fault circuit interrupter (AFCI), a transient voltage surge suppressor (TVSS), a surge protective device (SPD), a dimmer, a fan speed control, a night light, a low voltage port, or a USB port.

3. The assembly of claim 1, wherein the electrical wiring device is configured to be installed in an outlet box attached to a wall structure, the wall plate assembly including a mounting portion configured to attach the wall plate assembly to the electrical wiring device or the wall structure.

4. The assembly of claim 3, wherein the wall plate assembly is configured to substantially conceal the mounting portion after installation.

5. The assembly of claim 1, wherein the charging interface region includes a cradle portion, the cradle portion being configured to accommodate the portable electronic device.

6. The assembly of claim 5, wherein a position of the cradle portion is user adjustable.

7. The assembly of claim 6, wherein the cradle portion includes at least one spring-loaded gripper configured to clamp the portable electronic device against an outer surface of the charging interface region the at least one spring-loaded gripper is configured to accommodate a range of portable electronic device sizes.

8. The assembly of claim 7, wherein the at least one spring-loaded gripper includes two grippers whose motions are controlled in equal and opposite directions by a linkage structure to accommodate the portable electronic device.

9. The assembly of claim 5, wherein the circuit assembly further includes an electrical switch coupled to the cradle portion, the electrical switch activating the electrical drive signal when the cradle portion is positioned to accommodate the portable electronic device.

10. The assembly of claim 9, wherein the electrical drive signal is provided to the at least one electro-magnetic coil when there is a predetermined communication signal provided by the portable electronic device to a receiver disposed in the circuit assembly.

11. The assembly of claim 10, wherein the electrical drive signal stops being provided when the predetermined communication signal interrupts due to a battery disposed in the portable electronic device reaching a charged state.

12. The device of claim 11, wherein the control circuit is configured to prevent resumption of the electrical drive signal for a predetermined period of time after the portable electronic device has reached the charged state.

13. The assembly of claim 1, wherein the electrical drive signal is provided to the at least one electro-magnetic coil when there is a predetermined communication signal provided by the portable electronic device to a receiver disposed in the circuit assembly.

14. The assembly of claim 13, wherein the electrical drive signal stops being provided when the predetermined communication signal interrupts due to a battery disposed in the portable electronic device reaching a charged state.

15. The device of claim 14, wherein the control circuit is configured to prevent resumption of the electrical drive signal for a predetermined period of time after the portable electronic device has reached the charged state.

16. The assembly of claim 1, wherein the control circuit includes a power supply circuit.

17. The assembly of claim 1, wherein the wall plate assembly includes a mounting portion configured to be coupled to a wall having a planar wall surface, the charging interface region having a substantially planar outer surface configured to accommodate the portable electronic device, the outer surface being substantially parallel to the wall surface.

18. The assembly of claim 1, wherein the wall plate assembly includes a mounting portion configured to be coupled to a mounting surface, and wherein the charging interface region includes a surface inclined relative to the mounting surface.

19. The assembly of claim 18 wherein an inclination angle of the surface is user adjustable.

20. The assembly of claim 18, wherein the electrical wiring device region has an outer surface, wherein the outer surface is substantially parallel with the mounting surface.

21. The assembly of claim 1, wherein the user accessible electrical wiring device region and the charging interface region having outer surfaces that are substantially co-planar.

22. The assembly of claim 1, wherein the wall plate assembly includes a mounting portion configured to be coupled to a mounting surface, and wherein the charging interface region is recessed relative to the mounting surface.

23. The assembly of claim 1, wherein the predetermined wireless charging regimen includes a magnetic induction charging regimen, a resonant inductive charging regimen, or an RF wireless charging regimen.

24. The assembly of claim 1, further comprising a power supply circuit coupled to the circuit assembly, the power supply circuit being configured to convert an AC power signal provided by the source of AC power into a low voltage power signal.

25. The device of claim 24, wherein the power supply circuit is disposed in the electrical wiring device.

26. The device of claim 25, wherein the power supply circuit is coupled to at least one low voltage output port.

27. The assembly of claim 26, wherein the charging interface region is configured to hold a rechargeable portable device receiving power via a plug deriving power from the at least one low voltage output port.

28. The assembly of claim 26, wherein the at least one low voltage output port is disposed in the electrical wiring device region.

29. The device of claim 28, wherein the at least one low voltage output port is disposed between two receptacles disposed in the electrical wiring device region.

30. The assembly of claim 1, wherein the charging interface region includes a mounting portion configured to be coupled to a wall mounting surface, the mounting portion being substantially flush with respect to the wall mounting surface.

31. The assembly of claim 30, wherein the mounting portion includes one or more fastening elements configured to affix the charging interface region to the wall mounting surface.

32. The assembly of claim 30, wherein the electrical wiring device is configured to be disposed within a device box installed within the wall mounting surface.

33. The assembly of claim 1, wherein the electrical wiring device includes a power supply coupled to a low voltage port, at least a portion of the circuit assembly being configured to receive a power input signal from the power supply.

34. An electrical wiring assembly comprising:
a plurality of line terminals configured to be coupled to a source of AC power;
an antenna assembly including a circuit assembly coupled to the plurality of line terminals, the circuit assembly including a control circuit coupled to at least one electro-magnetic coil, the control circuit being configured to provide an electrical drive signal to the at least one electro-magnetic coil in accordance with a predetermined wireless charging regimen, the at least one electro-magnetic coil being configured to propagate a magnetic field in accordance with the electrical drive signal; and
a wall plate assembly including an electrical wiring device region configured to accommodate an electrical wiring device therewithin, and a separate antenna assembly region configured to accommodate the antenna assembly and the circuit assembly therewithin, the antenna assembly region including a charging interface region configured to accommodate a portable electronic device so that the portable electronic device is disposed within the propagated magnetic field in accordance with the predetermined wireless charging regimen.

35. The assembly of claim 34, wherein the electrical wiring device is configured to be installed in an outlet box attached to a wall structure, the wall plate assembly including a mounting portion configured to attach the wall plate assembly to the electrical wiring device or the wall structure.

36. The assembly of claim 34, wherein the wall plate assembly is configured to substantially conceal the mounting portion after installation.

37. The assembly of claim 34, wherein the wall plate assembly includes a user adjustable cradle portion being configured to position the portable electronic device proximate the at least one electro-magnetic coil.

38. The assembly of claim 37, wherein the circuit assembly further includes an electrical switch coupled to the cradle portion, the electrical switch activating the electrical drive signal when the cradle portion is positioned to accommodate the portable electronic device.

39. The assembly of claim 34, wherein the electrical drive signal is provided upon successful communication between the portable electronic device and a receiver disposed in the circuit assembly.

40. The assembly of claim 34, wherein an outer wall of the charging interface region or an outer wall of the wiring device region is parallel to a wall surface to which the wall plate assembly is mounted.

41. The assembly of claim 34, wherein circuit assembly includes a power supply circuit disposed in the electrical wiring device, the power supply circuit being coupled to at least one low voltage output port.

42. The assembly of claim 41, wherein the at least one low voltage output port is disposed adjacent at least one receptacle disposed in the electrical wiring device region.

43. The assembly of claim 34, wherein the electrical wiring device includes a pair of mounting ears configured for attaching the electrical wiring device to an outlet box, the charging interface region not being disposed between the pair of mounting ears.

44. The assembly of claim 43, wherein the outlet box is a single gang outlet box.

45. The assembly of claim 43, wherein circuit assembly includes a power supply circuit disposed in the electrical wiring device coupled to at least one low voltage output port disposed between the pair of mounting ears.

* * * * *

UNITED STATES PATENT AND TRADEMARK OFFICE
CERTIFICATE OF CORRECTION

PATENT NO. : 10,340,722 B2  
APPLICATION NO. : 15/167293  
DATED : July 2, 2019  
INVENTOR(S) : Richard M. Rohmer et al.

Page 1 of 1

It is certified that error appears in the above-identified patent and that said Letters Patent is hereby corrected as shown below:

In the Claims

Column 42, Line 5, Claim 41 add "the" between "wherein" and "circuit"  
Column 42, Line 11, Claim 42 add "to" between "adjacent" and "at"  
Column 42, Line 20, Claim 45 add "the" between "wherein" and "circuit"

Signed and Sealed this  
Seventh Day of June, 2022

Katherine Kelly Vidal  
*Director of the United States Patent and Trademark Office*